US010855350B2

(12) United States Patent
Oteri et al.

(10) Patent No.: US 10,855,350 B2
(45) Date of Patent: Dec. 1, 2020

(54) SYSTEMS AND METHODS FOR BEAMFORMING FEEDBACK IN MM WAVE WIRELESS LOCAL AREA NETWORKS

(71) Applicant: InterDigital Patent Holdings, Inc., Wilmington, DE (US)

(72) Inventors: Oghenekome Oteri, San Diego, CA (US); Rui Yang, Greenlawn, NY (US); Alphan Sahin, Westbury, NY (US); Hanqing Lou, Syosset, NY (US); Li-Hsiang Sun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 167 days.

(21) Appl. No.: 16/300,263

(22) PCT Filed: May 9, 2017

(86) PCT No.: PCT/US2017/031829
§ 371 (c)(1),
(2) Date: Nov. 9, 2018

(87) PCT Pub. No.: WO2017/196900
PCT Pub. Date: Nov. 16, 2017

(65) Prior Publication Data
US 2019/0068258 A1 Feb. 28, 2019

Related U.S. Application Data

(60) Provisional application No. 62/335,519, filed on May 12, 2016, provisional application No. 62/365,281, (Continued)

(51) Int. Cl.
*H04B 7/0456* (2017.01)
*H04B 7/06* (2006.01)
(Continued)

(52) U.S. Cl.
CPC .......... *H04B 7/0478* (2013.01); *H04B 7/043* (2013.01); *H04B 7/0417* (2013.01);
(Continued)

(58) Field of Classification Search
CPC .... H04B 7/0417; H04B 7/043; H04B 7/0478; H04B 7/0617; H04B 7/0626; H04B 7/0639; H04L 25/0204; H04W 72/085
See application file for complete search history.

(56) References Cited

U.S. PATENT DOCUMENTS

2011/0291891 A1* 12/2011 Nsenga ............... H04B 7/0617
342/373
2013/0039401 A1* 2/2013 Han ..................... H04B 7/0617
375/222
(Continued)

OTHER PUBLICATIONS

Part 11: Wireless LAN Medium Access Control (MAC) and Physical Layer (PHY) Specifications Amendment 3: Enhancements for Very High Throughput in the 60 GHz Band, IEEE Standards Association; 802.11ac-2012, Dec. 28, 2012, 628 pages.
(Continued)

*Primary Examiner* — Dung B Huynh
(74) *Attorney, Agent, or Firm* — Quasim A. Shah

(57) ABSTRACT

A responder performing a hybrid beam forming operation by having multiple antennas configured to receive a training packet, responsively generate a beam-formed receive signal by processing the received training packet with previously determined analog beam coefficients, determine whether digital baseband channel (DBC) tracking is indicated based on a tracking-type parameter contained within the received training packet, process a non-precoded training signal within the beam-formed receive signal and responsively determine a DBC estimate, and provide a feedback message having transmitter precoder data based on the DBC estimate.

20 Claims, 39 Drawing Sheets

Related U.S. Application Data filed on Jul. 21, 2016, provisional application No. 62/445,639, filed on Jan. 12, 2017, provisional application No. 62/501,615, filed on May 4, 2017.

(51) Int. Cl.

| | | |
|---|---|---|
| *H04B 7/0417* | (2017.01) | |
| *H04B 7/0426* | (2017.01) | |
| *H04L 25/02* | (2006.01) | |
| *H04W 72/08* | (2009.01) | |

(52) U.S. Cl.
CPC ......... *H04B 7/0617* (2013.01); *H04B 7/0626* (2013.01); *H04B 7/0639* (2013.01); *H04L 25/0204* (2013.01); *H04W 72/085* (2013.01)

(56) References Cited

U.S. PATENT DOCUMENTS

| | | | | |
|---|---|---|---|---|
| 2013/0039445 A1* | 2/2013 | Hwang | ................ | H04B 7/0619 375/316 |
| 2013/0301454 A1* | 11/2013 | Seol | .................... | H04B 7/0695 370/252 |
| 2014/0185481 A1* | 7/2014 | Seol | .................... | H04W 52/24 370/252 |
| 2014/0321563 A1* | 10/2014 | Park | ................. | H04L 25/03898 375/260 |
| 2015/0289147 A1 | 10/2015 | Lou et al. | | |
| 2015/0373627 A1* | 12/2015 | Ryu | ..................... | H04W 48/16 455/434 |
| 2015/0382205 A1* | 12/2015 | Lee | .................... | H04W 52/365 370/329 |
| 2016/0080051 A1* | 3/2016 | Sajadieh | ................ | H04W 4/70 375/267 |
| 2016/0241323 A1* | 8/2016 | Ko | ....................... | H04B 7/0452 |
| 2016/0323029 A1* | 11/2016 | Cheng | ................. | H04B 7/0617 |
| 2016/0344463 A1* | 11/2016 | Kim | ..................... | H04W 16/28 |
| 2017/0033852 A1* | 2/2017 | Kim | ..................... | H04B 7/0456 |
| 2018/0132217 A1* | 5/2018 | Stirling-Gallacher | ...................... | H04B 7/0417 |
| 2018/0205437 A1* | 7/2018 | Kim | ..................... | H04B 7/0639 |
| 2018/0269934 A1* | 9/2018 | Kim | ..................... | H04B 7/088 |
| 2018/0302136 A1* | 10/2018 | Wigren | ............... | H04B 7/0621 |
| 2019/0109629 A1* | 4/2019 | Park | ..................... | H04B 7/0456 |
| 2019/0123864 A1* | 4/2019 | Zhang | ................. | H04B 7/0695 |
| 2019/0253211 A1* | 8/2019 | Kakishima | ........... | H04B 7/0619 |
| 2020/0036421 A1* | 1/2020 | Su | ............................ | H04B 7/06 |

OTHER PUBLICATIONS

Bo Gao Et Al.,Proposed text resolution to CID 145 in CC12, IEEE 802.11-14/0762r1, Oct. 2014, 8 pages.
Agilent Technologies,Wireless LAN at 60 GHz—IEEE 802.11ad Explained, IEEE 802.11ad-2012 PHY, 2012, 28 pages.
Part 11: Wireless LAN Medium Access Control (MAC) and Physical Layer (PHY) Specifications, IEEE Standards Association; 802.11ac-2012, Mar. 29, 2012, 2793 pages.
Sub 1 GHz license-exempt PAR and 5C, IEEE 802.11-10/0001r13, Jul. 2010, 7 pages.
IEEE 802.11 TGay Use Cases, IEEE 802.11-2015/0625r2, May 2015, 21 pages.
MAC and PHY Proposal for 802.11af, IEEE Standard 802.11-10/0258r0, Mar. 2010, 23 pages.
Part 11: Wireless LAN Medium Access Control (MAC) and Physical Layer (PHY) specifications, Amendment 4: Enhancements for Very High Throughput for Operation in Bands below 6 GHz, IEEE Standards Association; 802.11ac-2013, Dec. 11, 2013, 425 pages.
International Search Report, International Patent Application No. PCT/US2017/031829, dated Aug. 10, 2017, 11 pages.
Ahmed Alkhateeb et al.,MIMO Precoding and Combining Solutions for Millimeter-Wave Systems, IEEE Communications Magazine, Dec. 2014, 10 pages.

* cited by examiner

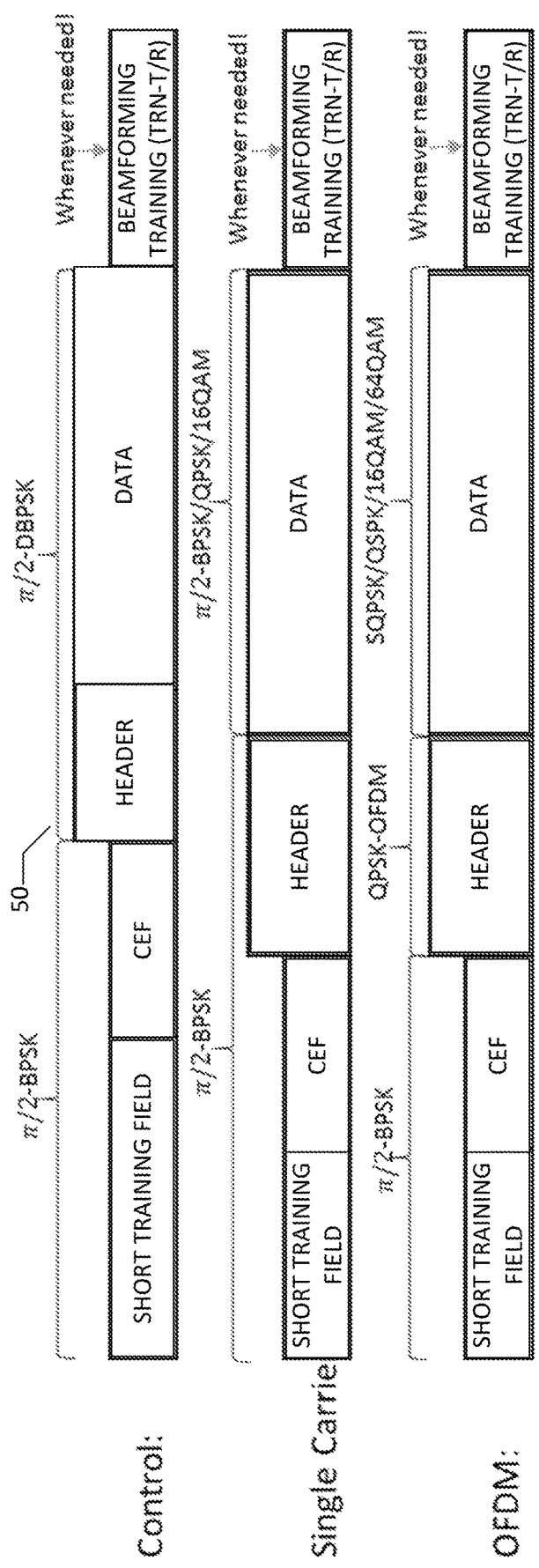

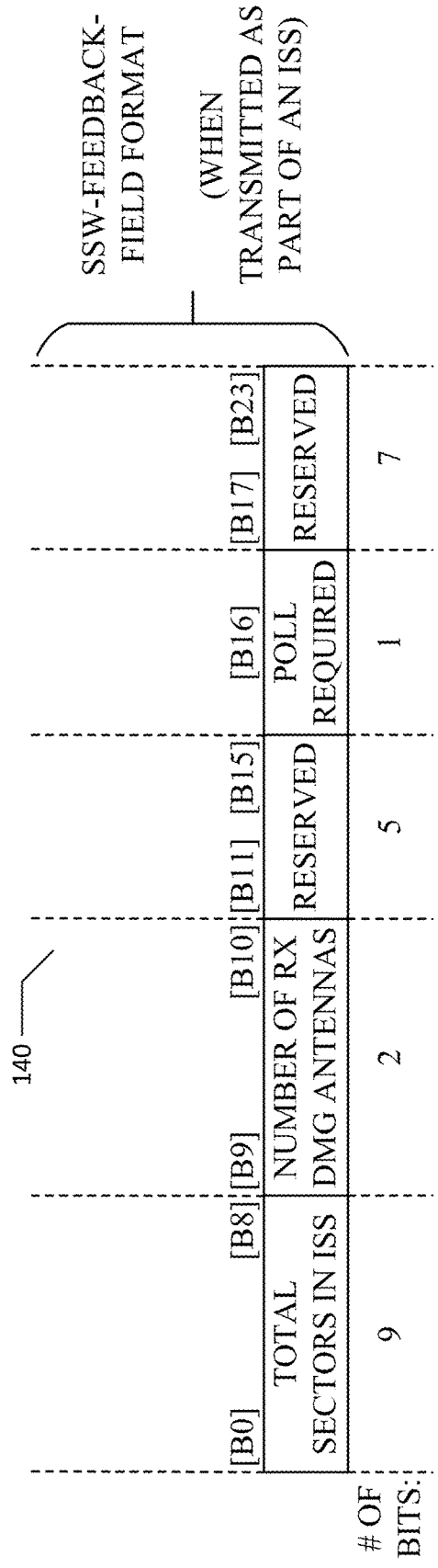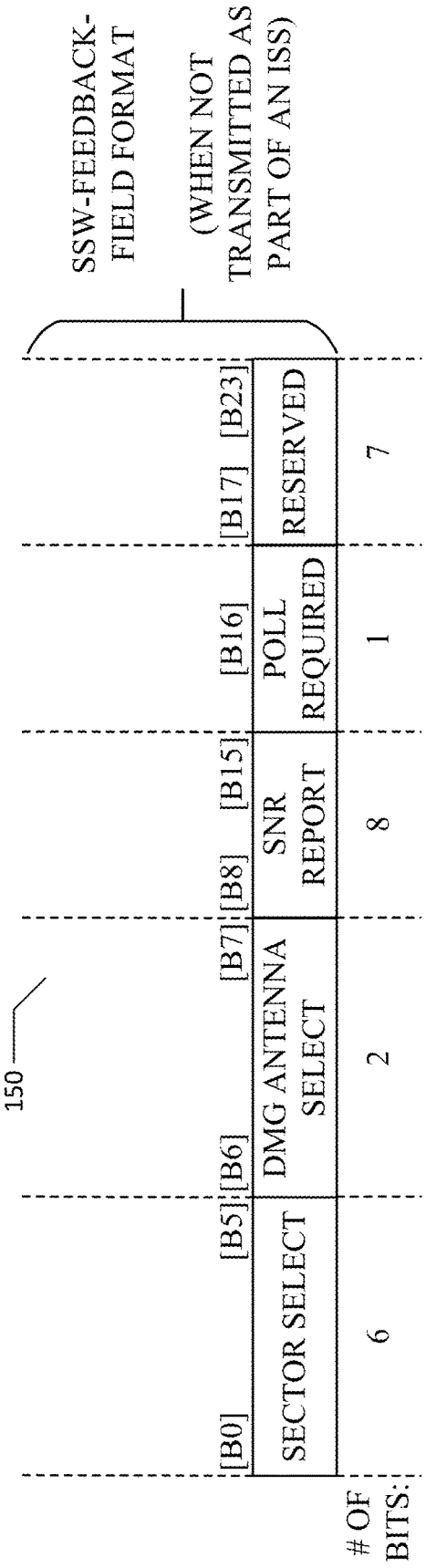
FIG. 6A
FIG. 6B

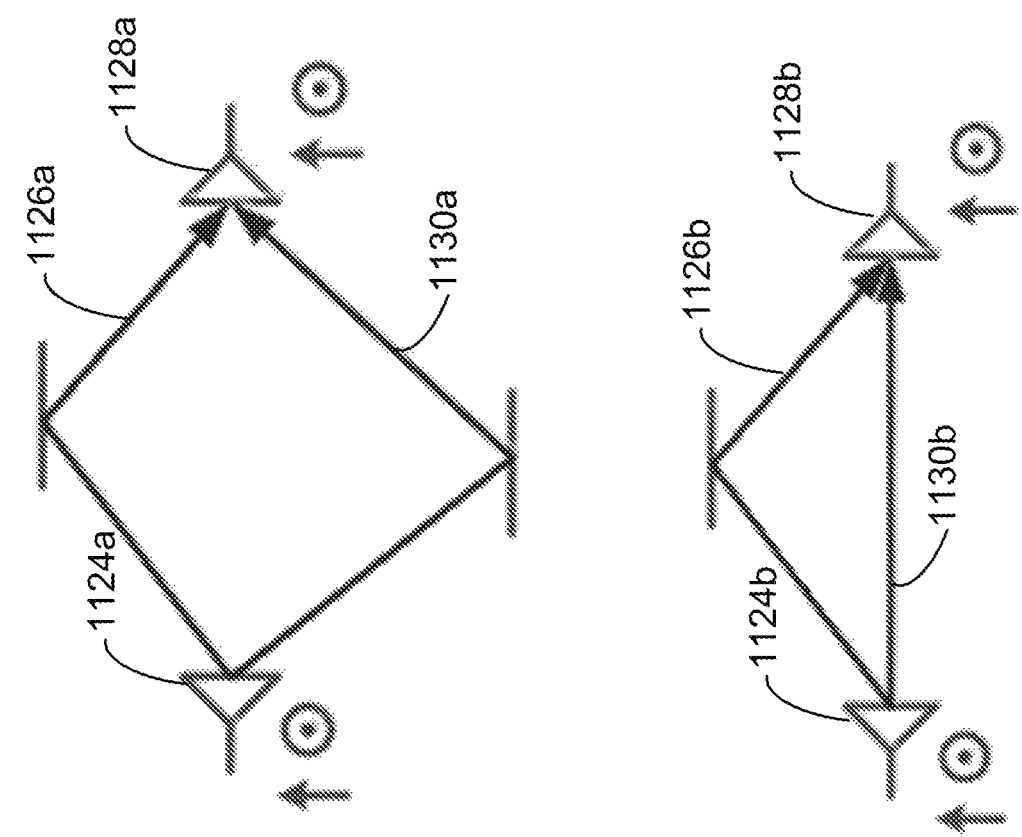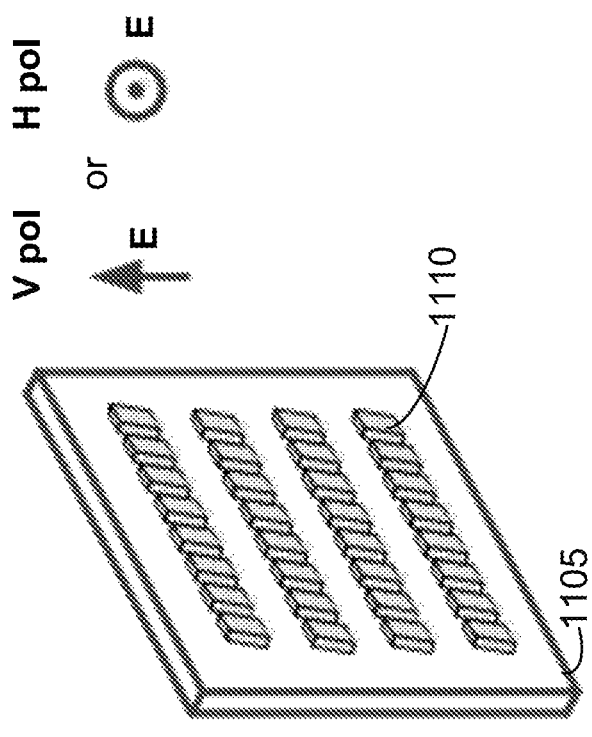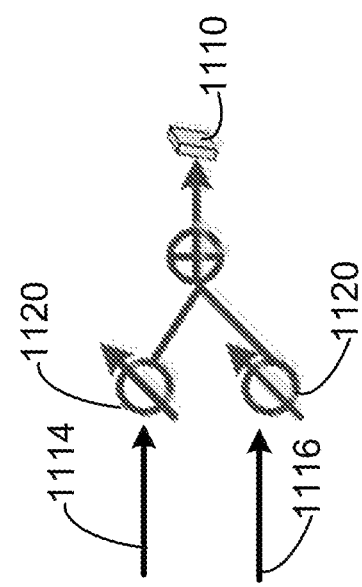
FIG. 15A

FIG. 15E
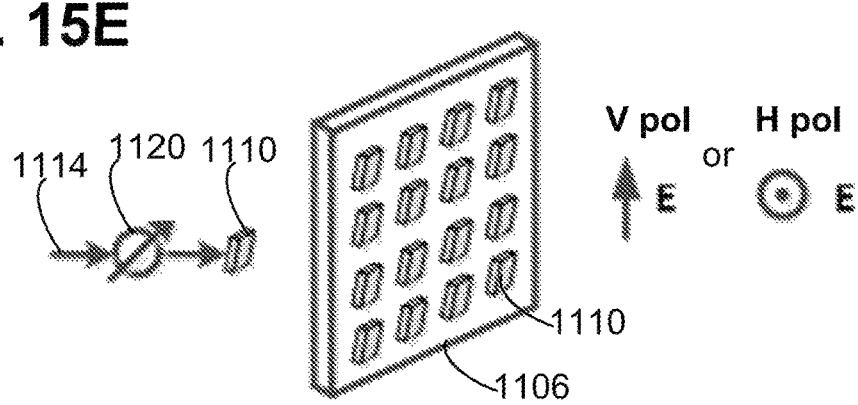
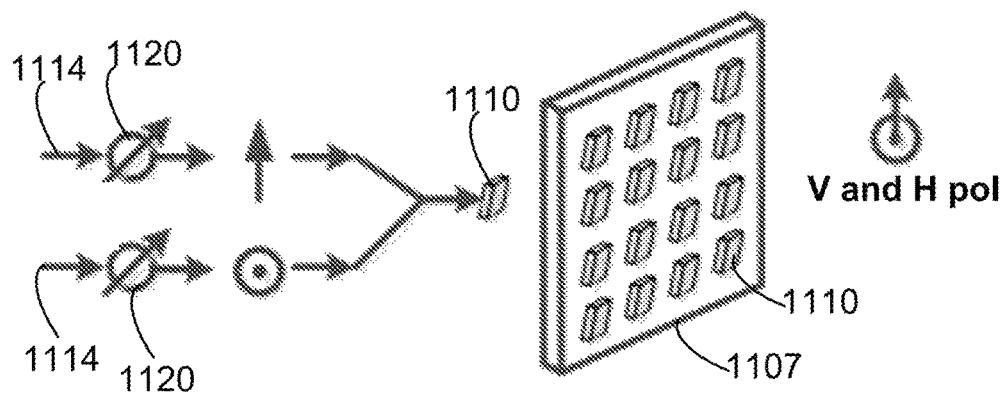
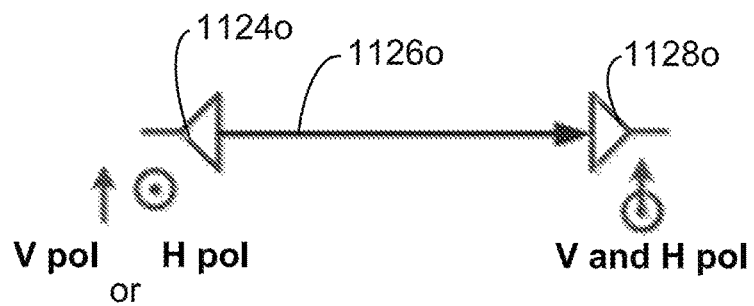
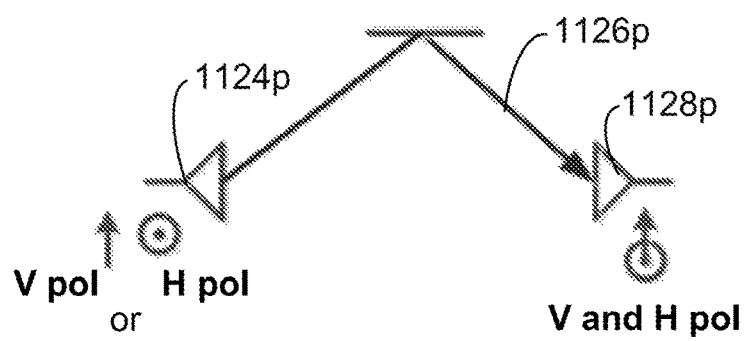

Example of a beam tracking procedure with the initiator requesting TRN-T

| L-STF | L_CEF | L-Header | EDMG-Header-A | EDMG-STF | Extended EDMG-CEF | Data |

FIG. 31

| L-STF | L_CEF | L-Header | EDMG-Header-A | EDMG-STF | EDMG-CEF | Data | TRN-R = N |

FIG. 32

| L-STF | L_CEF | L-Header | EDMG-Header-A | EDMG-STF | Extended EDMG-CEF | Data |

FIG. 35

| L-STF | L_CEF | L-Header | EDMG-Header-A | EDMG-STF | EDMG-CEF | Data | TRN-T = N |

FIG. 36

SYSTEMS AND METHODS FOR BEAMFORMING FEEDBACK IN MM WAVE WIRELESS LOCAL AREA NETWORKS

CROSS REFERENCE TO RELATED APPLICATIONS

This application is a National Stage Application filed under 35 U.S.C. 371 of International Application No. PCT/US17/31829, filed May 9, 2017, and claims the benefit of U.S. Provisional Application No. 62/501,615, filed May 4, 2017, U.S. Provisional Application No. 62/445,639 filed Jan. 12, 2017, U.S. Provisional Application 62/365,281 filed Jul. 21.2016, and U.S. Provisional Application 62/335,519, filed May 12, 2016, the contents of each of which are incorporated by reference herein.

TECHNICAL FIELD

This disclosure relates to systems and methods for beamforming training in wireless local area networks (WLANs), such as Institute of Electrical and Electronics Engineers (IEEE) 802.11ay WLANs.

BACKGROUND

Countless devices and networks around the globe operate according to one or more IEEE 802.11 standards for engaging in wireless communications. These communications typically occur in the 2.4-GHz and 5-GHz bands, though other bands are used as well.

OVERVIEW OF DISCLOSED EMBODIMENTS

Presently disclosed are systems and methods for beamforming training in WLANs.

One embodiment takes the form of a method comprising an initiator device transmitting, to one or more responder devices, a plurality of beamforming frames for beamforming training wherein the initiator device sweeps the transmissions through all beams in all sectors to provide an exhaustive beam refinement transmission. Alternative embodiments include a responder receiving a plurality of beamforming training frames; and, the responder transmitting a feedback frame including receive sector ID parameter and a receive antenna ID parameter.

Still further embodiments include a multistage beamforming training method comprising an initiator transmitting a first stage beamforming signal comprising a sweep through all the transmit beams and a responder sweeping through all receive beams and responsively identifying a first pair of beams. Other embodiments further comprise iteratively sweeping through additional beams and responsively estimating the next best pair given the first pair of beams.

Moreover, any of the variations and permutations described in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

BRIEF DESCRIPTION OF THE DRAWINGS

FIG. 1 depicts PPDU formats for 802.11ad.
FIG. 2 depicts an example transmission block diagram.
FIG. 6A depicts a first example SSW-feedback-field format, in accordance with at least one embodiment.
FIG. 6B depicts a second example SSW-feedback-field format, in accordance with at least one embodiment.
FIGS. 15A-15E depicts 802.11ay configurations 1 through 5.
FIG. 31 depicts an exemplary Baseband beam tracking with no TRN-R fields.
FIG. 32 depicts an exemplary Baseband beam tracking with N TRN-R fields.

FIG. 35 depicts an exemplary Baseband beam tracking with no TRN-T Fields.

FIG. 36 depicts an exemplary Baseband beam tracking with N TRN-T Fields.

Figure 3:
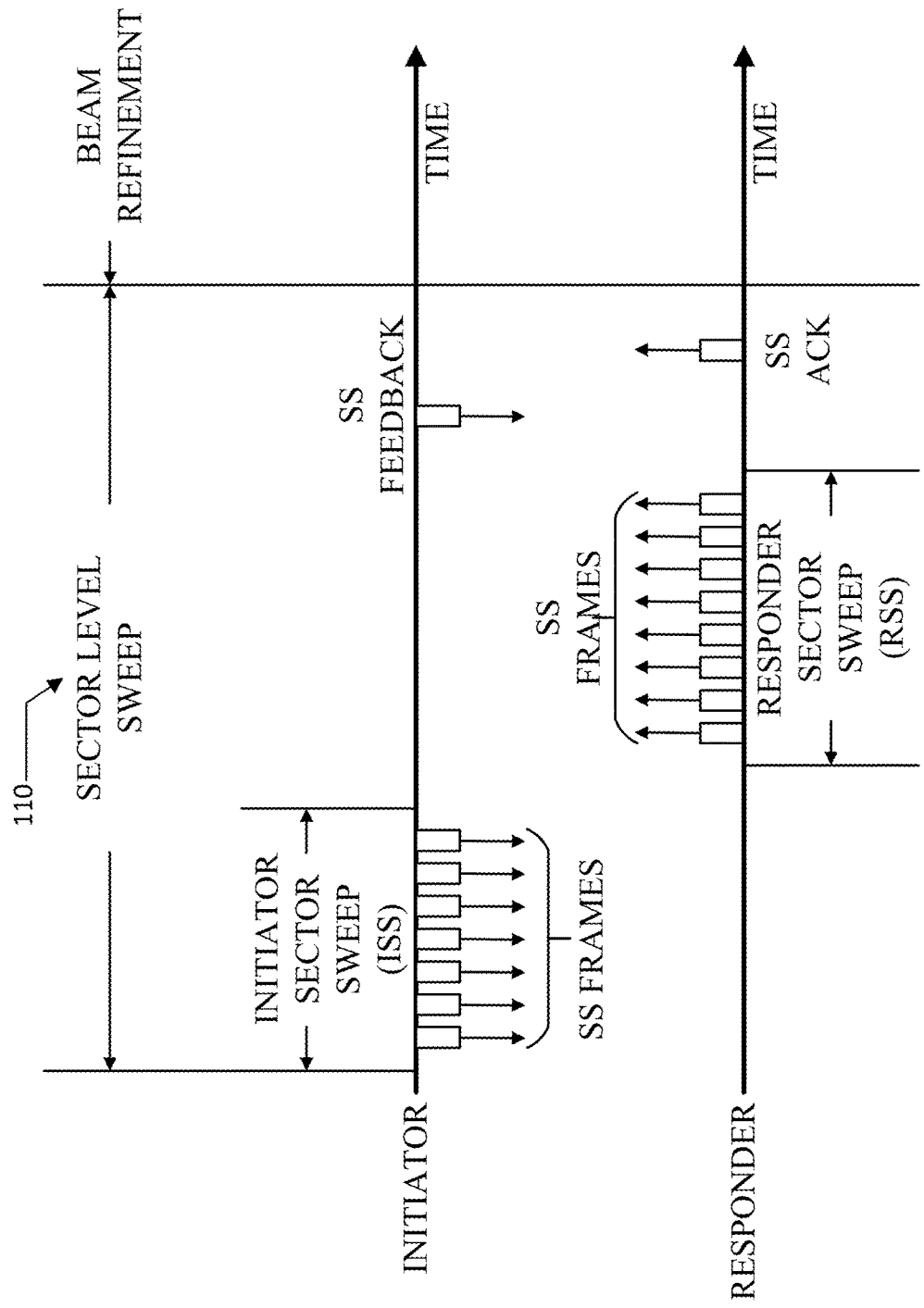
FIG. 3 depicts an example sector level sweep (SLS) training procedure.

Moreover, before proceeding with this disclosure, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . ." And it is for reasons akin to brevity and clarity of presentation that this implied leading clause is not repeated ad nauseum in the below detailed description of the drawings.

DETAILED DESCRIPTION

WLANs
Overview of WLAN Systems.

A WLAN in Infrastructure Basic Service Set (BSS) mode has an Access Point/Personal BSS (PBSS) Control Point (AP/PCP) for the BSS and one or more stations (STAs) (e.g., client devices) associated with the AP/PCP. The AP/PCP typically has access or interface to a Distribution System (DS) or another type of wired/wireless network that carries traffic in and out of the BSS. Traffic to STAs that originates from outside the BSS arrives through the AP/PCP and is delivered to the STAs. Traffic originating from STAs to destinations outside the BSS is sent to the AP/PCP to be delivered to the respective destinations. Traffic between STAs within the BSS may also be sent through the AP/PCP where the source STA sends traffic to the AP/PCP and the AP/PCP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP, and compatible devices simply communicate directly with each other. This mode of communication is referred to as an "ad-hoc" mode of communication.

Using the 802.11ac infrastructure mode of operation, the AP/PCP may transmit a beacon on a fixed channel, usually the primary channel. This channel may be 20 megahertz (MHz) wide, and is the operating channel of the BSS. This channel is also used by the STAs to establish a connection with the AP/PCP. The fundamental channel-access mechanism in an 802.11 system is Carrier Sense Multiple Access with Collision Avoidance (CSMA/CA). In this mode of operation, every STA, including the AP/PCP, will sense the primary channel. If the channel is detected to be busy, the STA backs off. Hence only one STA may transmit at any given time in a given BSS.

In 802.11n [1], High Throughput (HT) STAs may also use a 40-MHz-wide channel for communication. This is achieved by combining the primary 20-MHz-wide channel with an adjacent 20-MHz-wide channel to form a 40-MHz-wide contiguous channel.

In 802.11ac [2], Very High Throughput (VHT) STAs may support 20-MHz-wide, 40-MHz-wide, 80-MHz-wide, and 160-MHz-wide channels. The 40-MHz-wide channels and the 80-MHz-wide channels are formed by combining contiguous 20-MHz-wide channels in a manner that is similar to what is described above in connection with 802.11n. A 160-MHz-wide channel may be formed either by combining 8 contiguous 20-MHz-wide channels, or by combining 2 non-contiguous 80-MHz-wide channels in what is also referred to at times as an "80+80 configuration." For the 80+80 configuration, the data, after channel encoding, is passed through a segment parser that divides it into two streams. Inverse Fast Fourier Transform (IFFT) processing and time-domain processing are performed on each stream separately. The streams are then mapped on to the two channels, and the data is transmitted. At the receiver, this mechanism is reversed, and the combined data is delivered to the MAC of the receiver.

Sub-1-gigahertz (GHz) modes of operation are supported by 802.11af [3] and 802.11ah [4]. For these specifications, the channel operating bandwidths, as well as the carriers, are reduced relative to those used in 802.11n [1] and 802.11ac [2]. 802.11af supports 5-MHz, 10-MHz, and 20-MHz bandwidths in the TV White Space (TVWS) spectrum, and 802.11ah supports 1-MHz, 2-MHz, 4-MHz, 8-MHz, and 16-MHz bandwidths using non-TVWS spectrum. A possible use case for 802.11ah is support for Meter Type Control (MTC) devices in a macro coverage area. MTC devices may have limited capabilities including only support for only limited bandwidths, but also include a requirement for a very long battery life.

WLAN systems—such as 802.11n, 802.11ac, 802.11af, and 802.11ah—that support multiple channels and multiple channel widths include a channel that is designated as the primary channel. The primary channel may, but does not necessarily, have a bandwidth equal to the largest common operating bandwidth supported by all STAs in the BSS. The bandwidth of the primary channel is therefore limited by the STA (among the STAs that are operating in a BSS) that supports the smallest bandwidth operating mode (as the maximum supported channel-bandwidth operating mode for the particular STA). In the example of 802.11ah, the primary channel may be 1 MHz wide if there are STAs (e.g., MTC-type devices) that only support a 1-MHz mode even if the AP/PCP and other STAs in the BSS support, e.g., a 2-MHz, a 4-MHz, an 8-MHz, a 16-MHz, and/or one or more other channel-bandwidth operating modes in excess of the 1-MHz channel-bandwidth operating mode. All carrier sensing, as well as NAV settings, depend on the status of the primary channel; i.e., if the primary channel is busy, for example, due to a STA that supports only a 1-MHz operating mode currently transmitting to the AP, then the entire available frequency bands are considered busy even though majority of it stays idle and available.

In the United States, the available frequency bands that can be used for 802.11ah are from 902 MHz to 928 MHz. In Korea, it is from 917.5 MHz to 923.5 MHz; and in Japan, it is from 916.5 MHz to 927.5 MHz. The total bandwidth available for 802.11ah is between 6 and 26 MHz depending on the country code.

To improve spectral efficiency, 802.11ac has introduced the concept of downlink (DL) multi-user (MU) multiple-in-multiple-out (MIMO) (MU-MIMO) transmission to multiple STAs in the same symbol's time frame, e.g., during a downlink OFDM symbol. The potential for the use of downlink MU-MIMO is also currently considered for 802.11ah. One may note that since downlink MU-MIMO, as it is used in 802.11ac, uses the same symbol timing to multiple STAs, interference of the waveform transmissions to multiple STAs is not an issue. However, all STAs involved in MU-MIMO transmission with the AP/PCP must use the same channel or band, which limits the operating bandwidth to the smallest channel bandwidth that is supported by the STAs that are included in the MU-MIMO transmission with the AP/PCP.

802.11ad 802.11ad is an amendment to the WLAN standard, which specifies the MAC and PHY layers for very high throughput (VHT) in the 60 GHz band.

802.11ad has the following features:
1. 802.11ad supports data rates up to 7 gigabits (Gbits) per second (s) (Gbits/s).
2. 802.11ad supports three different modulation modes:
   a. Control PHY with single carrier and spread spectrum;
   b. Single Carrier PHY; and
   c. OFDM PHY.
3. 802.11ad uses the 60-gigahertz (GHz) unlicensed band, which is available globally. At 60 GHz, the wavelength is 5 millimeters (mm), which makes compact antennas and antenna arrays possible. Such an antenna can create narrow radio-frequency (RF) beams at both the transmitter and the receiver, which effectively increases the coverage range and reduces interference.
4. 802.11ad has a frame structure that facilitates a mechanism for beamforming training (discovery and tracking). The beamforming training protocol includes two components: a sector level sweep (SLS) procedure and a beam refinement protocol (BRP) procedure. The SLS procedure is used for transmit beamforming training; the BRP procedure enables receive beamforming training as well as iterative refinement of both the transmit and receive beams.

MIMO transmissions, including both single-user-(SU)-MIMO and MU-MIMO, are not supported by 802.11ad.

802.11ad PPDU Formats

Referring to FIG. 1, 802.11ad supports three PPDU formats, which are Control PHY, Single Carrier (SC) PHY, and OFDM PHY PPDUs. The PPDU formats 50 are in FIG. 1.

802.11ad Control PHY

Referring to FIG. 2, Control PHY is defined in 802.11ad as the lowest data rate transmission. Frames which have to be transmitted before beamforming training may use Control PHY PPDU. In 802.11ad, transmission diagram 100 of Control PHY is given in FIG. 2.

Sector Level Sweep (SLS)

In FIG. 3, an example SLS training procedure 110 is illustrated.

Figure 4:
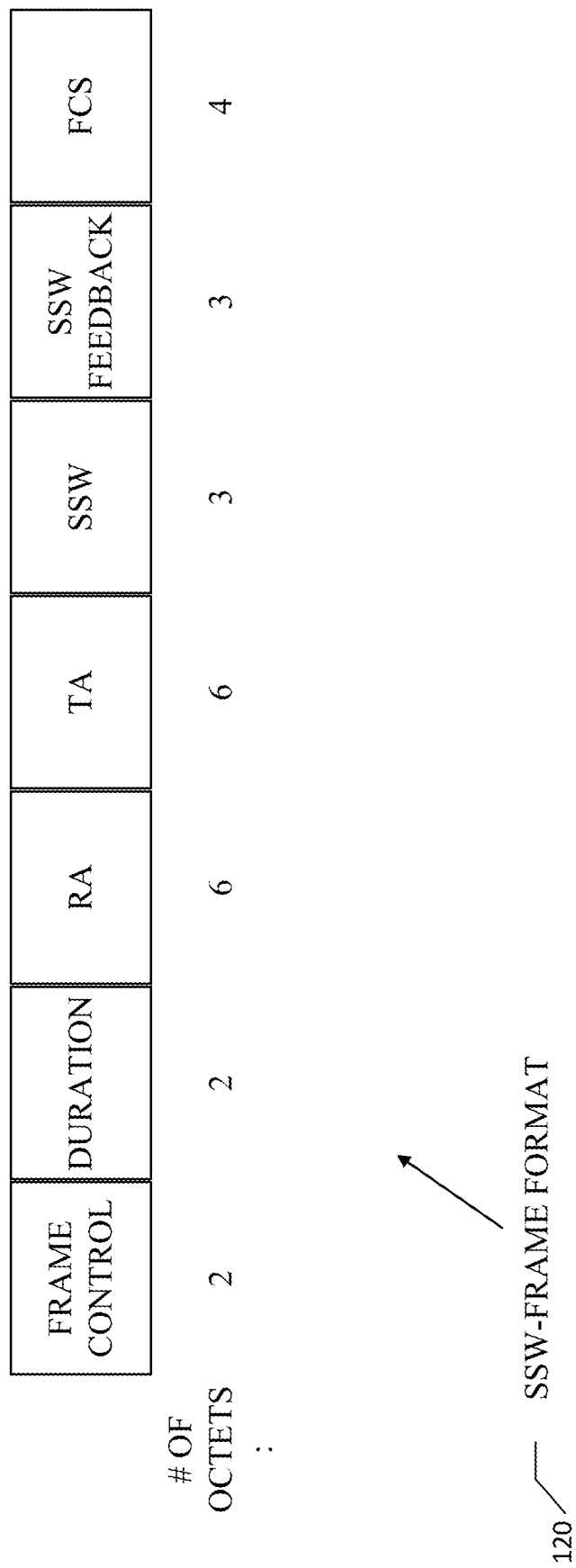
FIG. 4 depicts an example sector sweep (SSW) frame format.

SLS training may be performed using a Beacon frame or SSW frame. When the Beacon frame is utilized, the AP repeats the Beacon frame with multiple beams/sectors within each Beacon interval (BI) and multiple STAs can perform BF training simultaneously. However, due to the size of Beacon frame, it is no guarantee that the AP can sweep all the sectors/beams within one BI. Thus, a STA may need to wait multiple BIs to complete ISS training, and latency may be an issue. A SSW frame 120 may be utilized for point to point BF training. In FIG. 4, A SSW frame may be transmitted using control PHY and the frame format is shown in FIG. 4.

Figure 5:
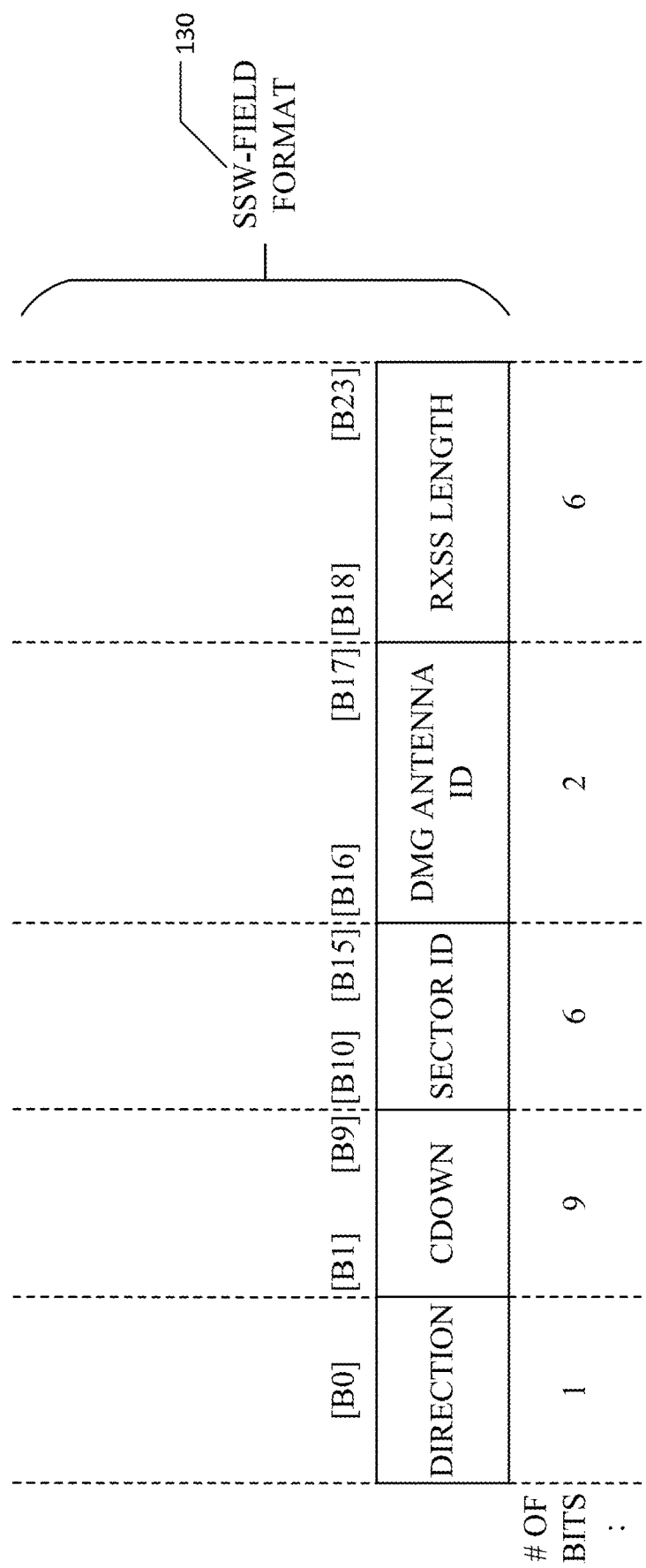
FIG. 5 depicts an example SSW-field format.

An example SSW-field structure (format) 130 is defined in FIG. 5.

A first example SSW-feedback field 140 is shown in FIG. 6A. This corresponds to when this is transmitted as part of an ISS.

A second example SSW-feedback field 150 is shown in FIG. 6B. This corresponds to when this is not transmitted as part of an ISS.

Beam Refinement Protocol (BRP)

Figure 7:
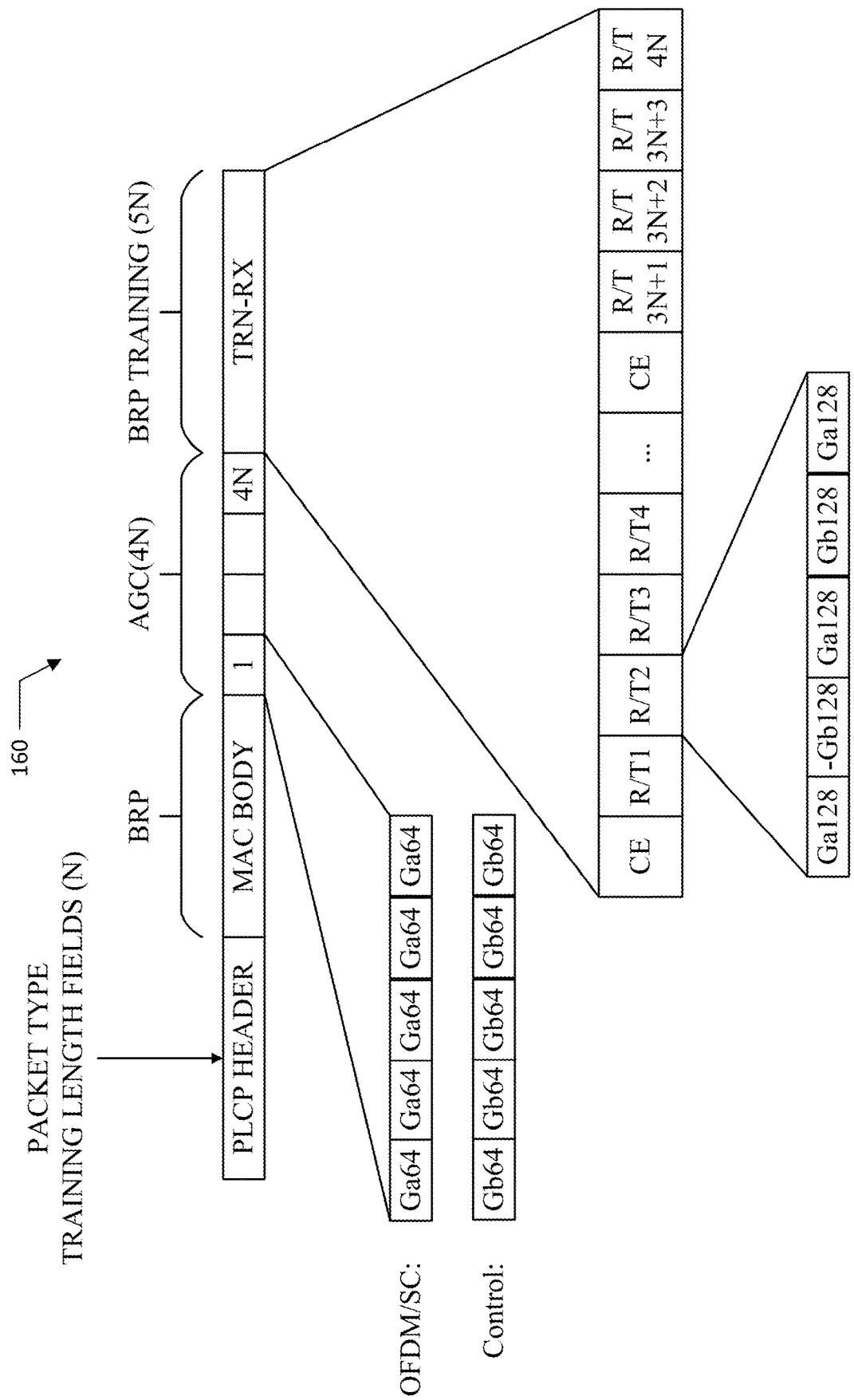
FIG. 7 depicts a first example packet structure for use with a beam refinement protocol.

Beam refinement is a process where a STA can improve its antenna configuration (or antenna weight vectors) both for transmission and reception. In the beam refinement procedure, BRP packets are used to train the receiver and transmitter antenna. There are two types of BRP packets: BRP-RX packets and BRP-TX packets. Referring to FIG. 7, a 160 BRP packet may be carried by a DMG PPDU followed by a training field containing an AGC field and a transmitter or receiver training field as shown in FIG. 7.

A value of N in FIG. 7 is the Training Length given in the header filed, which indicates that the AGC has 4N subfields and that the TRN-R/T field has 5N subfields. The CE subfield is the same as the one in the preamble described in the previous section. All subfields in the beam training field are transmitted using rotated π/2-BPSK modulation.

BRP MAC frame is an Action No ACK frame, which has the following fields:
Category
Unprotected DMG Action
Dialog Token
BRP Request field
DMG Beam Refinement element
Channel Measurement Feedback element 1
. . . .
Channel Measurement Feedback element k 802.11ay (TGay)

Requirements of 802.11ay

Task Group ay (TGay), approved by IEEE in March 2015, is expected to develop an amendment that defines standardized modifications to both the IEEE 802.11 physical layers (PHY) and the IEEE 802.11 medium access control layer (MAC) that enables at least one mode of operation capable of supporting a maximum throughput of at least 20 gigabits per second (measured at the MAC data service access point), while maintaining or improving the power efficiency per station. This amendment also defines operations for license-exempt bands above 45 GHz while ensuring backward compatibility and coexistence with legacy directional multi-gigabit stations (defined by IEEE 802.11ad-2012 amendment) operating in the same band.

Although much higher maximum throughput than that of 802.11ad is the primary goal of TGay, some members of the group also discussed including mobility and outdoor support. More than ten different use cases are considered and analyzed in terms of throughput, latency, operation environment and applications [5].

Since 802.11ay will operate in the same band as legacy standards, it is required that the new technology will ensure backward compatibility and coexistence with legacies in the same band.

802.11ay PPDU Format

Figure 8:
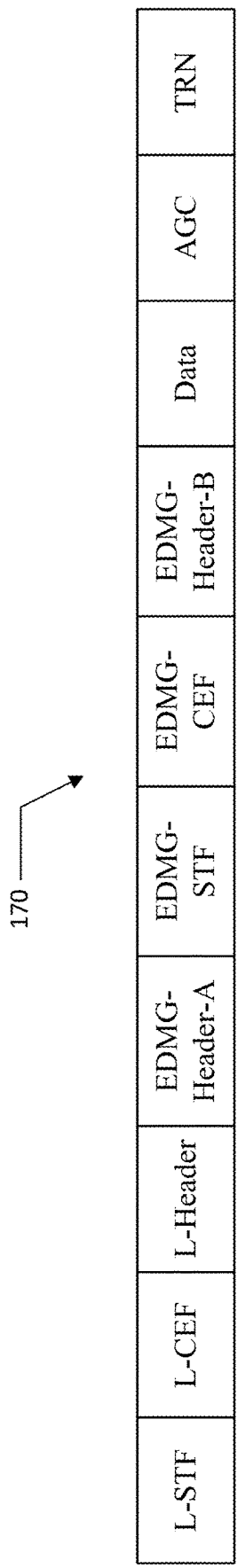
FIG. 8 depicts an 802.11ay PPDU format structure.

It has been agreed that 802.11ay PPDU contain legacy part and EDMG (Enhanced Directional Multi Bit) part. In FIG. 8, the detailed PPDU format 170 is illustrated. The L-STF, L-CEF, L-Header and EDMG-Header-A fields are transmitted using SC mode for backward compatibility. It has been agreed in IEEE January 2016 meeting that:

For a control mode PPDU, the reserved bits 22 and 23 shall be both set to 1 to indicate the presence of the EDMG-Header-A field.

For a SC mode PPDU or an OFDM mode PPDU, the reserved bit 46 shall be set to 1 to indicate the presence of the EDMG-Header-A field.

Millimeter Wave Precoding

Precoding at millimeter wave frequencies may be digital, analog or a hybrid of digital and analog [6].

Digital precoding: Digital precoding is precise and can be combined with equalization. It enables single user (SU), multi-user (MU), and multi-cell precoding, and is typically used in sub 6 GHz, for example in IEEE 802.11n and beyond and in 3GPP LTE and beyond. However, in millimeter wave frequencies, the presence of a limited number of RF chains compared with antenna elements and the sparse nature of the channel complicates the use of digital beamforming.

Analog Beamforming: Analog beamforming overcomes limited number of RF chains issue by using analog phase shifters on each antenna element. It is used in IEEE 802.11ad during the Sector Level Sweep (which identifies the best sector), Beam Refinement (which refines the sector to an antenna beam), and beam tracking (which adjusts the sub-beams over time to take into account any change in the channel) procedures. Analog beamforming is also used in IEEE 802.15.3. In this case a binary search beam training algorithm using a layered multi-resolution beamforming codebook is used. Analog beamforming is typically limited to single stream transmission.

Hybrid beamforming: In hybrid beamforming, the precoder is divided between analog and digital domains. Each domain has precoding and combining matrices with different structural constraints, e.g., constant modulus constraint for combining matrices in the analog domain. This design results in a compromise between hardware complexity and system performance. Hybrid beamforming may be able to achieve digital precoding performance due to sparse nature of channel and support multi-user/multi-stream multiplexing. However, it is limited by number of RF chains. This may not be an issue as mmWave channels are sparse in the angular domain so this limitation may not be as important.

Multi Antenna Analogue Beamforming Methods for 802.11ad+

Figure 9:
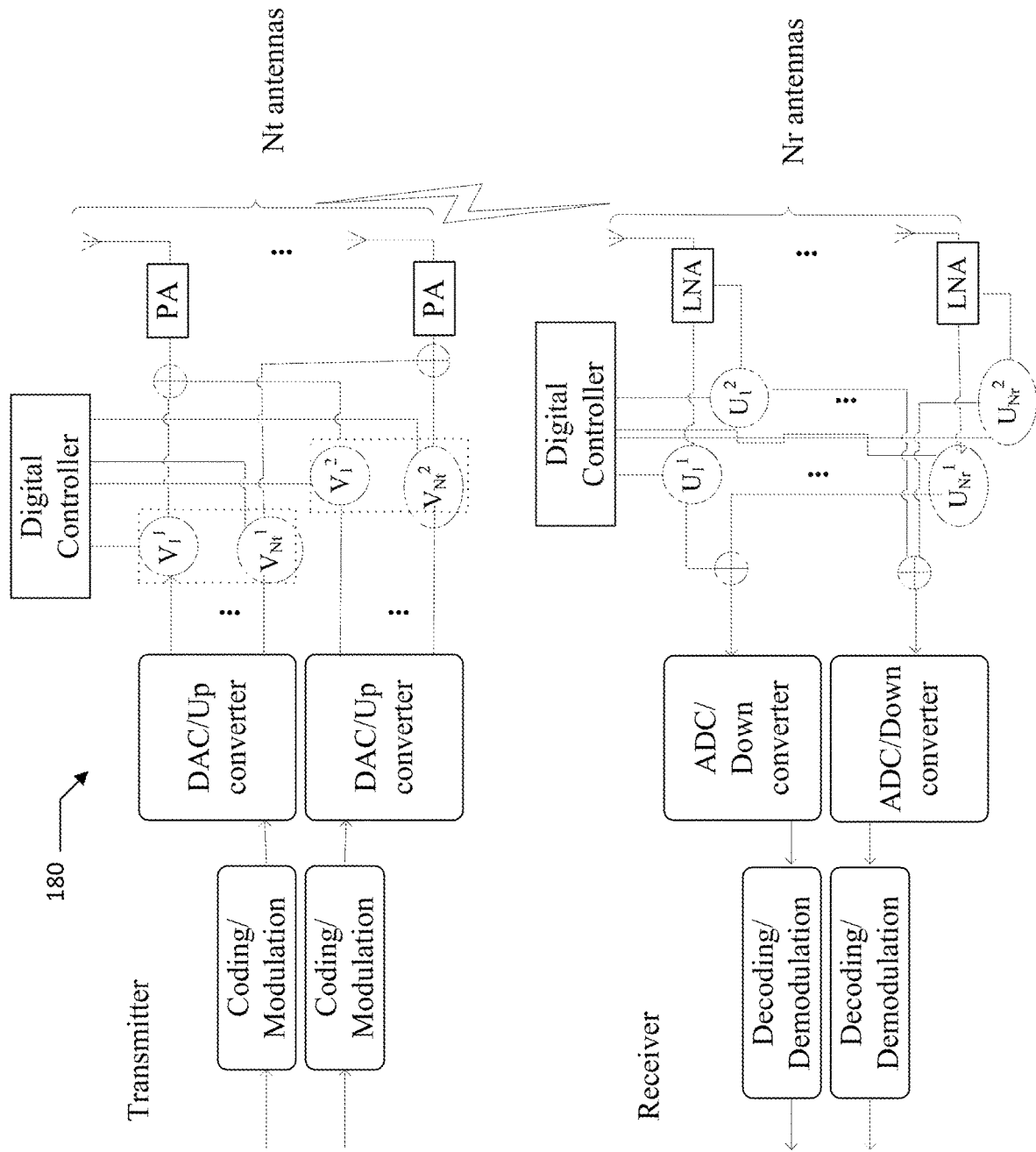
FIG. 9 depicts a device architecture having all physical antennas excited by all the weights.
Figure 10:
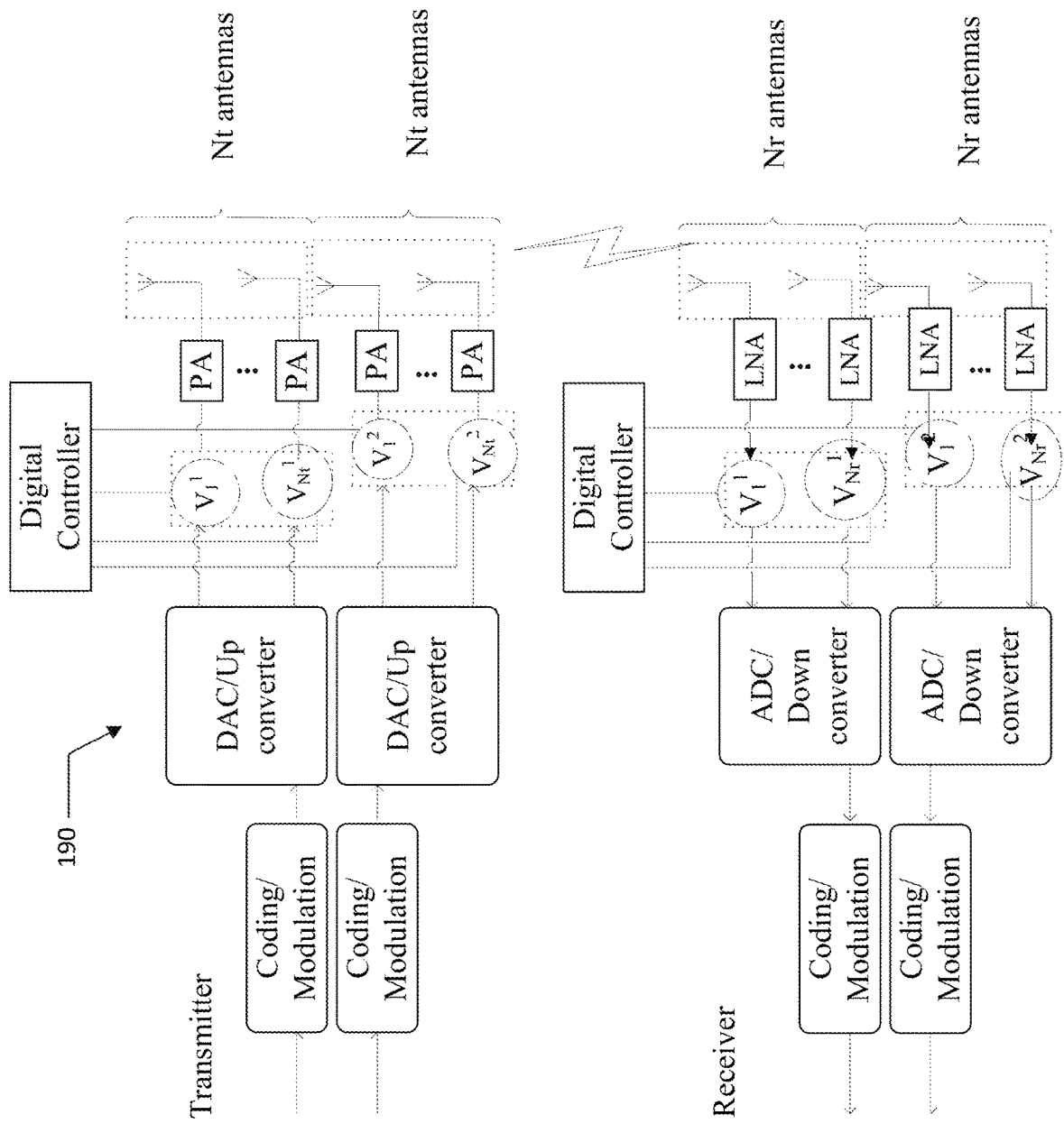
FIG. 10 depicts a second architecture having different Pas excited by separate weights.

Based on issues the analog beamforming found in IEEE 802.11ad, analog beamforming methods for 802.11ad+/802.11ay have been discussed in [7]. Implementations discussed include the following:

Spatial diversity with beam switching.
Spatial diversity with a single beam.
Weighted multipath beamforming training.
Beam division multiple access.
Single user spatial multiplexing.
Reduced Beamforming Training Overhead Two architectures are presented in [7], one with all physical antennas (PA) 180 excited by all the weights (shown in FIG. 9) while the second has different PAs 190 that are excited by separate weights (shown in FIG. 10).

In the present disclosure, embodiments for IEEE 802.11ad+/ay that utilize combinations of analog and digital precoding (hybrid mmWave precoding) to enable multi-stream/multi-user transmission are described.

Open Loop Vs Closed Loop MIMO for Spatial Multiplexing

Figure 11:
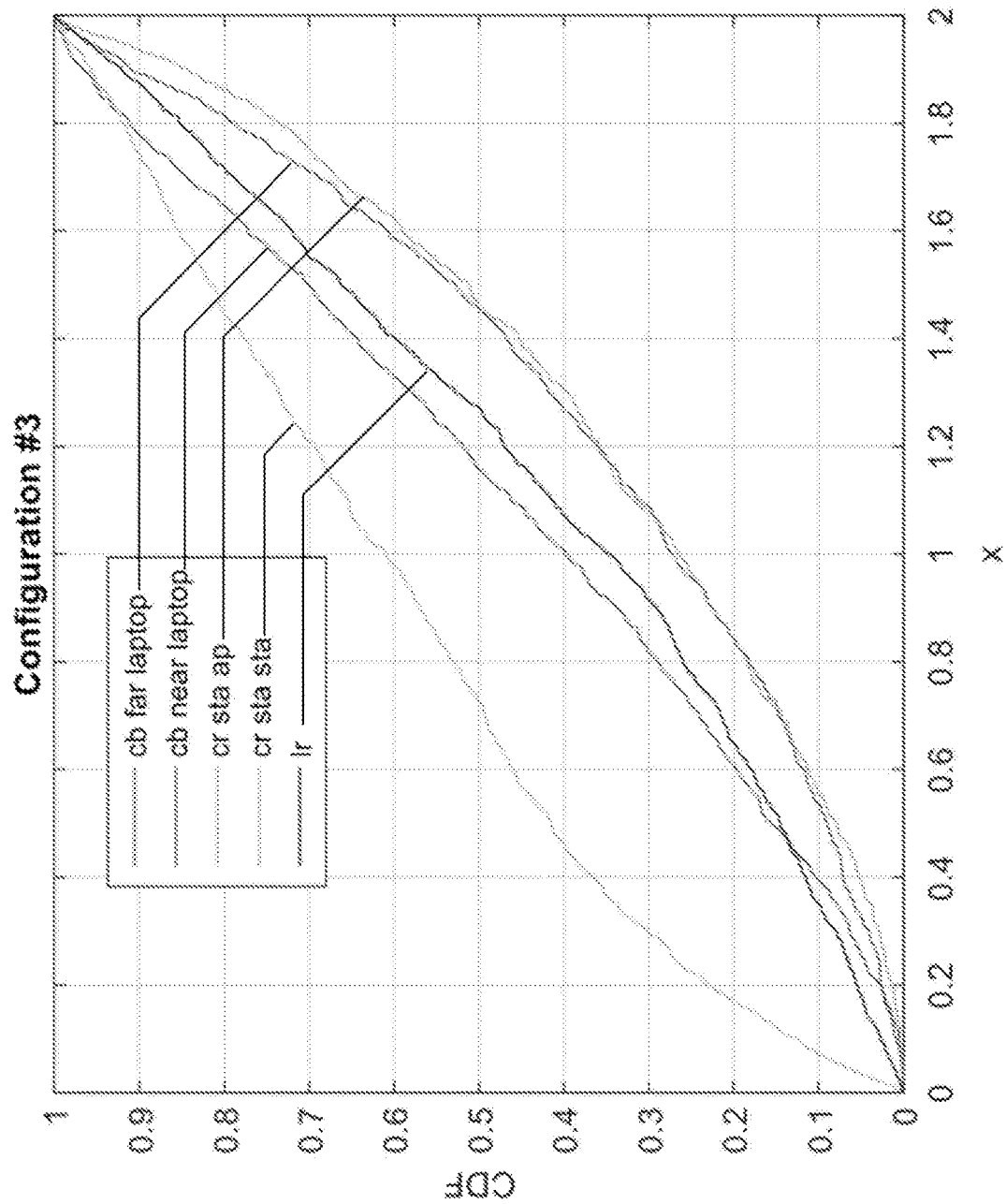
FIG. 11 depicts a cumulative distribution function of the average values of two off-diagonal entries of an $HH^H$ matrix.

The MIMO techniques based on channel state information (CSI) are commonly used in networks with multiple antennas at the transmitters and receivers to improve the spectral efficiency. They are typically implemented by using a CSI dependent precoder at the transmitter and a mechanism to feedback the CSI measured at the receiver or, assuming reciprocity of the channel, at the transmitter during the reception of feedback of other information from the receiver. For mmW systems, however, it may be too complicated to implement the closed loop process due to very wide bandwidth. Some may argue that, since in mmW system, the transmitter antenna can generate very narrow beams so that by aligning Tx and Rx antenna pairs there would be weak or no cross link interference between the beams. If this is the case, the MIMO channel matrix would be in a diagonal form and, therefore, using open loop multiplexing scheme would be sufficient. However, from simulation results obtained using the scenarios defined in the 802.11ad channel model with the associated antenna configuration, the probability of having a non-orthogonal channel matrix is very high. This means it would still be beneficial to use closed loop (e.g., CSI based channel precoding) MIMO schemes for spatial multiplexing. FIG. 11 shows the distributions (Cumulative Distribution Function—CDF) of the absolute values of the off-diagonal terms (off-diagonal entries of $HH^H$ matrix) of 1000 channel realizations for five different scenarios (cubical far laptop, cubical near laptop, conference room STA to AP, conference room STA to STA, living room).

802.11Ay MU-MIMO Beamforming Protocol Proposal

A beamforming protocol has been proposed to enable MU-MIMO in 802.11ay [8]. This Protocol is comprised of the following phases, executed in order:

Phase 1: SISO phase (mandatory). Note that in this phase, the Short Sector Sweep (SSW) frame is used and a group ID may be used to address multiple STAs at once. Feedback is based on polling each individual of the group. A Channel Measurement Feedback element, or a modified version of it, is included in the DMG SISO Setup Response frame and includes list of received I-TXSS sectors/antennas and their corresponding SNR/RSSI per RX antenna.

Figure 12A:
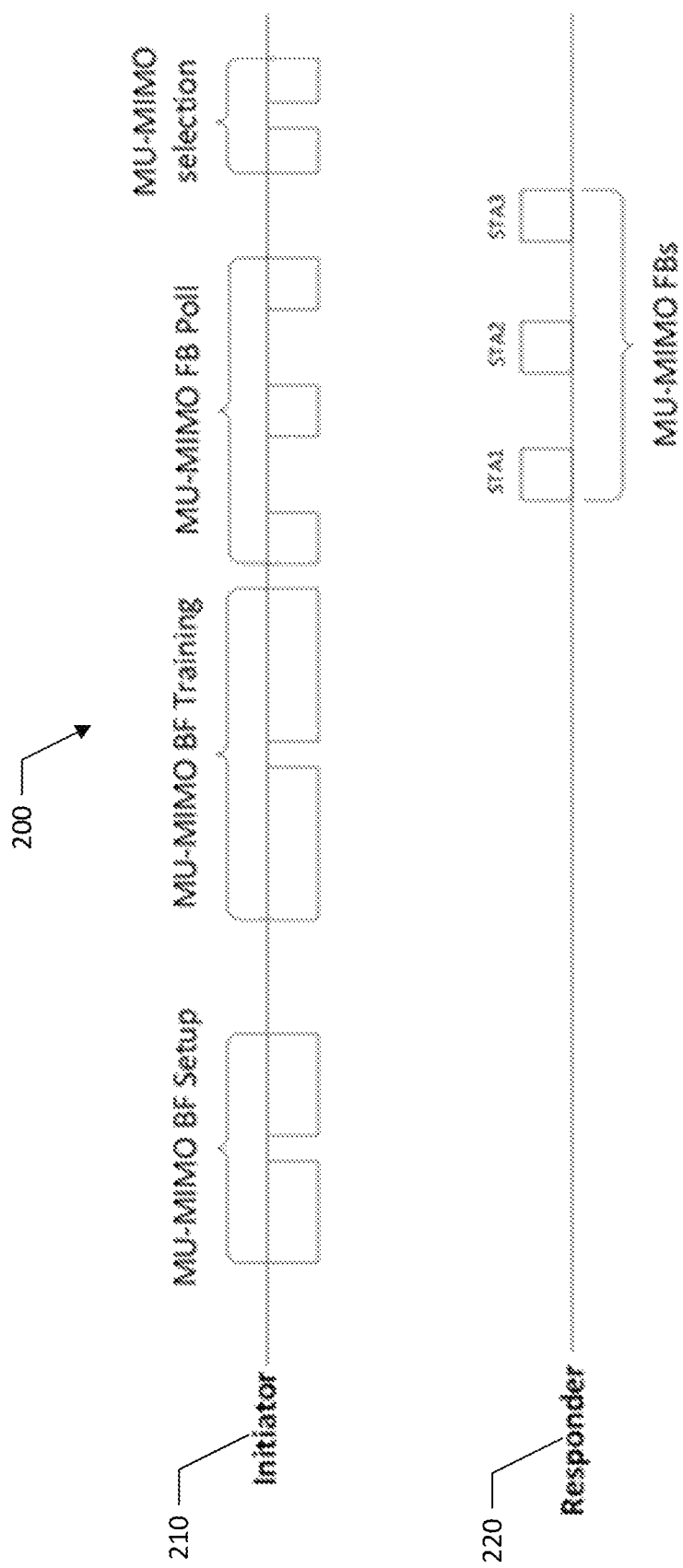
FIG. 12A depicts one embodiment of a Phase 2 MIMO phase.

Phase 2: MIMO phase (mandatory). The MIMO phase 200 comprises the following sub-phases, which are also illustrated in FIG. 12A:

BF Setup: Initiator 210 transmits this setup information in minimum set of frames in different antennas/sectors (sufficient to reach all responders 220).

Initiator 210 transmits MU-MIMO BF training, which are BRP frames with RX training fields appended.

Initiator polls MU-MIMO FBs (indicates FB formats and fields) and responder responds with MU-MIMO feedbacks.

Initiator 210 transmit MU-MIMO selection for sets of MU transmission configuration to all responders in minimum set of frames (sufficient to reach all intended responders).

Figure 12B:
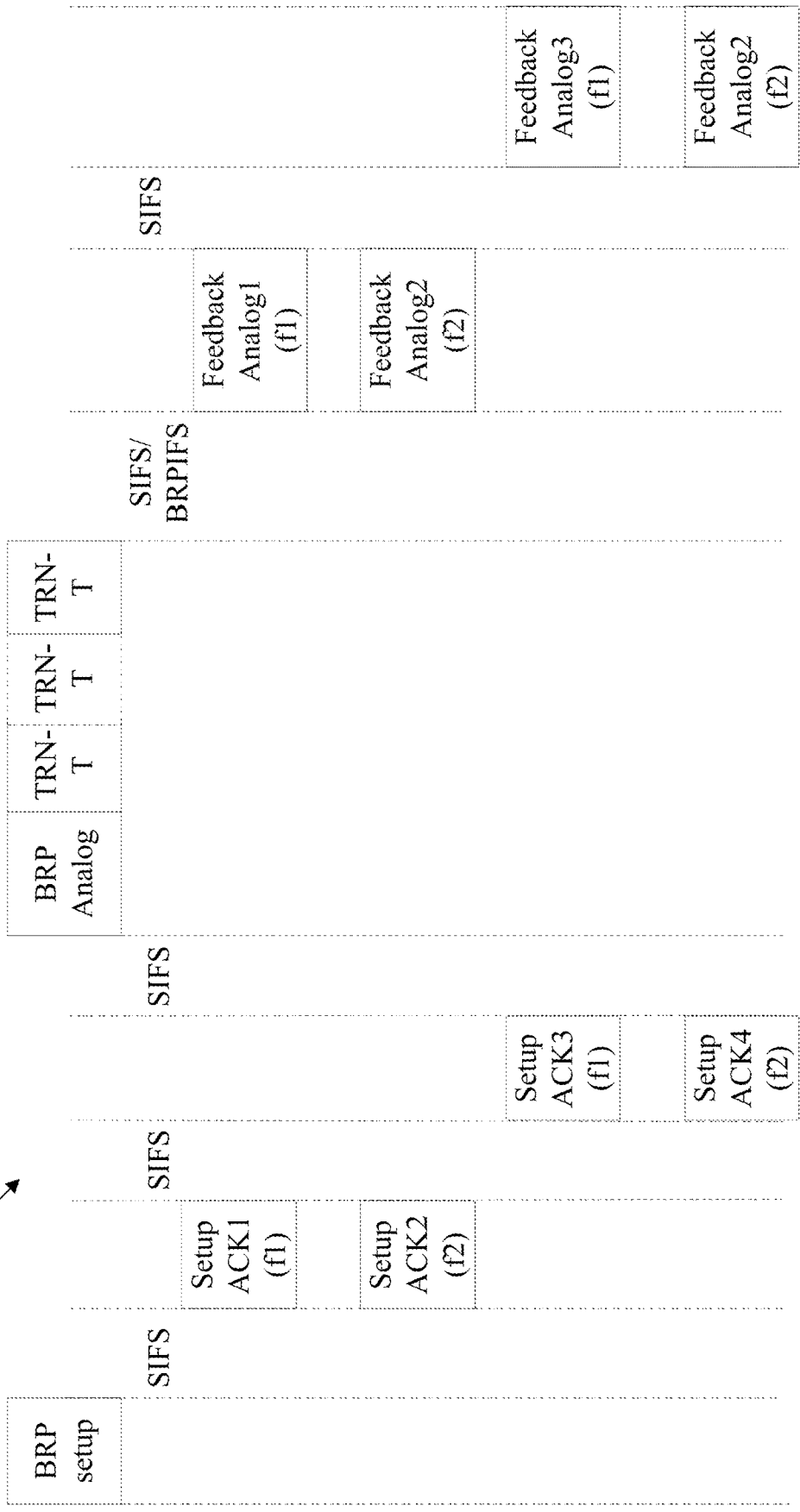
FIG. 12B depicts a sequence diagram for one embodiment of Phase 1 and Phase 2 frame transmission.

FIG. 12B illustrates a sequence diagram 230 for Phase 1 and Phase 2 transmissions.

Dimensionality of BRP Feedback for 802.11ay

In 802.11ad, the BRP selects best effective channels and optionally feeds back the actual channel. It differs from SLS by allowing feedback of all measurements.

Current 11ad feedback sends back the following dimensions:

PAA/eDMG antenna: captured in 802.11ad
Time or tap delay: captured in 802.11ad (see Table 1 below)
Channel Measurement
Feedback Element

TABLE 1

| Element ID Length | | |
|---|---|---|
| SNR | SNR1 | 8 bits |
| | SNR2 | 8 bits |
| | | 8 bits |
| | SNR (Nmeasure) | 8 bits |
| Channel Measurement | Chan Meas 1 | Ntaps × 16 bits |
| | Chan Meas 2 | |
| | Chan Meas (Nmeasure) | Ntaps × 16 bits |
| Tap Delay | relative delay 1 | 8 bits |
| | relative delay 2 | 8 bits |
| | | 8 bits |
| | relative delay (Ntaps) | 8 bits |
| Sector ID order | sector ID1 | 6 bits |
| | Antenna ID1 | 2 bits |
| | sector ID (Nmeasure/Nbeam) | 6 bits |
| | antenna ID (Nmeasure/Nbeam) | 2 bits |

Nmeasure: number of TRN-T elements
Time dimension captured in Ntaps
PAA dimension captured in number of SNR elements sent For 11ay, with the addition of polarization and the use of multiple antenna transmission, additional dimensions are fed back in some embodiments described herein. In addition, methods to reduce the amount of feedback are provided.

Enhanced BRP for 802.11ay

With the requirement for MIMO transmission, the BRP may be updated to enable identification of multiple beams from the sectors identified from the SLS or enhanced SLS. In addition, efficient feedback methods are provided to enable the baseband channel identification to allow for precoder design.

Baseband Feedback for SU-MIMO and MU-MIMO in 802.11ay Hybrid

Beamforming

In hybrid beamforming, a baseband beamformer or precoder is used with the analog beamformer to improve overall performance. In scenarios where there may be some change in the channel without any change in the analog beamformer used, a feedback mechanism is described herein for feedback of the effective channel without the need for an elaborate BRP procedure. This relates to baseband tracking of the link. As an example, SISO and MIMO phases presented in [8] set up the analog transmission. An additional phase may be used to enable tracking of the baseband channel without the need to reinitiate the analog setup phases. Hybrid beamforming may include the product of the effective baseband channel $H_{BB}$ and the Baseband beamformer $F_{BB}$. The hybrid beamforming may be represented as shown below:

$$Y = HF_A F_{BB} x + n; \text{ wherein } H_{BB} = HF_A$$

As shown above, H=the channel, $H_{BB}$=the effective baseband channel, $F_A$=the analog beamformer, $F_{BB}$=the Baseband beamformer, F=ideal baseband precoder, and $F_A F_{BB}$=the hybrid beamformer. and the $F_A F_{BB} \approx F$. In one case, the analog beamformer $F_A$ and the baseband beamformer $F_{BB}$ may be unknown. The channel H may be estimated. The ideal baseband precoder F may be designed for the channel H. The design between the analog beamformer $F_A$ and the baseband beamformer $F_{BB}$ may be derived from the ideal baseband precoder F. In another case, the analog beamformer $F_A$ and the baseband beamformer $F_{BB}$ may be unknown, and the channel H may be estimated. Further, the analog beamformer $F_A$ may be designed and the effective baseband channel $H_{BB}$ may be calculated. The baseband beamformer $F_{BB}$ may be designed from the effective baseband channel $H_{BB}$. In yet another case, the analog beamformer $F_A$ and the baseband beamformer $F_{BB}$ may be unknown. The effective baseband channel $H_{BB}$ may be estimated, and the baseband beamformer $F_{BB}$ may be designed from the effective baseband channel $H_{BB}$. The present invention can estimate the effective baseband channel $H_{BB}$ more efficiently by eliminating additional train-to-receiver (TRN) fields from training packets sent from the initiator 210 to the responder 220. In an optimized training packet, additional TRN Fields are eliminated to enable the effective baseband channel $H_{BB}$ to be estimated more efficiently. FIGS. 12A and 12B show optimized training packets in which additional TRN fields are eliminated to allow the effective baseband channel $H_{BB}$ to be estimated more efficiently. In some embodiments, the responder may comprise an analog beamformer configured with previously determined analog beam coefficients. The analog beamformer generates a beam-formed receive signal by processing the received training packet with the previously determined analog beam coefficients. The receiver portion of the responder device may also include a packet processor. The packet processor is configured to identify the presence of a digital baseband (DBC) tracking parameter that indicates that the DBC tracking should be performed. The responder may also include a baseband signal processor configured to determine a DBC estimate from a non-precoded training signal within the beam-formed receive signal. In addition, the responder includes a transmitter configured to transmit a feedback message having transmitter precoder data based on the DBC estimate.

Polled Feedback

In a scenario with multiple STAs, polling based feedback although simple and robust, may be inefficient. To improve the efficiency, multiple STAs may be polled simultaneously. Methods are disclosed herein to ensure proper separation and to manage the feedback in the cases where the length of the response frames may be different. Note that the difference in response may be because of (a) the MCS used, and/or (b) a difference in the number of Rx antennas at the STA.

Embodiments

Enhanced Beam Refinement Protocol Procedures

To identify the multiple beams used at the transmitter and receiver in creating a multiple antenna millimeter wave architecture and to identify the direct and cross terms of the effective channel between them, the disclosure herein describes improved baseline BRP procedure from that proposed in 802.11ad and changes to the BRP feedback are provided for multi-antenna transmission. Described herein are multiple embodiments of methods to enhance the BRP, including:

Exhaustive Enhanced BRP: In this method, the initiator and responder may sweep through all transmit beams and receive beams in all the sectors. The responder may then feedback all channel elements and AP may then use the feedback to construct channel at the transmitter.

Multi-stage Enhanced BRP: In this method, the initiator and responder may sweep through all the transmit beams and receive beams and identify the best pair. The best pair may then be fixed and the transmitter/receiver sweep through all the other beams and estimate the next best pair given the first pair. This procedure may be continued till the total number of streams desired is reached.

Exhaustive Enhanced BRP with multiple beam sweep: In this method, the initiator and responder may sweep through groups of transmit beams and receive beams (for example in pairs for a 2 stream transmission) in all the sectors. The responder may feed back all the information or may identify and feedback only best beam groups. This is a hybrid between pure SLS and BRP.

Figure 13:
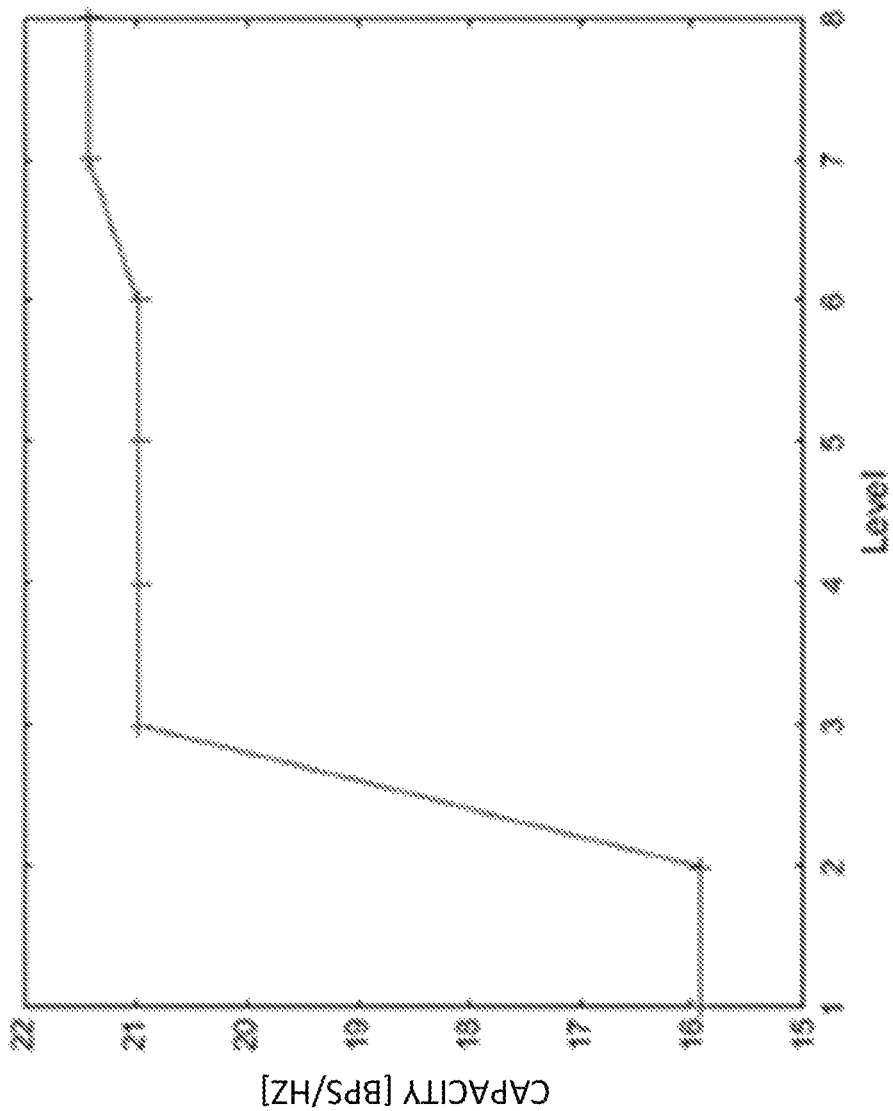
FIG. 13 depicts the link capacity as a function for beam refinement level.

FIG. 13 depicts the link capacity as a function of beam refinement level. To illustrate the benefits of the enhanced BRP procedure, FIG. 13 shows the capacity in bps/Hz for an exhaustive two beam sweep system. The x-axis represents successive beam refinement levels where each refinement level is defined by the angle spanned and the beam width of each beam as shown in Table 2.

In this example, the beams are exhaustively searched with a multiple antenna metric. As can be seen, the achievable capacity increases with increasing refinement. Table 2 below depicts the relationship between the level of refinement and corresponding angle span and beam width

TABLE 2

| Level | V-Pol | | H-Pol | |
|---|---|---|---|---|
| | Span | Beamwidth | Span | beamwidth |
| 1 | 180 | 45 | 360 | 360 |
| 2 | 180 | 45 | 180 | 45 |
| 3 | 90 | 22.5 | 180 | 45 |
| 4 | 90 | 22.5 | 90 | 22.5 |
| 5 | 45 | 11.25 | 90 | 22.5 |
| 6 | 45 | 11.25 | 45 | 11.25 |
| 7 | 22.5 | 5.625 | 45 | 11.25 |
| 8 | 22.5 | 5.625 | 22.5 | 5.625 |

Figure 14:
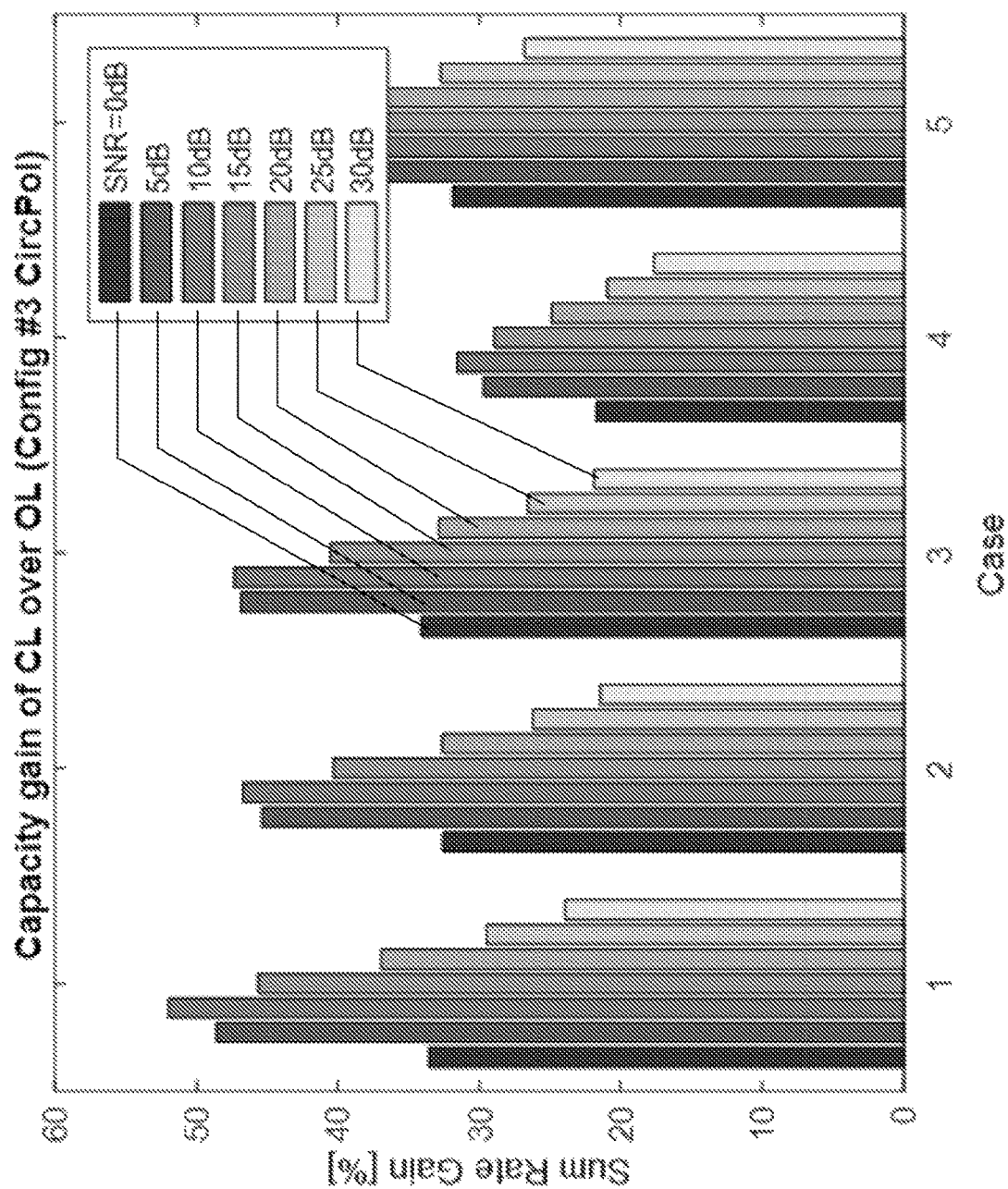
FIG. 14 depicts the link capacity gain of a closed loop SU-MIMO over open loop.

FIG. 14 shows the link capacity gain of closed loop SU-MIMO over open loop for antenna configuration #3 with circular polarized antenna. Cases 1-5 of FIGS. 15A-15E represent scenarios: 1) cubical far laptop, 2) cubical near laptop, 3) conference room station to AP, 4) conference room station to station, and 5) living room. These results show that the closed loop SU-MIMO could provide up to 50% more capacity gain than open loop SU-MIMO.

From the results shown FIG. 14, proper feedback may be desirable to provide a digital precoder that exploits the cross terms obtained in the MIMO channel from the analog beamformer.

Feedback Dimensionality and 802.11Ay Configurations

In 802.11ad, the PAA/eDMG and time or tap delay are captured in the BRP feedback. Each beam, PAA, eDMG antenna array or channel measurement feeds back N complex time or tap delays. To enable proper feedback in 802.11ay, methods described herein capture the additional dimensionality obtained by the allowance of multiple stream transmission (either through the use of channel components arriving at the same PAA from different directions, channel components arriving on different polarizations or channel components arriving at different PAAs/eDMG antennas). Further embodiments provide additional feedback dimensions to capture the use of antenna polarization and/or the use of multiple PAAs simultaneously during a transmission.
   a. If both polarizations are present, the effective channel is 2×2 per time dimension (to capture the cross polarization discrimination (xPD).
   b. if vertical or horizontal polarization only is present, the effective channel is 1×1 per time dimension.
   c. Note that for a multiple PAA configuration, the polarization and PAA dimensions may be collapsed. As an example, in configuration #4, the system may utilize 4×4 complex feedback.

To illustrate the additional feedback dimensions provided herein, the configurations that have been discussed in the 802.11ay will be described and embodiments having the dimensions applicable for each configuration are described.

Figure 15B:
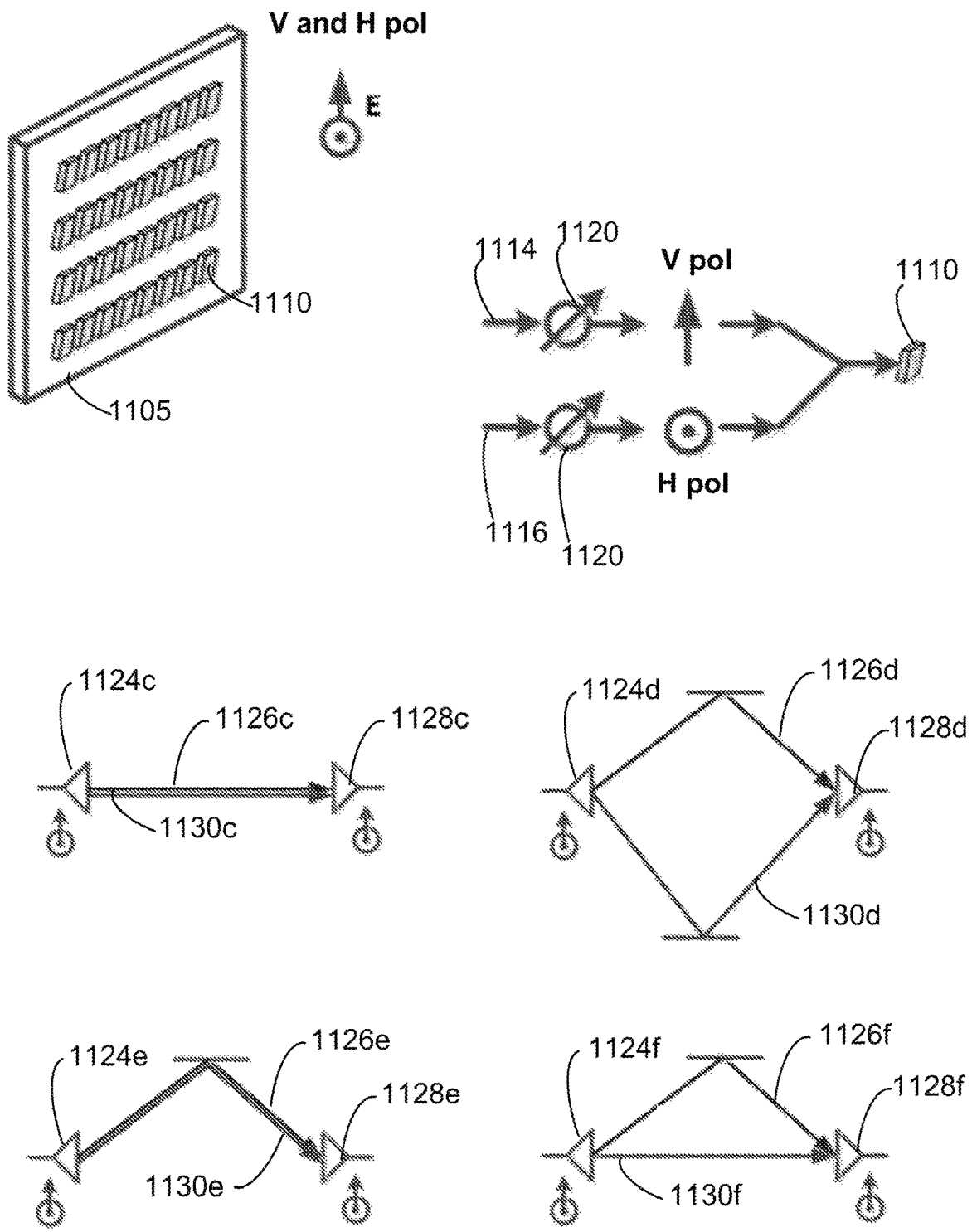
Figure 15C:
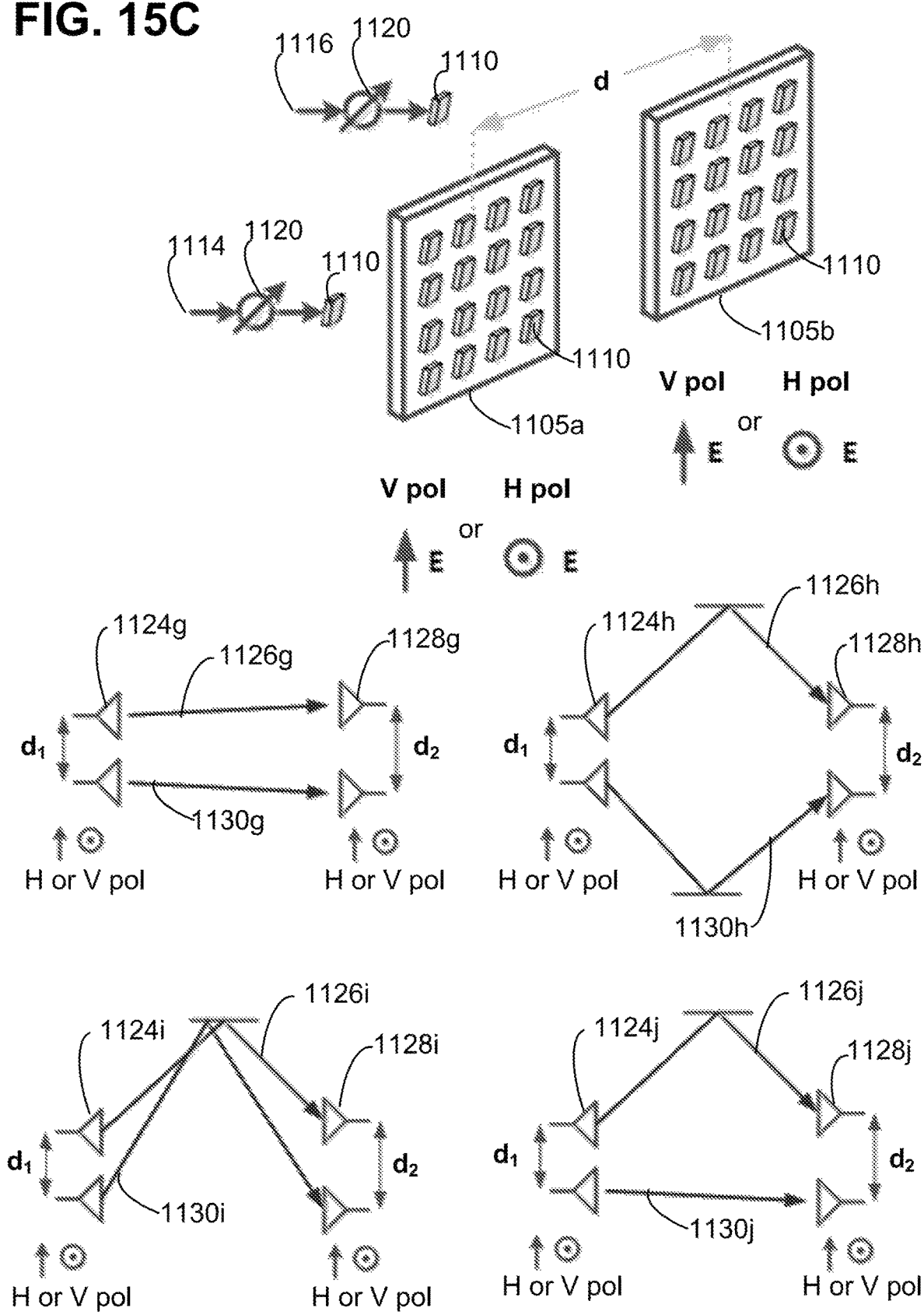
Figure 15D:
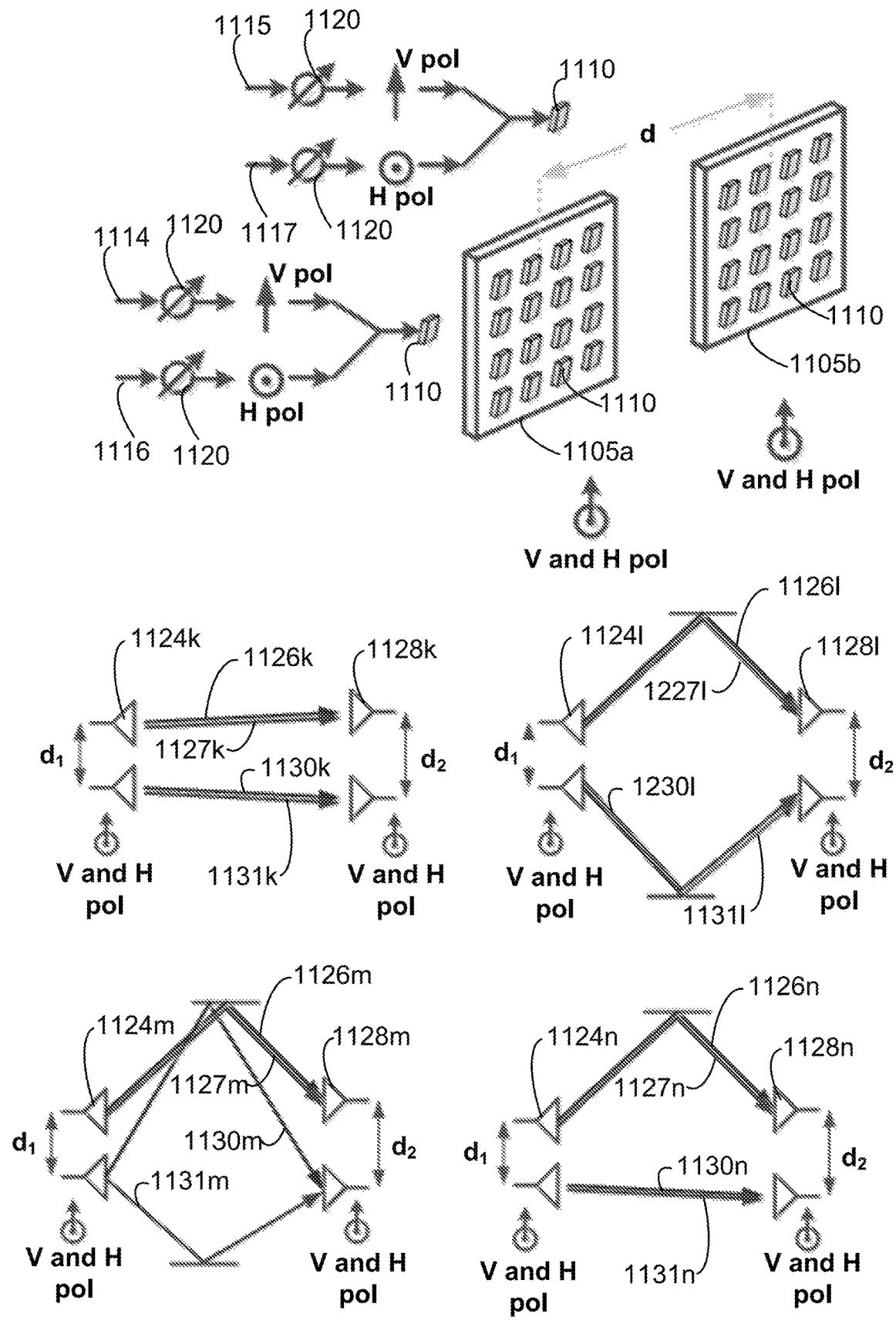

Configuration 1 of FIG. 15A:

In this configuration, each element has a single polarization (Vertical or Horizontal). Multiple stream transmission is created by directing beams to channel components that arrive from different directions (and arrive at different tap delays). Array 1105, signal streams 1114, 1116, phase shifter 1120, and PAA element 1110 are illustrated. Further, devices 1124b, 1128b, and signal beams 1126b and 1130b are illustrated. In addition, devices 1124a, 1128a and beams 1126a and 1130a are illustrated. The beams having polarizations V, H. In this case the dimensionality is 1×1 per time dimension, per PAA
   Overall: 1×1 per time dimension
   Configuration 2 of FIG. 15B In this configuration, each element has dual polarization (vertical and horizontal). Multiple stream transmission is created by directing beams to channel components that arrive from different directions (and arrive at different tap delays) and arrive on different polarizations. Devices 1124c, 1128c, and polarizations 1126c and 1130c are illustrated. Further, devices 1124d and 1128d and beams 1126d and 1130d are illustrated. In addition, devices 1124f, 1128f, and beams 1126f and 1130f are illustrated. FIG. 15B also illustrates devices 1124e, 1128e, and beams 1126e and 1130e. The beams having polarizations V, H. In this case the dimensionality is ×2 per time dimension, per PAA
   Overall: 2×2 per time dimension
   Configuration 3 of FIG. 15C In this configuration, each element has vertical or horizontal polarization V, H with multiple PAAs. Multiple stream transmission is created by directing beams between PAAs. The channel components on each PAA may arrive from different directions (and arrive at different tap delays). FIG. 15C illustrates array centers 1105a, 1105b. FIG. 15C also illustrates devices 1124g, 1128g, and beams 1126g, 1130g. Further, devices 1124h, 1128 h and beams 1124h, 1130h are illustrated. In addition, devices 1124i, 1128i and beams 1126i, 1130i are illustrated. FIG. 15C also illustrates devices 1124j, 1128j, and beams 1126j, 1130j. The beams having polarizations V, H. A distance d between array centers 1105a, 1105b is also illustrated. In this case the dimensionality is 1×1 per time dimension, per PAA
   Overall: 2×2 per time dimension
   Configuration 4 of FIG. 15D In this configuration, each element has dual polarization (vertical and horizontal) with multiple PAAs. Multiple stream transmission is created by directing beams to channel components that arrive from different directions (and arrive at different tap delays) and arrive on different polarizations from the different PAAs. FIG. 15D illustrates signal streams 1215, 1217. Further, devices 1124k, 1128k, and beams 1126k, 1127k, 1130k and 1131k. Further, devices 1124l, 1128l and beams 1126l, 1127l, 1130l and 1131l are illustrated. In addition, devices 1124m, 1128m, beams 1126m, 1127m and beams 1130m, 1131m are illustrated. FIG. 15D also illustrates devices 1124n, 1128n, and beams 1126n, 1127n, 1130n, and 1131n. The beams have polarizations V, H. In this case the dimensionality is ×2 per time dimension, per PAA
    Overall: 4×4 per time dimension
    Configuration 5 of FIG. 15E In this configuration, each element at the transmitter has vertical or horizontal polarization while each element at the receiver is dual polarized. FIG. 15E illustrates arrays 1206, 1207. Further, devices 1124p, 1128p and beam 1126p are illustrated. In addition, devices 1124o, 1128o and beams 1126o are illustrated. The beams have polarizations V, H. In this case, the transmission is single stream with multi-dimension reception at the reception. In this case the dimensionality is 1×2 per time dimension, per PAA (SIMO)
    Overall: 1×2 per time dimension
    Feedback for Exhaustive Search eBRP in Configuration #1

In this embodiment, described are feedback methods for exhaustive search BRP. In exhaustive search BRP, the initiator and responder may sweep through all combinations of transmit beams and receive beams in the sectors or beams selected by previous sector level sweep procedures or beam refinement procedures.

The BRP procedure may feed back all channel the direct and cross channel elements and the initiator may use the feedback to construct channel at the transmitter for further baseband precoder design. The updated feedback for a configuration #1 scenario is shown below:

Feedback characteristics
    element is 1×1
    Time dimension captured by tap delay
    May utilize implicit or explicit identification of receive beam due to the multiple streams.

Exemplary feedback for exhaustive search is shown below in Table 3 with the additional feedback elements shown in boldface:
Exhaustive BRP (All Tx beams, All Rx beams)

TABLE 3

| Element ID Length | | |
|---|---|---|
| SNR | SNR1 | 8 bits |
| | SNR2 | 8 bits |
| | | 8 bits |
| | SNR (Nmeasure) | 8 bits |
| Channel Measurement | Chan Meas 1 | Ntaps × 16 bits |
| | Chan Meas 2 | |
| | Chan Meas (Nmeasure) | Ntaps × 16 bits |
| Tap Delay | relative delay 1 | 8 bits |
| | relative delay 2 | 8 bits |
| | | 8 bits |
| | relative delay (taps) | 8 bits |
| Sector ID order | Tx sector ID1 | 6 bits |
| | Tx Antenna ID1 | 2 bits |
| | Rx sector ID1 | 6 bits |
| | Rx antenna ID1 | 2 bits |
| | Tx sector ID (Nmeasure/Nbeam) | 6 bits |
| | Tx antenna ID (Nmeasure/Nbeam) | 2 bits |
| | Rx sector ID (Nmeasure/Nbeam) | 6 bits |
| | Rx antenna ID (Nmeasure/Nbeam) | 2 bits |

In one embodiment, each channel tap is reported as an in-phase and quadrature component pair, with each component value represented as a twos complement number between −128 and 127. This is illustrated in Table 4 below:

TABLE 4

| Field | Size | Meaning |
|---|---|---|
| Relative I Component Tap #1 | Nr × Nt × 8 bits | The in-phase component of the MIMO impulse response for Tap #1, relative to amplitude of strongest I or Q measured |
| Relative Q Component Tap #1 | Nr × Nt × 8 bits | The quadrature component of the MIMO impulse response for Tap #1, relative to amplitude of strongest I or Q measured |

Figure 16:
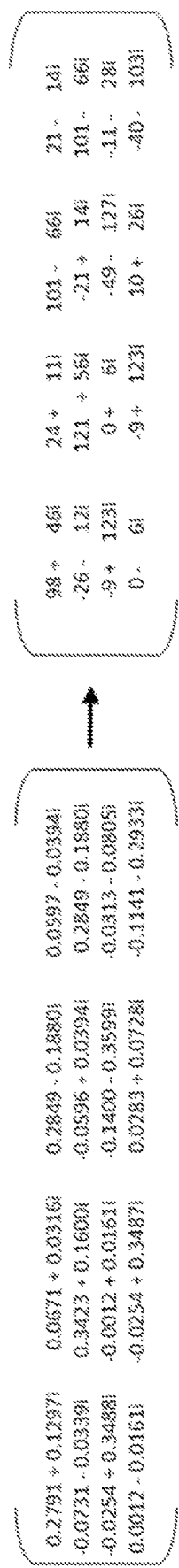
FIG. 16 depicts an exemplary embodiment of channel taps reported as in-phase and quadrature component pairs.

An example is shown in FIG. 16.

As the beam refinement levels increase, the difference between the channel measured at the previous and current level decreases. As such, differential or progressive feedback may result in feedback overhead reduction as the beam width reduces and the channel approaches the real channel. Reduction in the overhead may also be beneficial for beam tracking.

In this embodiment, fields are provided to:

(a) Dynamically change the size of the bit width of the channel feedback. This may be indicated in one or more additional field(s).

(b) Indicate that the channel measurement field is differential. Note that additional fields are provided in some embodiments to indicate the TxID and RxID pair that forms the baseline for the differential. In this example, the additional 16 bits signaled for the basis combined with the reduction in bitwidth per channel tap feedback may result in a reduction in the overall feedback.

In differential feedback, the STA feeds back the difference between the previous and current channel measurements. As the difference decreases, the feedback may be captured by smaller bit widths. In this case, the bitwidth of the feedback may be fed back. Note that for the differential feedback scenario, the original and differential feedback may be explicit representations of the original and difference channel.

In progressive feedback, the STA feeds back an index from a codebook that represents the difference between the previous and current channel measurements. As the difference decreases, the feedback may be captured by a smaller codebook. In this case, multiple codebooks may be defined and the codebook the feedback maps to may have to be fed back. Note that for the progressive feedback scenario, the original and progressive feedback may be implicit representations of the original and difference channels represented by various codebooks.

To enable differential or progressive feedback for a mm Wave system the following elements are defined for use in some embodiments: the information fed back; the information feedback type; and the baseline reference.

For the information fed back:

a. Differential information may be the SNR, the channel measurement, the tap delay and the sector ID of the baseline feedback.

b. In one example, the differential information fed back may be fixed and specified by a standard (e.g., SNR, channel measurement and/or tap delay).

c. In one example, the differential feedback information may be adaptively selected. Feedback frames may be defined that indicate the specific differential information fed back.

d. In one example, a 3-bit signaling field may be defined that indicates the specific information and the order in which the information is fed back.

For the information feedback type:

a. Given that there are three information types, both instantaneous and differential/progressive feedback may be used. For example, the SNR and channel feedback may be differential while the tap delay feedback may be original.

b. Signaling may be needed to indicate the information feedback type in this case.

For the baseline reference:

a. Differential or progressive feedback requires a baseline for comparison.

b. In one embodiment, the difference may be based in time, where feedback frames refer to previously fed back frames as the baseline. In this case, the feedback is not self-contained and may result in error propagation if one of the feedback frames in the sequence is lost.

i. It may be assumed that, in this case, the sector order ID and/or tap delay do not change, and so may not be fed back for overhead reduction.

Table 5 below shows an exemplary frame with adaptive absolute and differential/progressive feedback.

TABLE 5

Exemplary Adaptive Absolute and Differential/Progressive Feedback

| | | |
|---|---|---|
| Element ID | | |
| Length | | |
| Type | SNR, Channel Measurement, delay | |
| Size SNR | differential feedback size/codebook index | 3 |
| Size Channel Measurement | differential feedback size/codebook index | 3 |
| Size Delay | differential feedback size/codebook index | 2 |
| SNR type | absolute/differential | |
| Channel measurement Type | absolute/differential | |
| Delay Type | absolute/differential | |
| SNR | SNR1 | 3 bits |
| | SNR2 | 3 bits |
| | | 3 bits |
| | SNR (Nmeasure) | 3 bits |
| Channel Measurement | Chan Meas 1/Chan codeword 1 | Ntaps × 3 bits |
| | Chan Meas 2/Chan codeword 2 | |
| | Chan Meas (Nmeasure)/Chan codeword (Nmeasure) | Ntaps × 3 bits |
| Tap Delay | relative delay 1 | 2 bits |
| | relative delay 2 | 2 bits |
| | | 2 bits |
| | relative delay (taps) | 2 bits |
| Sector ID order | Tx sector ID1 | 6 bits |
| | Tx Antenna ID1 | 2 bits |
| | Rx sector ID1 | 6 bits |
| | Rx antenna ID1 | 2 bits |
| | Tx sector ID (Nmeasure/Nbeam) | 6 bits |
| | Tx antenna ID (Nmease/Nbeam) | 2 bits |
| | Rx sector ID (Nmeasure/Nbeam) | 6 bits |
| | Rx antenna ID (Nmease/Nbeam) | 2 bits |

The tables (6, 7 and 8) below show exemplary frames for SNR, channel measurement and delay with single information differential feedback and implicit baseline referencing. The receiver assumes the all other elements of feedback remain the same.

TABLE 6

Exemplary SNR differential feedback

| | | |
|---|---|---|
| Element ID | | |
| Length | | |
| Type | SNR | |
| Size | Size of differential feedback | 2 bits |
| SNR | SNR1 | 2 bits |
| | SNR2 | |
| | SNR (Nmeasure) | 2 bits |

TABLE 7

Exemplary SNR channel measurement feedback

| | | |
|---|---|---|
| Element ID | | |
| Length | | |
| Type | Chan Meas | |
| Size | Size of differential feedback | 2 bits |
| Channel Measurement | Chan Meas 1 | Ntaps × 2 bits |
| | Chan Meas 2 | |
| | Chan Meas (Nmeasure) | Ntaps × 2 bits |

TABLE 8

Exemplary relative delay differential feedback

| | | |
|---|---|---|
| Element ID | | |
| Length | | |
| Type | Relative delay | |
| Size | Size of differential feedback | 3 bits |
| Tap Delay | relative delay 1 | 3 bits |
| | relative delay 2 | 3 bits |
| | | 3 bits |
| | relative delay (taps) | 3 bits |

Feedback for Multi-Stage eBRP in Config #1

In this embodiment, we present feedback methods for multi-stage BRP. In the multi-stage BRP, within each BRP, the initiator and responder may select the best transmit and receive beams in stages rather than performing an exhaustive search.

In the first stage, they identify the best transmit receive pair. They then fix the best pair and find the next best pair given the first. This continues till the total number of pairs desired is reached.

The updated feedback for a configuration #1 scenario is described herein.

This embodiment includes feedback methods for exhaustive search BRP. In exhaustive search BRP, the initiator and responder may sweep through all transmit beams and receive beams in the sectors or beams selected by previous sector level sweep procedures or beam refinement procedures.

The BRP procedure may feed back all channel the direct and cross channel elements and the initiator may use the feedback to construct channel at the transmitter for further baseband precoder design. The updated feedback for a configuration #1 scenario is shown below:

a. Feedback for stage 1 with all Tx beams
  i. Element is 1×1; time is captured in the tap delay
  ii. Provide either implicit or explicit Rx beam identification
b. Feedback and fix best Tx/Rx beam
c. Feedback for stage 2: BRP for other beams with first fixed i. Embodiment 1: Element is 2×2; time is captured in the tap delay ii. Embodiment 2: Stage 1 Beam stores all the cross beam channels. On feedback of a 1×2 channel for during stage 2, the MIMO channel can be constructed iii. Provide Rx beam identification d. Select best MIMO channel e. Example feedback shown below in Table 9, for example multi-stage eBRP feedback:

BRP for all Tx beams,
single Rx beam (step 1)

TABLE 9

| Element ID | | Length |
|---|---|---|
| SNR | SNR1 | 8 bits |
| | SNR2 | 9 bits |
| | | 10 bits |
| | SNR (Nmeasure) | 11 bits |
| Channel Measurement | Chan Meas 1 | Ntaps × 16 bits |
| | Chan Meas 2 | |
| | Chan Meas (Nmeasure) | Ntaps × 16 bits |
| Tap Delay | relative delay 1 | 8 bits |
| | relative delay 2 | 8 bits |
| | | 8 bits |
| | relative delay (Nmeasure) | 8 bits |
| Sector ID order | Tx sector ID1 | 6 bits |
| | Tx Antenna ID1 | 2 bits |
| | Rx sector ID1 | |
| | Rx antenna ID1 | |
| | Tx sector ID (Nmeasure/Nbeam) | |
| | Tx antenna ID (Nmease/Nbeam) | |
| | Rx sector ID (Nmease/Nbeam) | 6 bits |

Note that the differential and progressive feedback may be used per stage. In one example, stage 1 may use non-differential feedback then stage 2 may be repeated multiple times with the first time non-differential and the subsequent times differential.

Feedback for Exhaustive eBRP with Multiple Beam Sweep in Config #1

As opposed to the exhaustive search method in which a single beam is swept through, the system may sweep through N beams simultaneously. In this case, the feedback is also modified to take the N simultaneous beams into consideration. The following procedure may be followed:

a. AP indicates to STA that it supports 2×2 system b. AP will send TRN-T with 2 orthogonal beams c. STA will sweep through 2-Rx beams per TRN-T element.

i. calculate and communicate this information d. Feedback i. SNR/Capacity feedback is for the MIMO channel ii. Element is 2×2 per time delay iii. Provide 2 Rx beam identification iv. Embodiments may feedback all or best Exemplary Feedback is shown below in Tables 10A and 10B for exhaustive eBRP with multiple beam sweep:

BRP for all pairs of
Tx beam, all pairs of
Rx beams
setup Ntx_beams x

TABLE 10A

| Element ID | | Length |
|---|---|---|
| SNR | SNR1_eff; Cap_eff1 | 8 bits |
| | SNR2_eff; Cap_eff2 | 8 bits |
| | | 8 bits |
| | SNR3_eff; Cap_eff3 (Nmeasure) | 8 bits |
| Channel Measurement | Chan Meas 1 | Ntaps × 2 × 2 × 16 bits |
| | Chan Meas 2 | |
| | Chan Meas (Nmeasure) | Ntaps × 2 × 2 × 16 bits |
| Tap Delay | relative delay 1 | 8 bits |
| | relative delay 2 | 8 bits |
| | | 8 bits |
| | relative delay (Nmeasure) | 8 bits |
| Sector ID order | Tx sector1 ID1 | 6 bits |
| | Tx Antenna1 ID1 | 2 bits |
| | Rx sector1 ID1 | 6 bits |
| | Rx antenna1 ID1 | 2 bits |
| | Tx sector2 ID2 | 6 bits |
| | Tx Antenna2 ID2 | 2 bits |
| | Rx sector2 ID2 | 6 bits |
| | Rx antenna2 ID2 | 2 bits |
| | Tx sector ID1 (Nmeasure/Nbeam) | 6 bits |
| | Tx antenna1 ID (Nmease/Nbeam) | 2 bits |
| | Rx sector ID1 (Nmeasure/Nbeam) | 6 bits |
| | Rx antenna1 ID (Nmease/Nbeam) | 2 bits |
| | Tx sector2 ID (Nmeasure/Nbeam) | 6 bits |
| | Tx antenna2 ID (Nmease/Nbeam) | 2 bits |
| | Rx sector2 ID (Nmeasure/Nbeam) | 6 bits |
| | Rx antenna2 ID (Nmease/Nbeam) | 2 bits |

Option 4 feed back best

TABLE 10B

| Element ID | | Length |
|---|---|---|
| SNR | SNR1_eff; Cap_eff1 | 8 bits |
| Channel Measurement | Chan Meas 1 | Ntaps × Ntx_beams × N_rx_beams × 16 bits |
| Tap Delay | relative delay 1 | 8 bits |
| | relative delay Nmeasure | 8 bits |
| Sector ID order | Tx sector1 ID1 | 6 bits |
| | Tx Antenna1 ID1 | 2 bits |
| | Rx sector1 ID1 | 6 bits |
| | Rx antenna1 ID1 | 2 bits |
| | Tx sector2 ID1 | 6 bits |
| | Tx Antenna2 ID1 | 2 bits |
| | Rx sector2 ID1 | 6 bits |
| | Rx antenna2 ID1 | 2 bits |

Note that the differential and progressive feedback frames may be used in this case as well.

eBRP Feedback for Configurations #2 Through #5 of FIGS. 15B-15E.

For Configuration #2:

This has both vertical and horizontal polarizations per antenna which implies 2×2 feedback elements per time dimension.

In the exhaustive search method, the system is configured to sweep all Vertical (V) or horizontal (H) beams at the initiator and at the responder.

In one embodiment, the feedback is set up so that a polarization at the transmitter identifies a 2-dimensional measurement at the responder corresponding to the direct polarization and the cross polarization.

In one embodiment, the receive polarizations are measured and fed back separately as additional measurements.

For Configurations #3, #4, and #5, define an extra PAAs which adds an extra eDMG antenna dimension or an extra measurement to the embodiments discussed above.

Feedback elements may be added per additional PAA/eDMG antenna or polarization dimension.

Baseband Channel Tracking and Feedback for Established Links

In the previous embodiments, the feedback needed for an enhanced BRP procedure was described. In another embodiment, described is the feedback needed for baseband precoding in a hybrid precoding scheme. Note that this is feedback that occurs after the analog beam setup. This may be after enhanced beam refinement in SU-MIMO transmission or after the MU-MIMO phase [8] in MU-MIMO transmission.

After the initial enhanced BRP and feedback, the AP may use the feedback to create the baseband precoder. However, in scenarios where there is no change in the analog beams needed, there may need to be an update of the effective baseband channel. In one embodiment, the following procedure may be used.

The initiator may announce that a baseband feedback update procedure is initiated. This may be by a special frame or by placing a flag in the BRP setup frame.

The AP may then start the baseband measurement. One of the following may be used. Option 1: A BRP setup frame may be sent by the initiator with a flag indicating that the both transmitter and receiver analog beams selected should not be changed (or that a specific set of analog beams may be used). The STA may then feed back the effective channel for those specific beams. The analog beams may be set up for SU-MIMO or baseband MU-MIMO. The BRP setup frame may be optional in the case that the AP and STA are known to be in the beam configuration desired. Option 2: A BRP setup frame may be sent by the initiator indicating that the receiver analog beams should not be changed (or a specific set of receiver analog beams may be used). The initiator may sweep multiple Tx beams downselected during the MU-MIMO phase (assuming analog MU-MIMO) or the eBRP refinement phase (assuming SU-MIMO). The STA may then feed back the effective channel for those specific beams. There may be a need to include the beam index with the TRN fields to enable the initiator to identify the Tx beams in the feedback. This differs from Option 1 based on the need to sweep a set of beams. Option 3: The initiator may send channel measurement frame(s) using the selected transmit-receive beam. The measurement frames may comprise a MIMO setup frame (to set up the desired beam configurations) and an 802.11ay preamble with no data present (for the actual channel measurement. In one embodiment, the setup frame and preamble frame may be combined. In some cases, the measurement frames may comprise 802.11 Null Data Packet Announcement Frame(s) and/or a Null Data packet frame(s). In these cases, the actual measurement frame (e.g., the NDP frame) may use a special set of orthogonal Channel Estimation Fields (CEF) in the preamble to enable the receiver to estimate the channel. This differs from the solutions in Option 1 and Option 2 that set the measurement fields after the packet (in the TRN field). The channel estimation fields may be orthogonal CEF fields transmitted simultaneously, or a single CEF field transmitted repeatedly.

The responder may then feed back the effective channel to the initiator. The feedback may be one or more of the following: Baseband feedback assuming single carrier waveform; Baseband feedback assuming OFDM; or Baseband feedback assuming OFDMA. For baseband feedback assuming single carrier waveform, the STA may feed back a time-domain representation of the MIMO channel as in the earlier embodiments. For baseband feedback assuming OFDM, the STA may feed back a frequency domain representation of the channel. 802.11ad/ay OFDM mode is made up of 336 data frequency tones. The feedback may be each individual tone or a single feedback value representing a group of tones. Note that due to the beamforming effect, the channel may be reasonably flat. In some embodiments, the AP or STA may negotiate the tone grouping value. For baseband feedback assuming OFDMA, the STA may feed back a frequency domain representation of a partial bandwidth of the channel. The BRP setup frame may request for a specific band. The bands requested may be less than 2.16 GHz or may be in chunks of 2.16 GHz.

In some cases, the frame initiating the baseband feedback request may not be heard (for example a case with multiple STAs in a beam-based multi-beam, multi-channel scenario). The initiator may fall back to a Quasi-Omni beam to send the setup frame then switch to the desired configuration for measurement and feedback.

Procedure for Baseband Channel Tracking and Feedback for Established Links

Herein described is a baseband channel tracking and feedback procedure for established links. The links may be for SU-MIMO transmission or MU-MIMO transmission.

For SU-MIMO transmission, this phase may be after an enhanced sector level sweep and enhanced Beam Refinement. For MU-MIMO, this may be after the SISO phase and MU-MIMO phase.

This may be defined as a Phase 3 tracking procedure in which SISO or MIMO baseband tracking is performed, e.g., Phase 3 in the MU-MIMO Beamforming Protocol.

Note that as these are established links where the analog beams have been refined (for SU-MIMO or MU-MIMO), the feedback is for the baseband channel given that the analog beams are fixed. Also, in some embodiments, the feedback may use frequency (for example bonded, aggregated, or OFDMA uplink transmission) or space (UL MU-MIMO) to improve the feedback efficiency.

Figure 17:
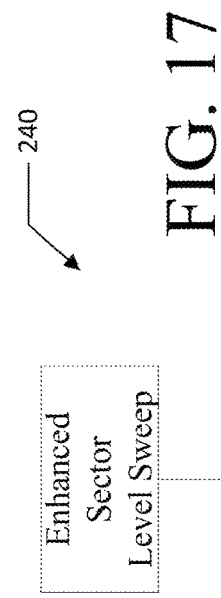
FIG. 17 depicts one embodiment of Phase 3 tracking for SU-MIMO in 802.11ay.
Figure 18:
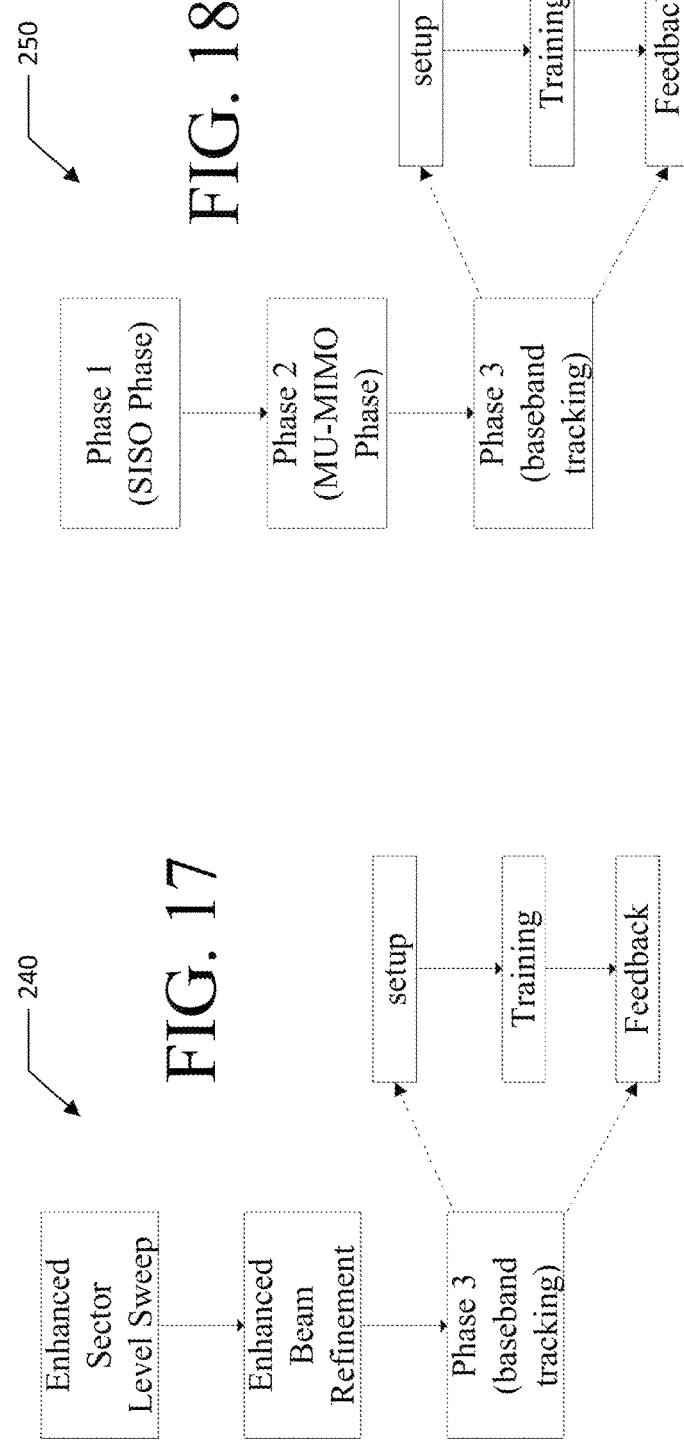
FIG. 18 depicts one embodiment of Phase 3 tracking for MU-MIMO in 802.11ay.

This phase may be comprised of a set-up sub-phase, a training sub-phase and a polling/feedback sub-phase. This is illustrated in FIG. 17 for SU-MIMO transmission 240 and FIG. 18 for MU-MIMO transmission 250.

The sub-phases are described as follows.

For a Phase 3 Setup Sub-phase, there may be a set-up for a single user for SU-MIMO, or for multiple users in MU-MIMO. A SU-MIMO setup frame may indicate to the STA the receive antenna configuration desired and the number of transmit antennas and may be transmitted as a BRP setup frame (for options 1 or 2) or as an NDP announcement frame (option 3). A MU-MIMO setup frame may indicated the STAs that will be tracked, the corresponding receive antenna configurations expected and the number of Tx sectors that will be trained.

In one embodiment, each STA may be polled independently to prepare it for the training phase.

In one embodiment, the setup phase may be skipped. This may occur in cases where the initiator and responder(s) are in the middle of a transmission.

In one embodiment, a group based ID (as used in Phase 1) may be set, but with an indication of the expected receive antenna configuration. The information transmitted may include:

TA: BSSID
RA: Group ID
Purpose: SU/MU-MIMO BF setup Phase 3
Sequence Number: identify which BF training (phase 3)
TX-Antennas/Selected Sectors/Simultaneous TX antennas (Orthogonal Waveforms) training
Rx setup desired
BRP TRN-T
$BRP_1$: An (No of MUX ants in BRP frame 1), Ant index $X_i$, sector index S1, S2, . . . , Sn, Ant index $X_j$, sector index S1, S2, . . . , Sm, . . . .
. . . .
$BRP_k$: An (No of MUX ants in BRP frame 1), Ant index $X_i$, sector index S1, S2, . . . , Sn, Ant index $X_j$, sector index S1, S2, . . . , Sm, . . . .

In one embodiment, an SU-MIMO/MU-MIMO setup ID (as used in Phase 2) may be sent, but with an indication of the expected receive antenna configuration. The information transmitted may include:
RA: Group ID
TA: BSSID
Purpose: SU/MU-MIMO BF setup Phase 3
N: number of MU-MIMO Transmission Configurations
MU-MIMO Config_ID:
ID1: (BF1, TX Ant_Sec_ID1/SS_ID1, STA_ID1, RX Ant_Sec_ID1); . . . .
ID2: (BF2, TX Ant_Sec_ID2/SS_ID2, STA_ID2, RX Ant_Sec_ID2), . . . .

For a Phase 3 training sub-phase, the initiator may transmit the BRP training sequences based on the setup sub-phase.

Figure 19:
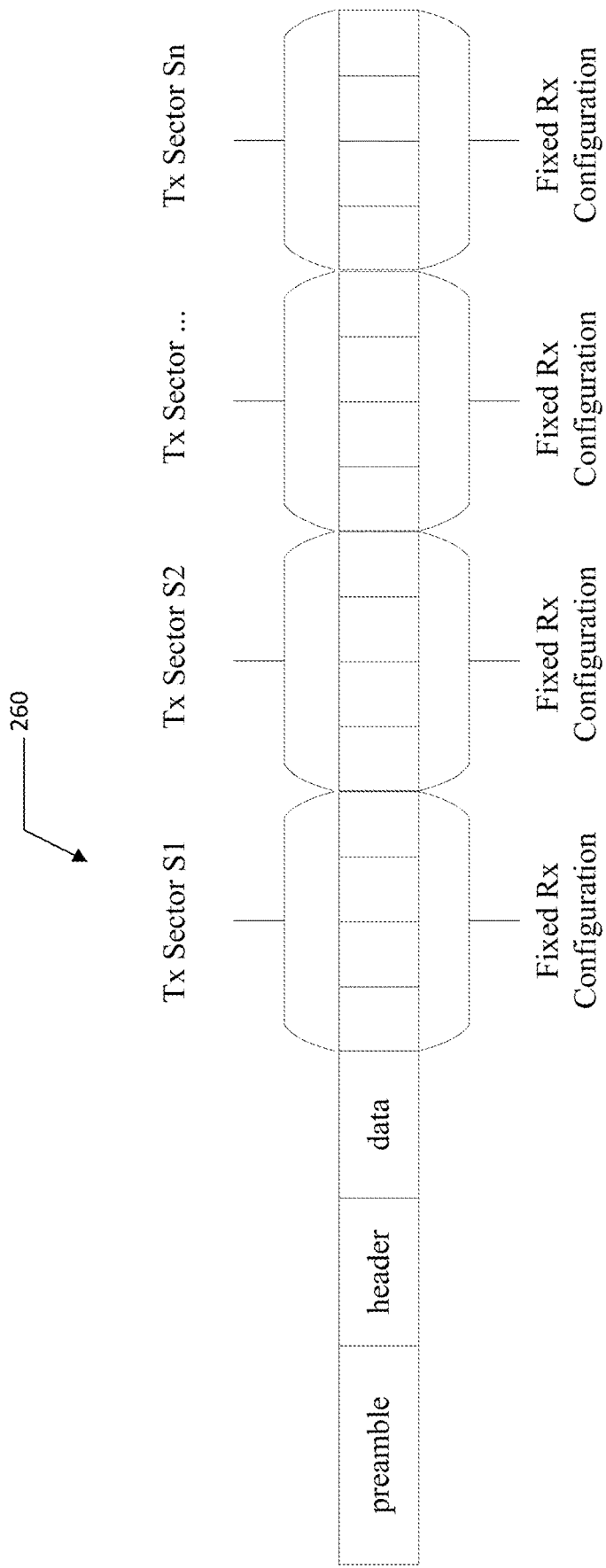
FIG. 19 depicts one embodiment of TRN based training.
Figure 20:
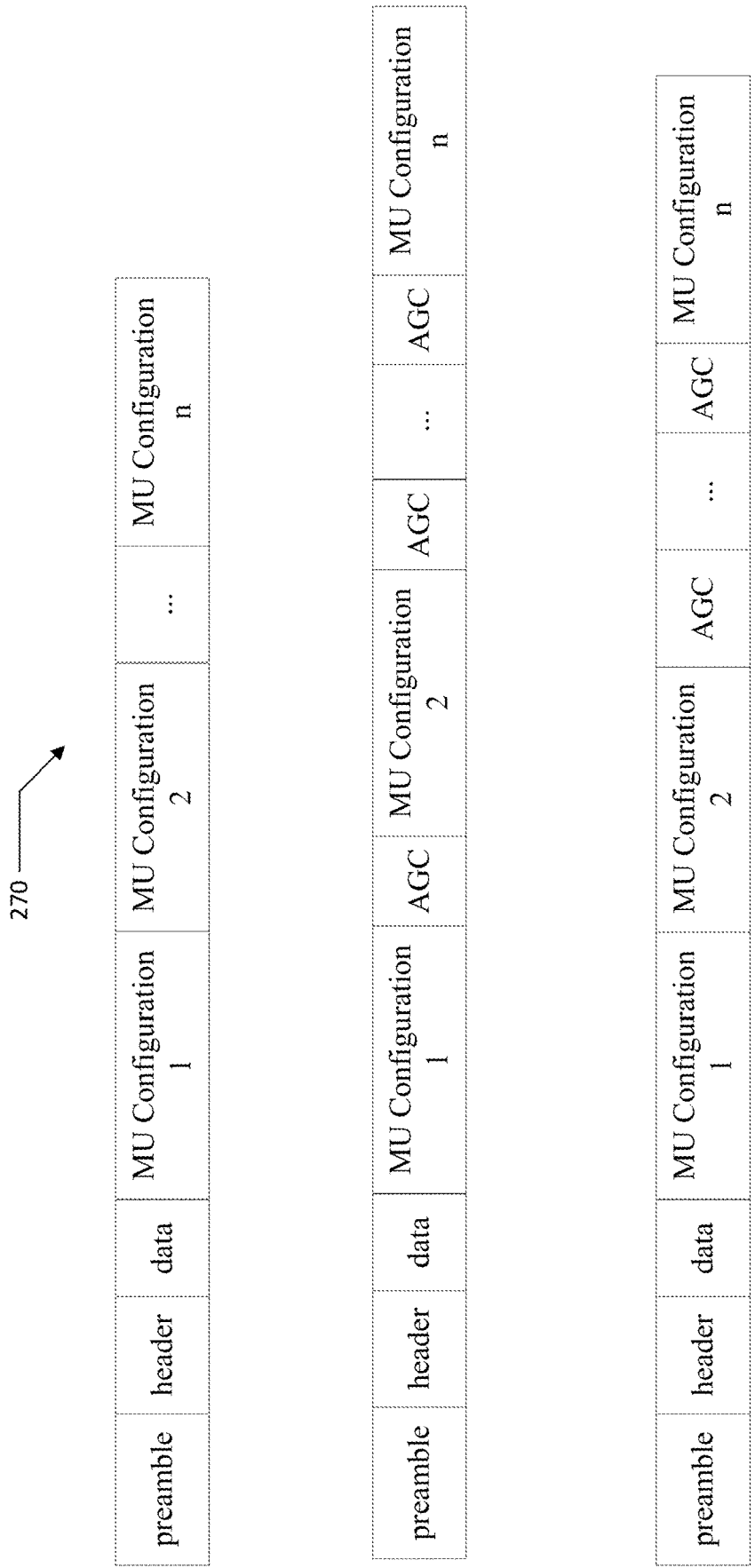
FIG. 20 depicts one embodiment of frames for multiple MU-MIMO configurations.

As shown in FIG. 19, for BRP based training 260, the initiator 210 may transmit a BRP frame with TRN fields that sweep through Tx sectors with training fields for selected Tx sectors for a fixed Rx antenna configuration at full bandwidth. Note that the TRN fields for each sector may train multiple Tx sectors by using orthogonal TRN sequences, i.e., a BRP frame for one Tx sector or multiple Tx sectors (with orthogonal waveforms). In some cases, the number Rx TRN should be fixed based on the transmission configuration. In scenarios where there are multiple MU-MIMO configurations in the setup frame, each configuration 270 may be trained separately, as shown in FIG. 20. Note that in cases where there may need to be some time given to the STA(s) to change antenna/sector configuration, a dummy transmission or padding (e.g., STF or AGC) may be placed between each training sub-frame. In one embodiment, this dummy transmission or padding may be mandatory. In another embodiment, this dummy transmission or padding may be optional, with the presence/absence of a padding field either blindly detected or signaled in the setup frame.

For Null Data Packet based training, the initiator may transmit a Null Data Packet frame with the EMDG CEF set to the CEF required for SU-MIMO/MU-MIMO transmission, and the initiator and responder EMDG antenna configurations set to the configurations for the desired transmission.

Note that in the training mode, other STAs that overhear these transmissions may opportunistically train their links based on the sectors chosen.

Figure 21A:
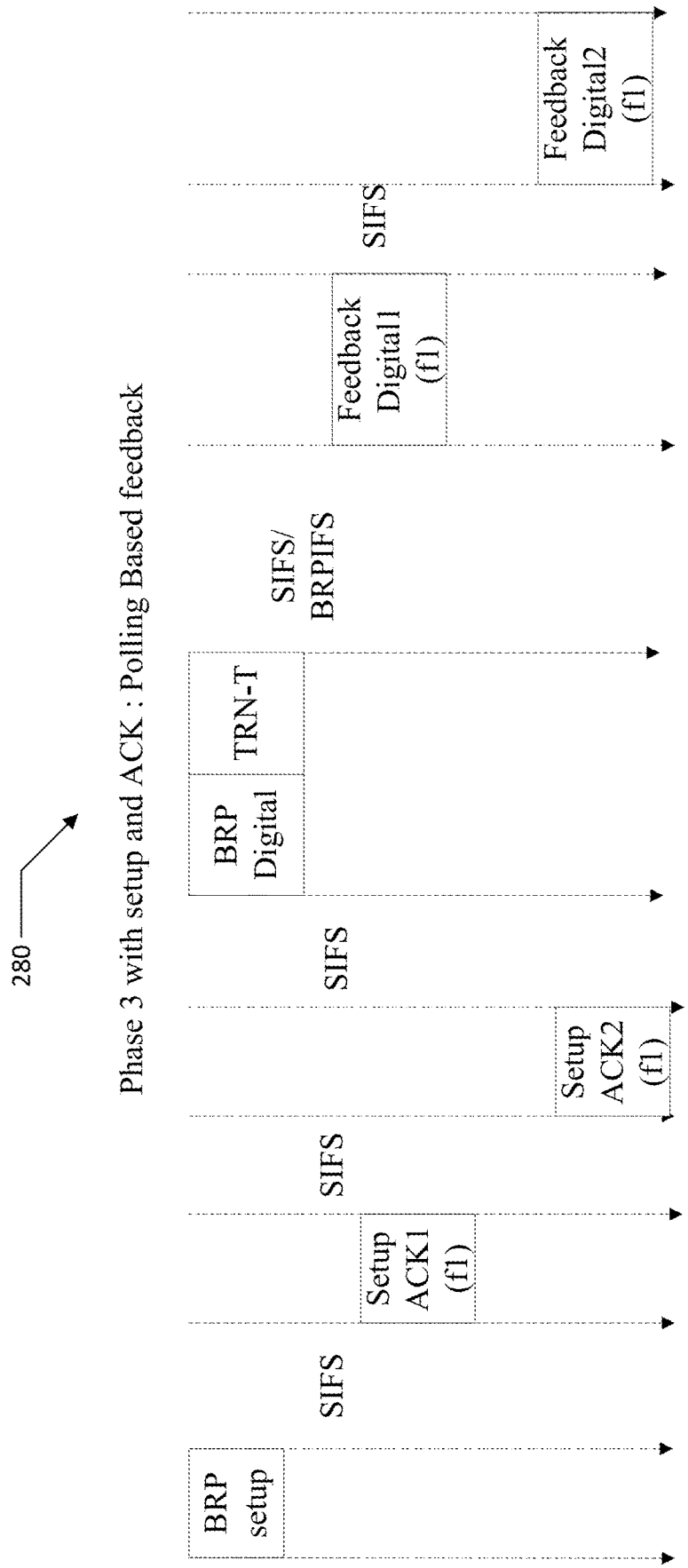
FIG. 21A depicts an exemplary procedure for Phase 3 with setup and ACK: Polling based feedback.
Figure 21B:
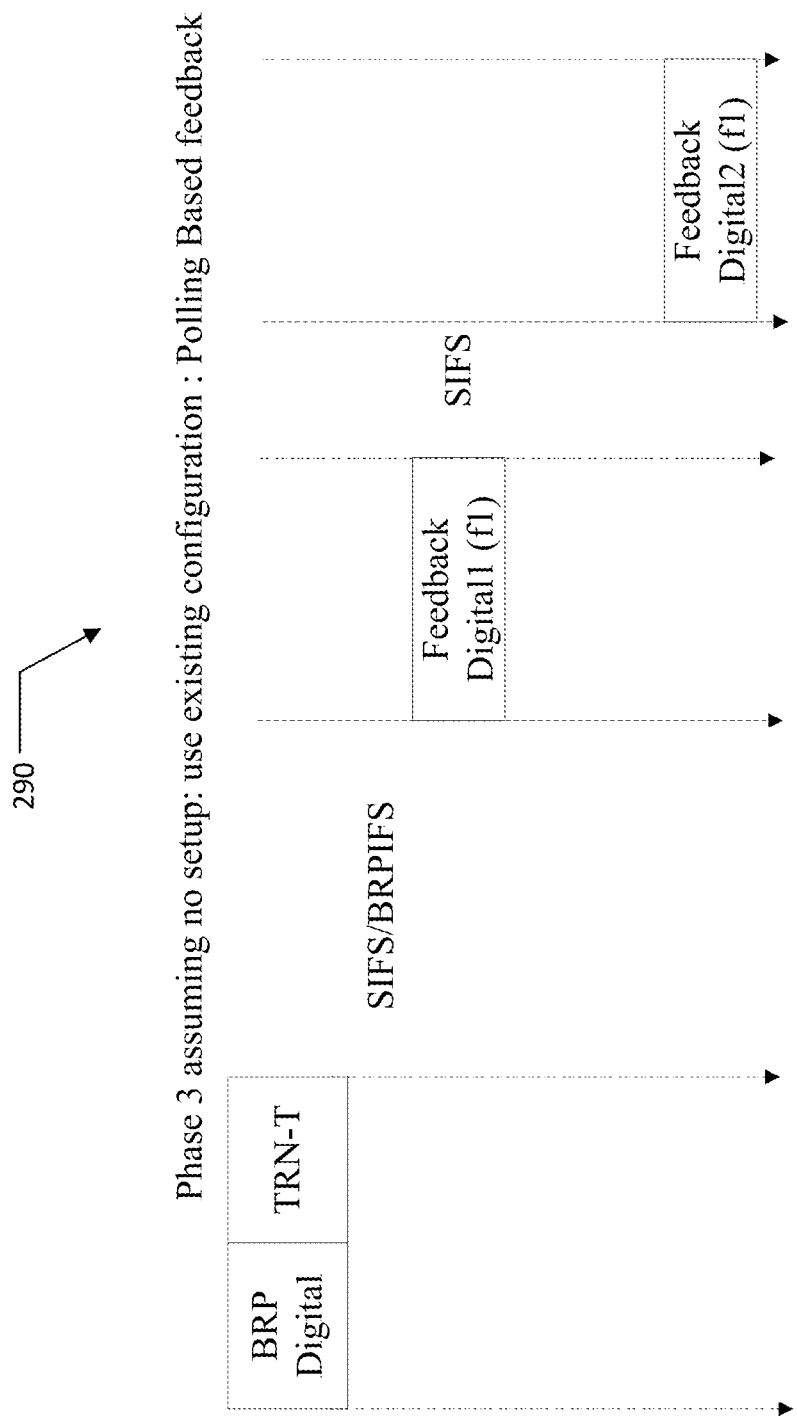
FIG. 21B depicts an exemplary procedure for Phase 3 with polling but no setup, where the existing configuration is used.
Figure 22:
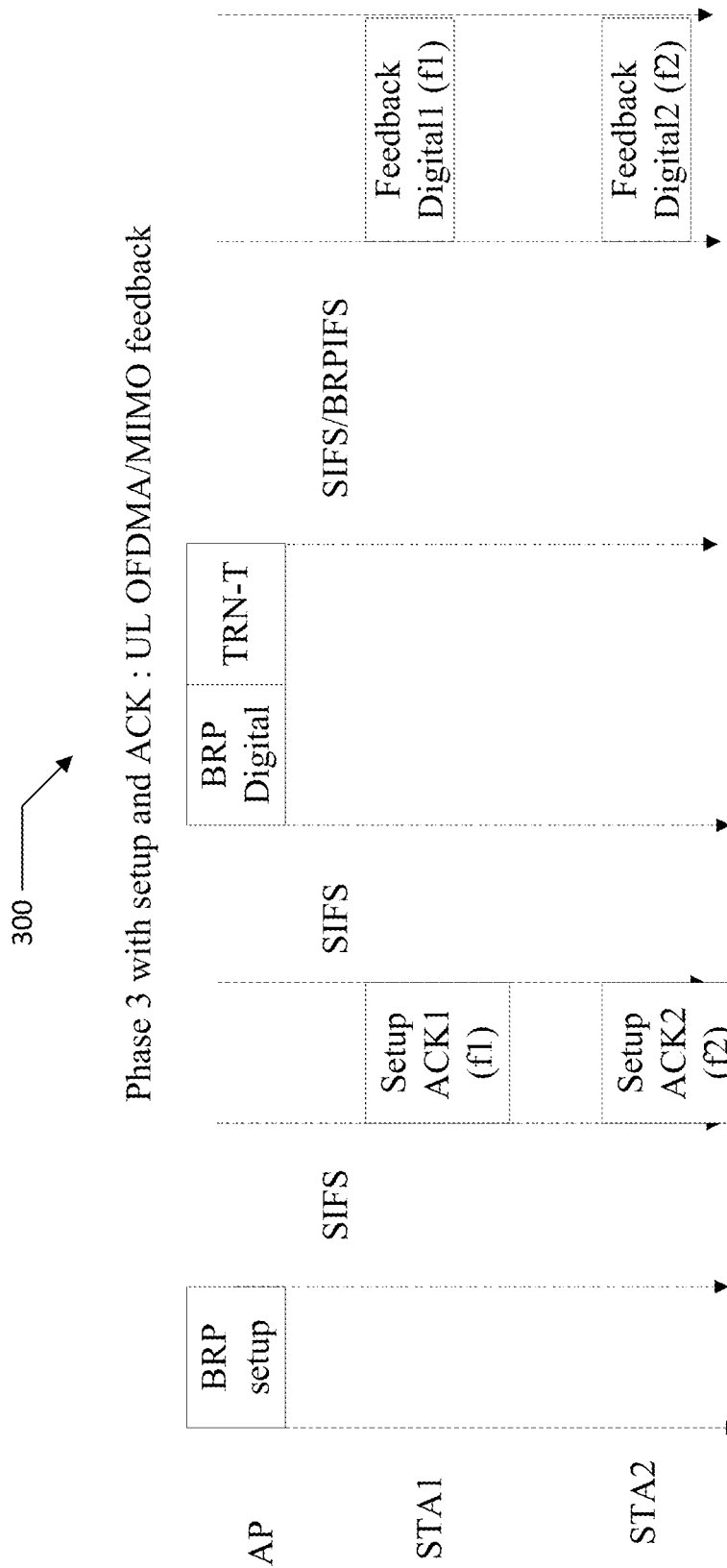
FIG. 22 depicts an exemplary procedure for Phase 3 with UL OFDMA/MIMO feedback.
Figure 23:
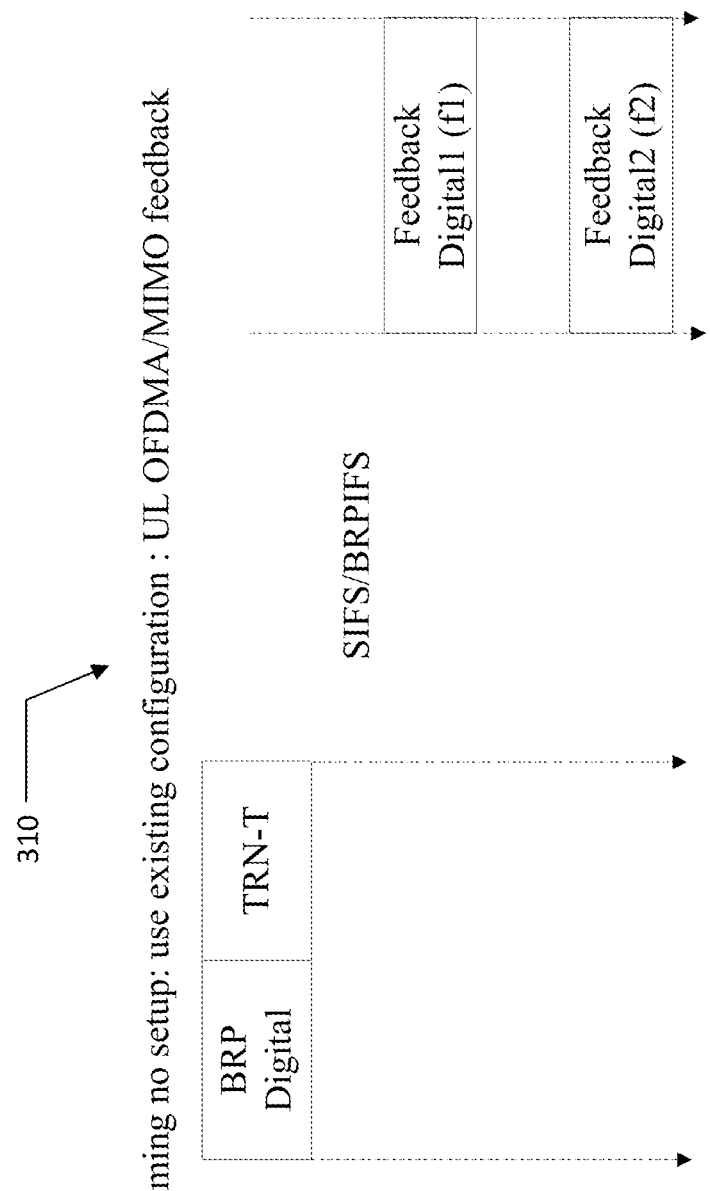
FIG. 23 depicts an exemplary procedure for Phase 3 with UL OFDMA/MIMO feedback and no setup frame.

For a Phase 3 Feedback sub-phase 280, 290 shown in FIGS. 21A and 21B respectively, this can be based on simple polling as in the Phase 1/Phase 2 feedback. Such a procedure is illustrated in FIGS. 21A and 21B. Given that beams are known (and especially if beam reciprocity is applicable), efficiency may be improved by using: UL MU-MIMO/beam, and/or UL OFDMA, UL channel aggregation/bonding. This is illustrated in FIGS. 22 and 23 wherein a Phase 3 with a setup 290 and a Phase 3 with no setup 300 are illustrated respectively.

Analog and Digital Baseband Tracking for 802.11Ay

A consolidated BF training protocol for use during the DTI period of the beacon interval was proposed for MU-MIMO beamforming in [1]. The protocol is comprised of:
Phase 1: SISO phase (mandatory)
Phase 2: MIMO phase (mandatory)
For SU-MIMO beamforming the following phases have also been proposed [2]:
Phase 1: Sector Level Sweep (SLS)
Phase 2: Tx-Rx Sector/antenna Mapping
Others: TBD As disclosed herein, there is an analog and a digital baseband channel tracking a tracking phase to allow for tracking and channel update purposes, which uses a common framework for both SU-MIMO and MU-MIMO tracking.

In 802.11ad, the beam identification phases are: SLS, BRP, and Beam Tracking.

Figure 24:
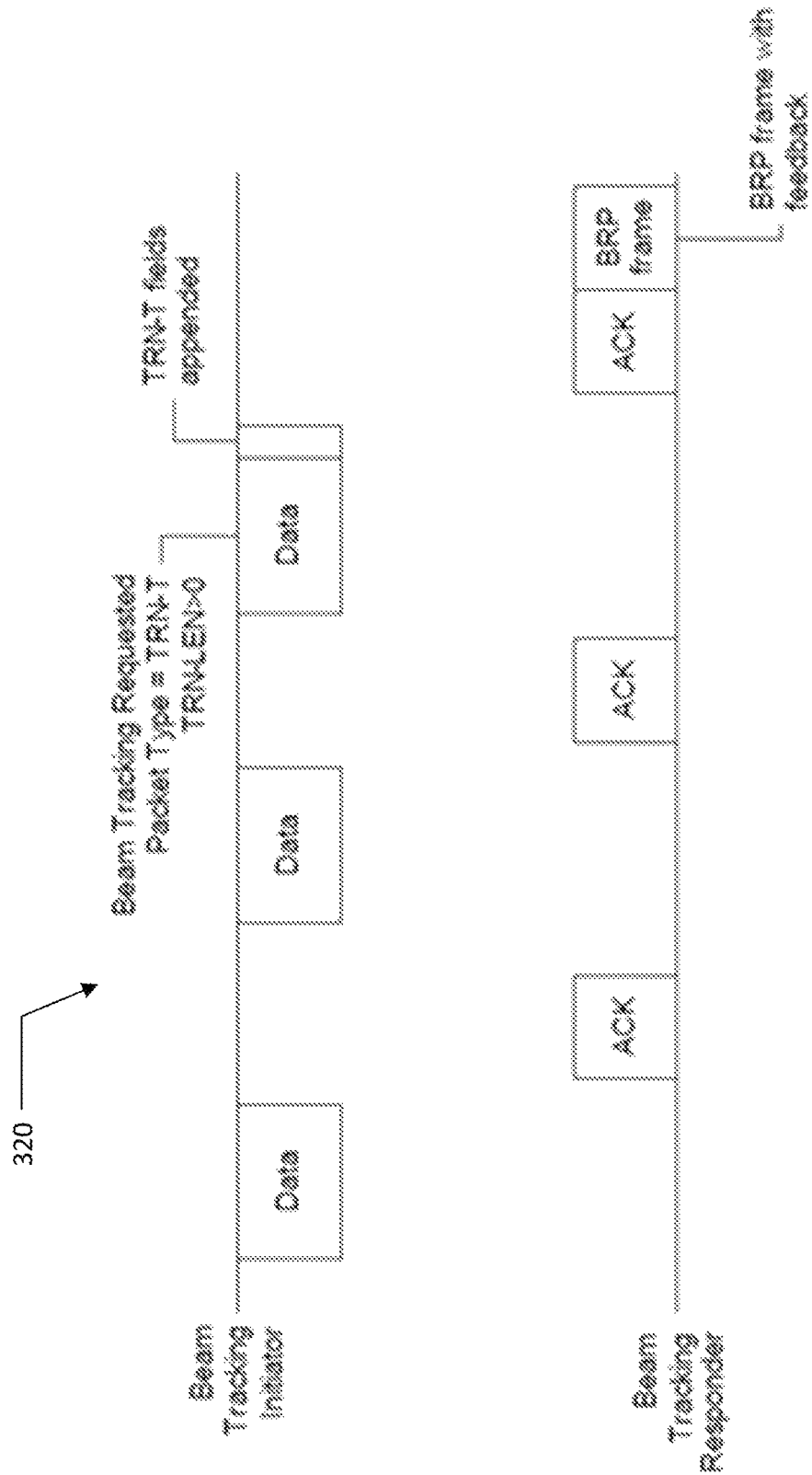
FIG. 24 depicts an exemplary beam tracking procedure with the initiator requesting TRN-T.

Beam tracking is primarily for identifying the best beam for transmission and is comprised of setup, training and feedback sub-phases: setup, training, and feedback. An exemplary beam tracking procedure 310 where an initiator 210 requests TRN-T is depicted in FIG. 24.

During a setup sub-phase, an initiator 210 requesting Tx beam tracking sets parameters in a transmitted packet, for example:
BEAM_TRACKING_REQUEST: Beam tracking requested
Packet Type: TRN-T-PACKET
TRN-LEN: number of TRN-T fields During a training sub-phase, the initiator 210 may append an AGC field and TRN-T subfields to the packet.

During a feedback sub-phase, a responder 220 feeds back the channel to the initiator 210. The feedback type may be the same as the feedback type in the last BRP frame that was transmitted from the initiator 210 to the responder 220 with TX-TRN-REQ equal to 1. In some cases, if the responder 220 has never received a BRP frame from the initiator 210 with TX-TRN-REQ equal to 1, the responder 220 may instead respond with the best sector.

For 802.11ay, two types of beam tracking can be defined: Analog Beam Tracking (AB); and Digital Baseband Channel Tracking (DBC).

AB tracking may be used to track the change in analog beams, such as due to STA rotation or movement. This may be similar to 802.11ad tracking, but updated for SU/MU-MIMO.

DBC tracking may be used to track the change in the baseband channel for a fixed set of analog beams, such as due to beam blockage when using hybrid beamforming. This may simplify tracking by simplifying setup and enabling use of CEF and a feedback request.

Figure 25:
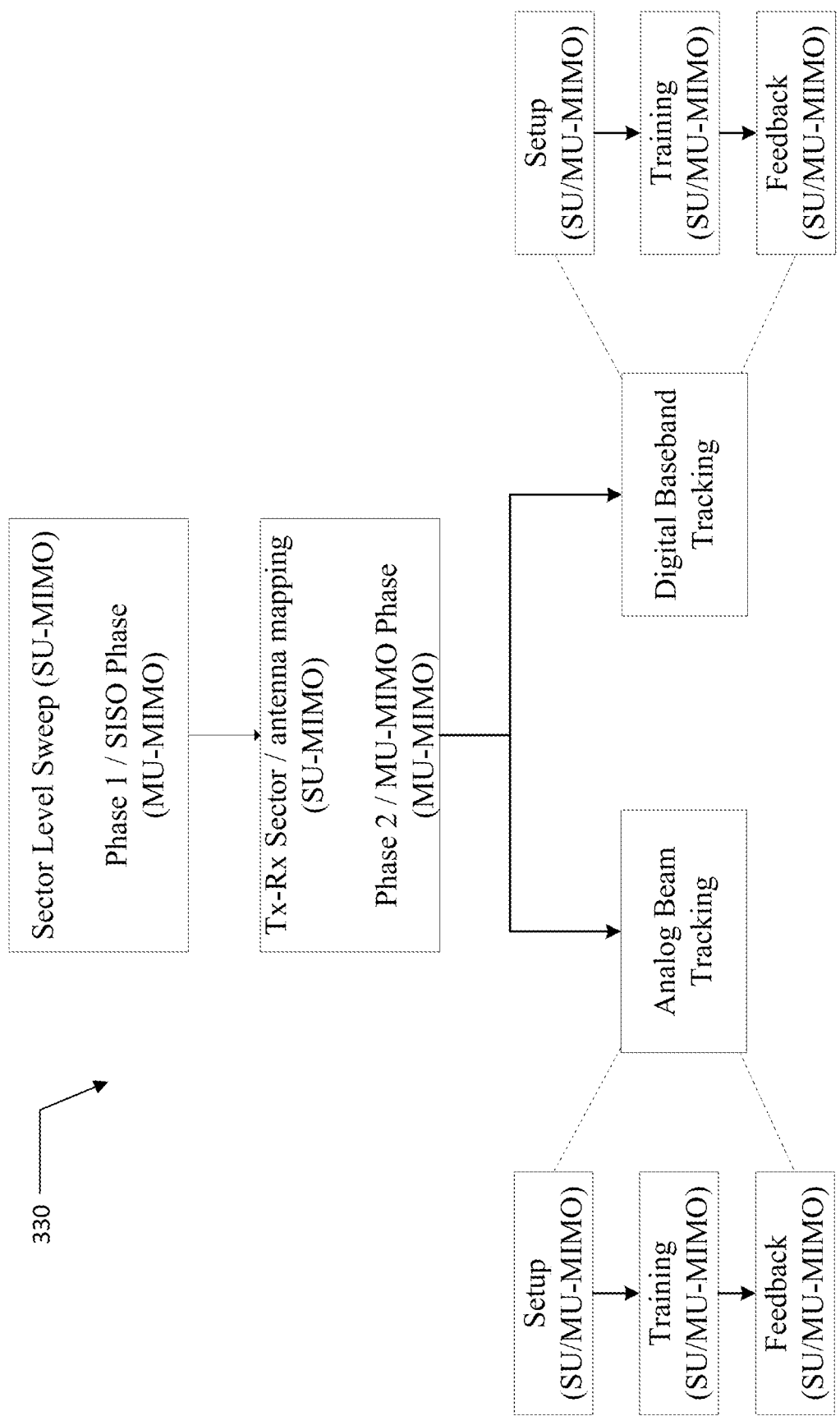
FIG. 25 depicts exemplary beam tracking for 802.11ay, in accordance with at least one embodiment.

For 802.11ay, the beam tracking procedure may also be split into three phases: setup, training, and feedback. During setup, the procedure needs to signal the tracking type, and the antenna configuration needs to be set up. During training, the procedure may be based on the BRP (using TRN-T fields) or null data packet (using the CEF). During feedback, the channel feedback is needed for DBC tracking while any one of the best beam, SNR, or channel feedback is suitable for AB tracking. In FIG. 25, a block diagram 320 for an embodiment of beam tracking for 802.11ay, as set forth herein is depicted.

Beam Tracking Procedure.

Setup or Announcement. In the disclosed beam tracking for 802.11ay, during Setup or Announcement, the initiator 210 may indicate if there is an AB or DBC tracking request. For either type of tracking, there may also be an indication whether the procedure is SU or MU.

The setup may also include SU-MIMO/MU-MIMO BF setup, which may indicate information similar to the previously discussed MU-MIMO BF setup sub-phase. This may occur for either AB or DBC tracking. For DBC tracking cases, the setup may also indicate SU/MU transmission configuration or use parameter to indicate keep current configuration.

The setup may also indicate the training type. For both AB and DBC tracking, the setup may indicate use of TRN-x and TRN length, and set the baseband precoder to the identity matrix. For DBC tracking only, the setup may indicate the use of CEF based training and set the baseband precoder to the identity matrix.

The setup may also indicate a feedback type required. For AB tracking only, indicated feedback may include best beam(s) and SNR(s). For both AB and DBC tracking, channel feedback may be indicated.

Training. The training may, for either AB or DBC tracking, be TRN-x based training. The training may, for DBC tracking only, be CEF based training.

Feedback. For either AB or DBC tracking, feedback may be based on simple polling. In some embodiments, other methods such as UL-OFDMA or UL-MU-MIMO may be used for either AB or DBC tracking.

Generally, 802.11ay supports hybrid precoding (analog and digital baseband precoding) for SU and MU-MIMO. 802.11ay enables Analog Beam Tracking and Digital Baseband Channel Tracking. Both the SU-MIMO and the MU-MIMO beamforming protocols have Analog Beam Tracking and Digital Baseband Channel Tracking sub-phases.

Beam tracking enables an initiator or responder track the change in its analog or baseband beams without the need for the signaling and overhead in a BRP procedure. The signaling for beam tracking is sent in the DMG BRP packet header fields or EDMG header-A fields headers either as standalone or piggy-backed data frames. Analog beam tracking tracks changes in the analog beams (and re-estimates the baseband beamformer in a hybrid beamforming transmission). Baseband beam tracking tracks changes in the baseband beamformer only in a hybrid beamforming transmission.

A beam tracking initiator or beam tracking responder may request baseband beam tracking if at least one of the following conditions is met: The performance of the system is degraded in a hybrid beamforming transmission and the requestor would like to re-estimate the baseband channel as part of the link adaptation procedure; The requestor did not request for detailed baseband channel information as part of the MIMO setup procedure. In this case, the analog beams have been identified but the information to design the baseband channel is still needed.

Figure 26:
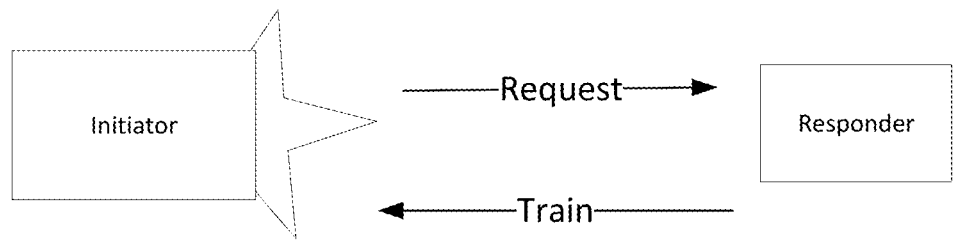
FIG. 26 depicts an exemplary analog EDMG initiator receive beam tracking.
Figure 27:
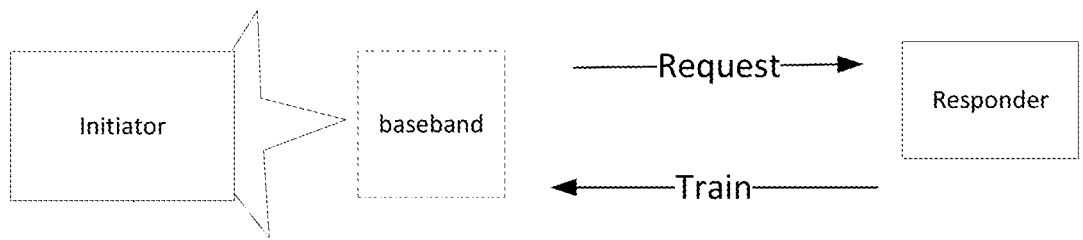
FIG. 27 depicts an exemplary Baseband EDMG initiator receive beam tracking.

Beam tracking may be one of the following such as Initiator Receive Beam Tracking. The initiator sends a request to the responder and the responder sends a tracking packet to enable the initiator estimate its receive beams. In analog EDMG initiator receive beam tracking (illustrated in FIG. 26), the initiator seeks to track the analog receive beams. In baseband EDMG initiator receive beam tracking (illustrated in FIG. 27), the initiator seeks to train the baseband channel only using the reverse link. This is useful in the case that there is channel reciprocity and there is need to acquire the baseband channel at the transmitter for hybrid beamforming without the need for a large overhead feedback.

Figure 28:
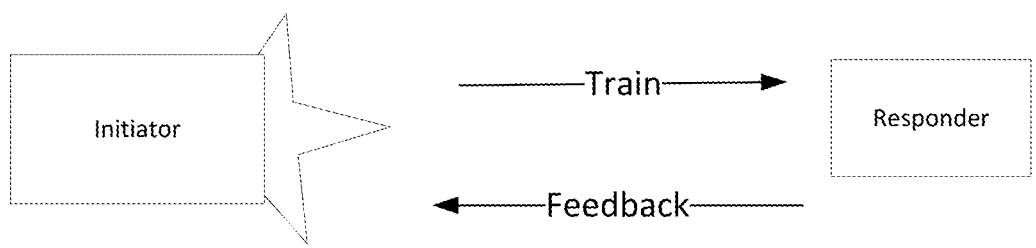
FIG. 28 depicts an exemplary Analog EDMG initiator transmit beam tracking.
Figure 29:
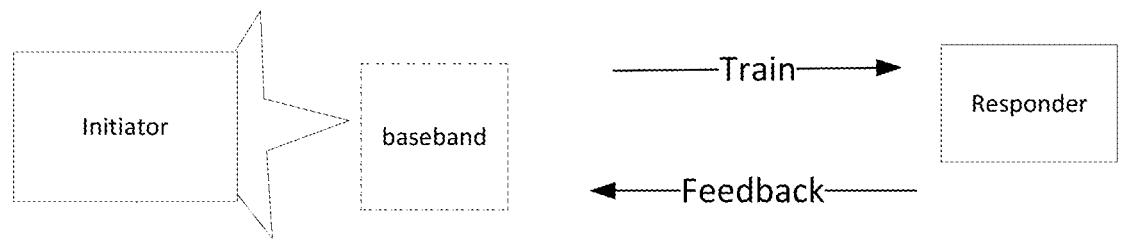
FIG. 29 depicts an exemplary Baseband EDMG initiator transmit beam tracking.

Beam tracking may also be Initiator Transmit Beam Tracking. The initiator sends a training packet to the receiver and the receiver feeds back the desired feedback (best beam, effective channel etc). In analog EDMG initiator transmit beam tracking (illustrated in FIG. 28), the initiator seeks to track the analog transmit beams. In baseband EDMG initiator transmit beam tracking (illustrated in FIG. 29), the initiator seeks to train the baseband channel only using the forward link. This is useful in the case that there is no channel reciprocity and there is need to acquire the baseband channel at the transmitter for hybrid beamforming. Feedback is required in this case.

Figure 30:
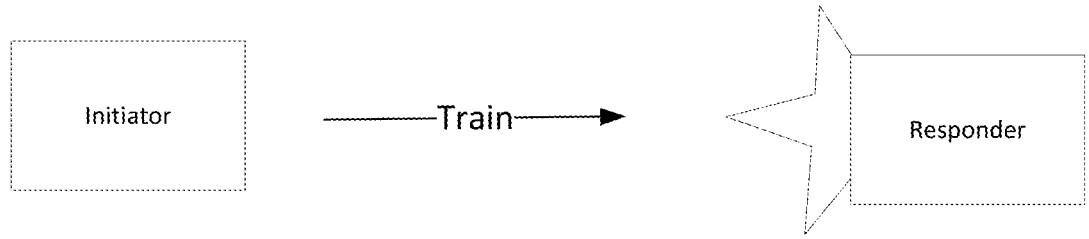
FIG. 30 depicts an exemplary Analog EDMG responder receive beam tracking.

Beam tracking may also include Responder Receive Beam Tracking as in FIG. 30. In this case, the initiator sends a training sequence to the responder and asks it to track its receive beams. Note that there is no corresponding baseband version.

The specific beam tracking type is set by parameters in the TXVECTOR and RXVECTOR and the signaling between the initiator and responder may take place in the packet headers of the packets transmitted between the transmitter and receiver (i.e. the legacy BRP packet header and the EDMG-Header-A) or in special aggregated frames (e.g. the FBCK-REQUEST field in the DMG Refinement element) based on the parameters in the TXVECTOR and RXVECTOR. Details will be shown in below.

An EDMG STA (beam tracking initiator) may request a peer EDMG STA (beam tracking responder) to perform receive beam tracking by setting, in a transmitted packet, the TXVECTOR parameter EDMG_BEAM_TRACKING_REQUEST to Beam Tracking Requested, EDMG_BEAM_TRACKING_TYPE to Analog Beam Tracking or Baseband Beam Tracking, BEAM_TRACKING_REQUEST to Beam Tracking Not Requested, EDMG_TRN_LEN, to the number of requested TRN subfields as described, and packet type to TRN-R-PACKET. Otherwise, the EDMG BEAM_TRACKING_REQUEST parameter shall be set to Beam Tracking Not Requested. If EDMG_BEAM_TRACKING_TYPE is set to Baseband Beam Tracking and EMDG_TRN_LEN is set to zero, the parameter EDMG Extended CEF Number of SS in the EDMG-Header-A shall be set to the TXVECTOR parameter EDMG_NUMBER_OF_SPATIAL_STREAMS_TRACKED, A beam tracking responder that receives a packet requesting beam tracking (corresponding to the BEAM_TRACKING_REQUEST or EDMG_BEAM_TRACKING_REQUEST parameter in the RXVECTOR set to Beam Track Requested) and the Packet Type field in the PHY header equal to 0 (corresponding to PACKET-TYPE field in the RXVECTOR set to TRN-R-PACKET) shall perform the tasks as described below.

For DMG Initiator Receive Beam Tracking: If BEAM_TRACKING_REQUEST parameter in the RXVECTOR is Beam Tracking Requested, there may be a beam refinement AGC field and TRN-R subfields appended to the following packet transmitted to the initiator in the same allocation, with an MCS index greater than 0. The value of TXVECTOR parameter TRN-LEN in the following packet from the responder to the initiator shall be equal to the value of the TRN-LEN parameter in the RXVECTOR of the packet from the initiator.

For Analog and baseband EDMG Initiator Receive Beam Tracking: If EDMG_BEAM_TRACKING_REQUEST parameter in the RXVECTOR is Beam Tracking Requested and the EDMG_BEAM_TRACKING_TYPE parameter in the RXVECTOR is Analog Beam Tracking or Baseband Beam Tracking, there may be TRN-R subfields to the following packet transmitted to the initiator in the same allocation, with an MCS index greater than 0. The value of TXVECTOR parameter EDMG_TRN_LEN in the following packet from the responder to the initiator shall be equal to the value of the EDMG_TRN_LEN parameter in the RXVECTOR of the packet from the initiator.

For baseband EDMG Initiator Receive Beam Tracking: If EDMG_BEAM_TRACKING_TYPE parameter in the RXVECTOR is Baseband Beam Tracking and if EDMG_TRN_LEN=0 then no TRN-R subfields are appended to the data packet. The baseband beamformer shall be set to a predetermined orthogonal matrix e.g. the identity matrix, during the transmission of the preamble. The extended EDMG-CEF field is transmitted in the preamble and is used for decoding the data field of the packet and in measuring the effective baseband channel. The value of TXVECTOR parameter EDMG_NUMBER_OF_SPATIAL_STREAMS_TRACKED in the following packet from the responder to the initiator shall be equal to the value of the EDMG_NUMBER_OF_SPATIAL_STREAMS_TRACKED parameter in the RXVECTOR of the packet from the intiator. The extended EDMG-CEF field shall be constructed with its Nss set to the EDMG_NUMBER_OF_SPATIAL_STREAMS_TRACKED parameter. Note that EDMG_NUMBER_OF_SPATIAL_STREAMS_TRACKED is always greater than or equal to the total number of data spatial streams. In a simple example, a STA may be transmitting data with only one spatial stream but be able to support up to 4 spatial streams. The EDMG extended CEF Number of SS=4, and the Number of SS=1. In normal data transmission, the CEF is constructed with Nss=1

In this scenario, the extended CEF is constructed with Nss=4. The channel estimation is done for the full Nss=4 channel but the resulting channel is used to decode the data with Nss=1. What is shown is FIG. 31 is Baseband beam tracking with no TRN-R fields. Extended EDMG-CEF is used for measurement.

If EDMG_BEAM_TRACKING_TYPE parameter in the RXVECTOR is Baseband Beam Tracking and if EDMG_TRN_LEN=N, EDMG_TRN_P=P, EDMG_TRN_M=0 and EDMG_TRN_N=0, then N TRN-units are appended and are transmitted using the same AWV as the preamble and data field of the packet. The baseband beamformer shall be set to a predetermined orthogonal matrix e.g. the identity matrix, during the transmission of the appended TRN-R subfields only and the measurement is based on the appended TRN-R packets. The value of TXVECTOR parameter EDMG_TRN_LEN in the following packet from the responder to the initiator shall be equal to the value of the EDMG_TRN_LEN parameter in the RXVECTOR of the packet from the initiator. Additional solutions to signal this scenario may include one of three options. In Option 1, Len=0, P=P, and M=N=0. In Option 2, Len=N, P=0, and M=N=0. In Option 3, Len=N, P=P, and M=N=0.

What is illustrated above is Baseband beam tracking with N TRN-R fields. Note that in FIG. 32 the N TRN R units are transmitted using the same AWV as the preamble and data field of the packet.

If EDMG_BEAM_TRACKING_TYPE parameter in the RXVECTOR is not equal to Baseband Beam Tracking a responder may ignore a request for beam tracking within an allocation if no packets with an MCS index greater than 0 are transmitted from the responder to the initiator within the allocation.

If EDMG_BEAM_TRACKING_CONFIG parameter in the RXVECTOR is Keep Configuration, then the responder(s) shall keep their antenna configurations for the duration of the tracking procedure. Note that in one solution, this may be signaled by setting EDMG_TRN_M=0 and EDMG_TRN_N=0. If EDMG_BEAM_TRACKING_CONFIG parameter in the RXVECTOR is Change Configuration, then the responder(s) shall change their antenna configurations for the duration of the tracking procedure. In one solution, the responder shall change its configuration based on information sent in a MIMO configuration frame such as a BF Selection frame. In another solution, the responder shall change it configuration based on information sent in the EDMG Header-A. For MU PPDU (non-FDMA), this may be the SS Descriptor Set as shown below:

EDMG-Header-A Field Structure and 1 Definition for a MU PPDU (Non-FDMA)

TABLE 12

| Field | Number of bits | Description |
| --- | --- | --- |
| SS Descriptor Set I, I = 0, . . . , 7 | 9 | Describes the SS assignment to the ith STA addressed within the MU PPDU. This field is formatted as described in the table below. |

SS Descriptor Set: where number of SS is number in the table 13 below.

TABLE 13

| AID | Number of SS |
| --- | --- |
| 8 | 1 |

For MU PPD (FDMA), the Channel Descriptor set may be shown as below in table 12:
EDMG-Header-A Field Structure 1 and Definition for a MU PPDU (FDMA)

TABLE 14

| Field | Number of bits | Description |
| --- | --- | --- |
| Channel Descriptor i | 16 | Describes the STA assignment for the next channel, if present, after the channel indicated by the Channel Descriptor 2 field. This field is formatted as described in the table below. |

TABLE 15

| AID | Number of SS | Beamformed | Reserved |
| --- | --- | --- | --- |
| 8 | 1 | 1 | 6 |

Figure 33:
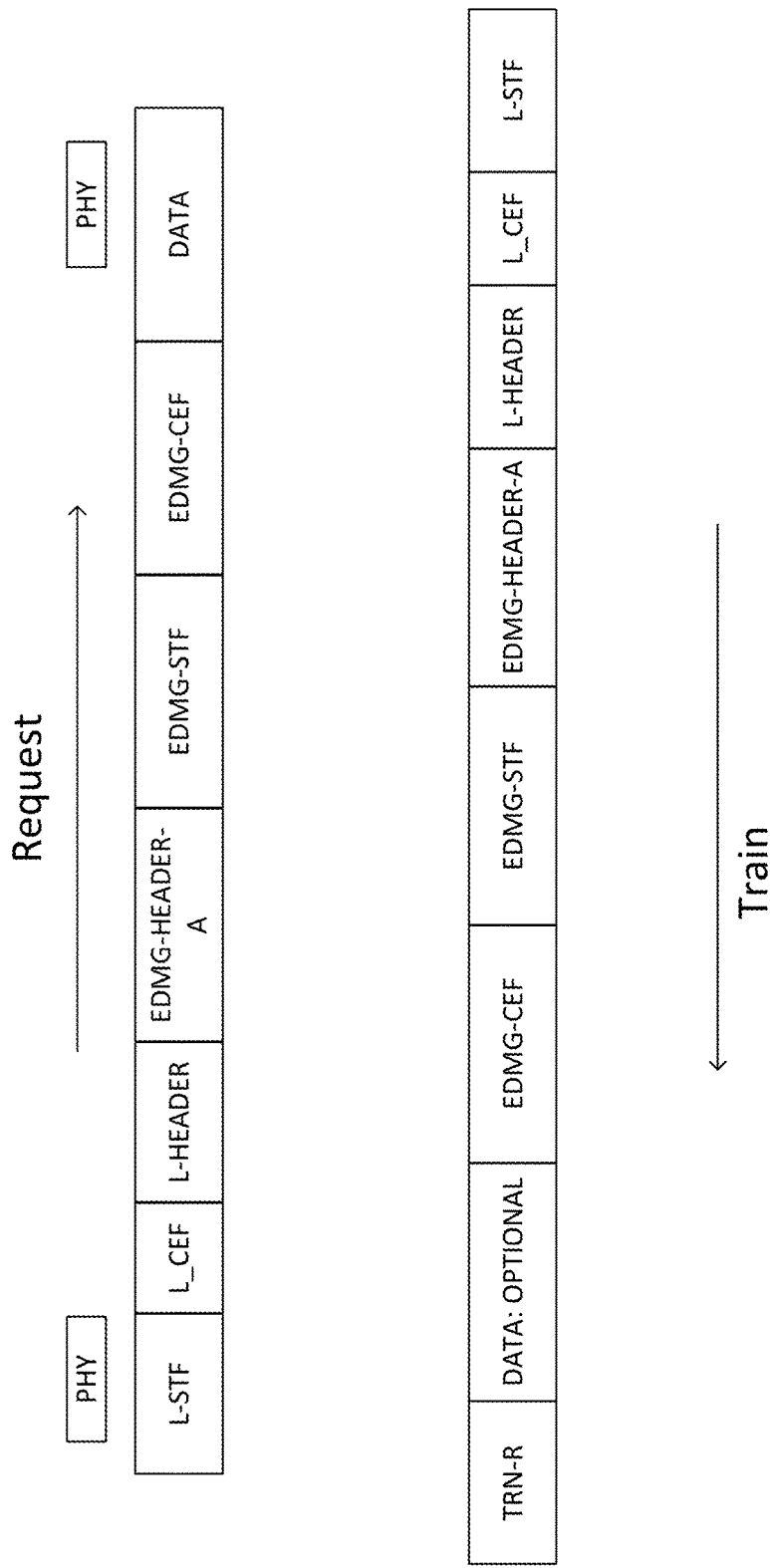
FIG. 33 depicts an exemplary packet structure for an Analog EDMG Initiator Receive Beam Tracking.
Figure 34:
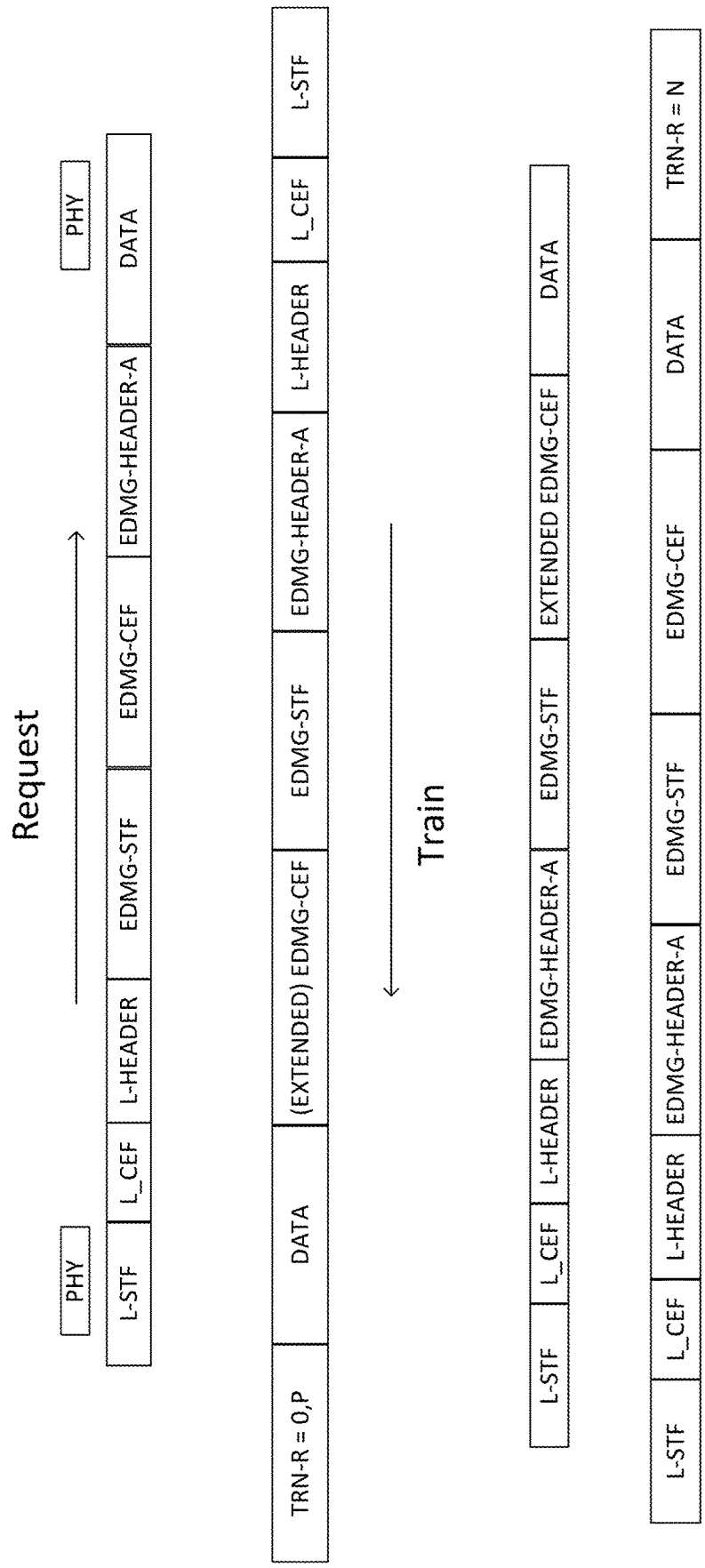
FIG. 34 depicts an exemplary packet structure for a Baseband EDMG Initiator Receive Beam Tracking.

The detailed settings for the TXVECTOR and RXVECTOR parameters, the packet headers and the packet structures are shown in FIG. 33 (depicting TXVECTOR/RXVECTOR settings, packet header signaling and packet structure for Analog EDMG Initiator Receive Beam Tracking) and FIG. 34 (depicting TXVECTOR/RXVECTOR settings, packet header signaling and packet structure for Baseband EDMG Initiator Receive Beam Tracking) for analog tracking and for digital tracking. In FIG. 33, the TXVECTOR/RXVECTOR settings include EDMG_BEAM_TRACKING_REQUEST=Beam Tracking Requested, EDMG_BEAM_TRACKING_TYPE=analog beam tracking BEAM_TRACKING_REQUEST=Beam Tracking Not Requested, TRN-LEN=0, EDMG_TRN_LENGTH=N, packet type=0, TRN-R-PACKET, EDMG_BEAM_TRACKING_CONFIG=xx, and EDMG_NUMBER_OF_SPATIAL_STREAMS_TRACKED=xx. The TXVECTOR/RXVECTOR settings include Beam Tracking Request Field=0, a Packet Type Field 0 (BRP-RX), Training Length Field=0, EDMG TRNLength=N, RX TRN_Units per Each TX TRN Unit=xx, EDMG TRN-UNIT-P=xx, EDMG TRN-UNIT M=xx, EDMG TRN-UNIT N-xx, EDMG Beam Tracking Request=1, requested, EDMG Beam Tracking Request Type=0, analog beam tracking EDMG Beam Tracking Configuration=xx, and HMG Extended CEF Number of SS=xx.

In FIG. 34, the TXVECTOR/RXVECTOR settings include, EDMG_BEAM_TRACKING_TYPE=baseband beam tracking EDMG_TRN_LENGTH=0,N, EDMG_BEAM_TRACKING_CONFIG=0/1, and EDMG_NUMBERT_OF_SPATIAL STREAMS TRACKED=Nss. The TXVECTOR/RXVECTOR settings also include EDMG TRN Length=0,N, RX TRN-Units per Each TX TRN UNIT=xx, EDMG TRN-UNIT-P=P, EDMG TRN-UNIT M=0, EDMG TRN-UNIT N=0, EDMG Beam Tracking Request=1, requested, EDMG Beam Tracking Request Type=1, baseband beam tracking, EDMG Beam tracking Configuration=0/1, and EEDMG Extended CEF Number of SS=Nss. The TXVECTOR/RXVECTOR settings also include EDMG Beam Tracking Request=0, Not requested, and EDMG Beam tracking Configuration=xx.

A beam tracking initiator requesting transmit beam tracking shall either: Set the BEAM_TRACKING_REQUEST parameter in the TXVECTOR to Beam Tracking Requested, Packet Type to TRN-T-PACKET, TRN-LEN to the number of TRN-Units as described herein, and append an AGC field and TRN-T subfields to the packet; or set the EDMG_BEAM_TRACKING_REQUEST parameter in the TXVECTOR to Beam Tracking Requested, EDMG_BEAM_TRACKING_TYPE to Analog Beam Tracking or Baseband Beam Tracking, BEAM_TRACKING_REQUEST to Beam Tracking Not Requested, Packet Type to TRN-T-PACKET, and EDMG_TRN_LEN, EDMG_TRN_P, EDMG_TRN_M and EDMG_TRN_N as described herein, and append TRN-T subfields to the packet, If EDMG_BEAM_TRACKING_TYPE parameter in the TXVECTOR is Baseband Beam Tracking and EDMG_TRN_LEN=0 then no TRN-T subfields are appended. The baseband beamformer shall be set to a predetermined orthogonal matrix e.g. the identity matrix, during the transmission of the preamble. The extended EDMG-CEF field is transmitted in the preamble and is used for decoding the data field of the packet and in measuring the effective baseband channel. The extended EDMG-CEF field shall be constructed with its Nss set to the EDMG_NUMBER_OF_SPATIAL_STREAMS_TRACKED parameter Note that EDMG_NUMBER_OF_SPATIAL_STREAMS_TRACKED is always greater than or equal to the total number of data spatial streams.

What is shown in FIG. 35 is Baseband beam tracking with no TRN-T fields. Extended EDMG-CEF is used for measurement.

If EDMG_BEAM_TRACKING_TYPE parameter in the TXVECTOR is Baseband Beam Tracking and if EDMG_TRN_LEN=N, EDMG_TRN_P=P, EDMG_TRN_M=0 and EDMG_TRN_N=0, then N TRN units are appended to the data packet and are transmitted using the same AWV as the preamble and data field of the packet. The baseband beamformer shall be set to a predetermined orthogonal matrix e.g. the identity matrix, during the transmission of the appended TRN-T subfields only and the measurement is based on the appended TRN-T subfields. Additional solutions to signal this scenario may include three options. In one option, Len=0, P=P, and M=N. In another option, Len=N, P=0, and M=N. In still another option, Len=N, P=P, and M=N=0.

What is illustrated in FIG. 36 is Baseband beam tracking with N TRN-T fields. Note that the N TRN-T units are transmitted using the same AWV as the preamble and data field of the packet.

If EDMG_BEAM_TRACKING_CONFIG parameter in the TXVECTOR is set Keep Configuration, then the initiator shall keep its antenna configuration for the duration of the tracking procedure.

If EDMG_BEAM_TRACKING_CONFIG parameter in the TXVECTOR is Change Configuration, then the initiator shall change its antenna configurations for the duration of the tracking procedure. In one solution, the initiator shall change its configuration based on information sent in a MIMO configuration frame such as a BF Selection frame. In another solution, the initiator shall change it configuration based on information sent in the EDMG Header-A. For a MU PPDU (non-FDMA), this may be the SS Descriptor Set as shown below: EDMG-Header-A field structure and 1 definition for a MU PPDU (non-FDMA)

TABLE 16

| Field | Number of bits | Description |
|---|---|---|
| SS Descriptor Set I, I = 0, . . . , 7 | 9 | Describes the SS assignment to the ith STA addressed within the MU PPDU. This field is formatted as described in the table below. |

SS Descriptor Set: where number of SS is number in the table below plus one.

TABLE 17

| AID | Number of SS |
|---|---|
| 8 | 1 |

For a MU PPD (FDMA), this may be the Channel Description set as shown below: EDMG-Header-A field structure 1 and definition for a MU PPDU (FDMA)

TABLE 18

| Field | Number of bits | Description |
|---|---|---|
| Channel Descriptor i | 16 | Describes the STA assignment for the next channel, if present, after the channel indicated by the Channel Descriptor 2 field. This field is formatted as described in the table below. |

TABLE 19

| AID | Number of SS | Beamformed | Reserved |
|---|---|---|---|
| 8 | 1 | 1 | 6 |

The beam tracking responder may append the feedback to any packet from the responder to the initiator. The initiator may allocate time for the feedback through a reverse direction grant, provided the reverse direction protocol is supported by both the initiator and responder. The feedback type shall be the same as the feedback type in the last BRP frame that was transmitted from the initiator to the responder with TX-TRN-REQ equal to 1.

If the responder has never received a BRP frame from the initiator with TX-TRN-REQ equal to 1, and If BEAM_TRACKING_REQUEST parameter in the RXVECTOR is Beam Tracking Requested, or if EDMG BEAM_TRACKING_REQUEST parameter in the RXVECTOR is Beam Tracking Requested and EDMG_BEAM_TRACKING_TYPE is Analog Beam Tracking, the responder shall respond with all subfields of the FBCK-TYPE field equal to 0 and set the BS-FBCK field to the index of the TRN-T subfield that was received with the best quality.

With Option 1: send FBCK-REQ. This is not typical because tracking does not add to data but most general—If EDMG BEAM_TRACKING_REQUEST parameter in the RXVECTOR is Beam Tracking Requested and EDMG_BEAM_TRACKING_TYPE is Baseband Beam Tracking, the initiator shall include a FBCK-REQ in a DMG Beam Refinement element and request for the feedback needed. The responder shall respond with the requested feedback.

Option 2: use MIMO feedback frame. If EDMG BEAM_TRACKING_REQUEST parameter in the RXVECTOR is Beam Tracking Requested and EDMG_BEAM_TRACKING_TYPE is Baseband Beam Tracking, the responder shall send a MIMO BF Feedback frame to the initiator.

The EDMG Channel Measurement Feedback element in the MIMO BF Feedback frame shall contain the SU-MIMO beamforming training feedback for the initiator SU-MIMO Beamforming Training subphase according to the feedback type specified by the initiator in the SU-MIMO BF setup subphase during SU MIMO setup.

The EDMG Channel Measurement Feedback element in the MIMO BF Feedback frame shall contain the MU-MIMO beamforming training feedback according to the feedback type specified by the initiator in the MU-MIMO BF Feedback Poll subphase during MU MIMO setup.

With Option 3: create a default method. N-taps parameter may be added to the EDMG Header-A—The responder shall respond with all subfields of the FBCK-TYPE field equal to 0 except for the channel measurement present set to 1, the number of taps present set to a pre-determined value e.g. 0x0 (1 tap) or signaled (e.g. EMDG Feedback number of taps Requested), the number of measurements based on the MIMO configuration and feed back the channel measurements and corresponding tap delays for the channel. Alternatively, the receiver selects thereafter the set of taps that is measured around the tap with the largest amplitude according to dot11ChanMeasFBCKNtaps. In this case, the additional signaling is not needed.

The detailed settings for the TXVECTOR and RXVECTOR parameters, the packet headers and the packet structures are shown in figure (x) for analog tracking and figure (x) for digital tracking.

A beam tracking responder that receives a packet with RXVECTOR parameter EDMG BEAM_TRACKING_REQUEST equal to Beam Tracking Not Requested, EDMG_BEAM_TRACKING_TYPE to Analog Beam Tracking, BEAM_TRACKING_REQUEST equal to Beam Tracking Not Requested, TRN-LEN equal to zero, Packet Type equal to TRN-R-PACKET, and EDMG_TRN_LEN to a nonzero value and may use the TRN-R subfields appended to the received packet to perform receive beam training.

Figure 37:
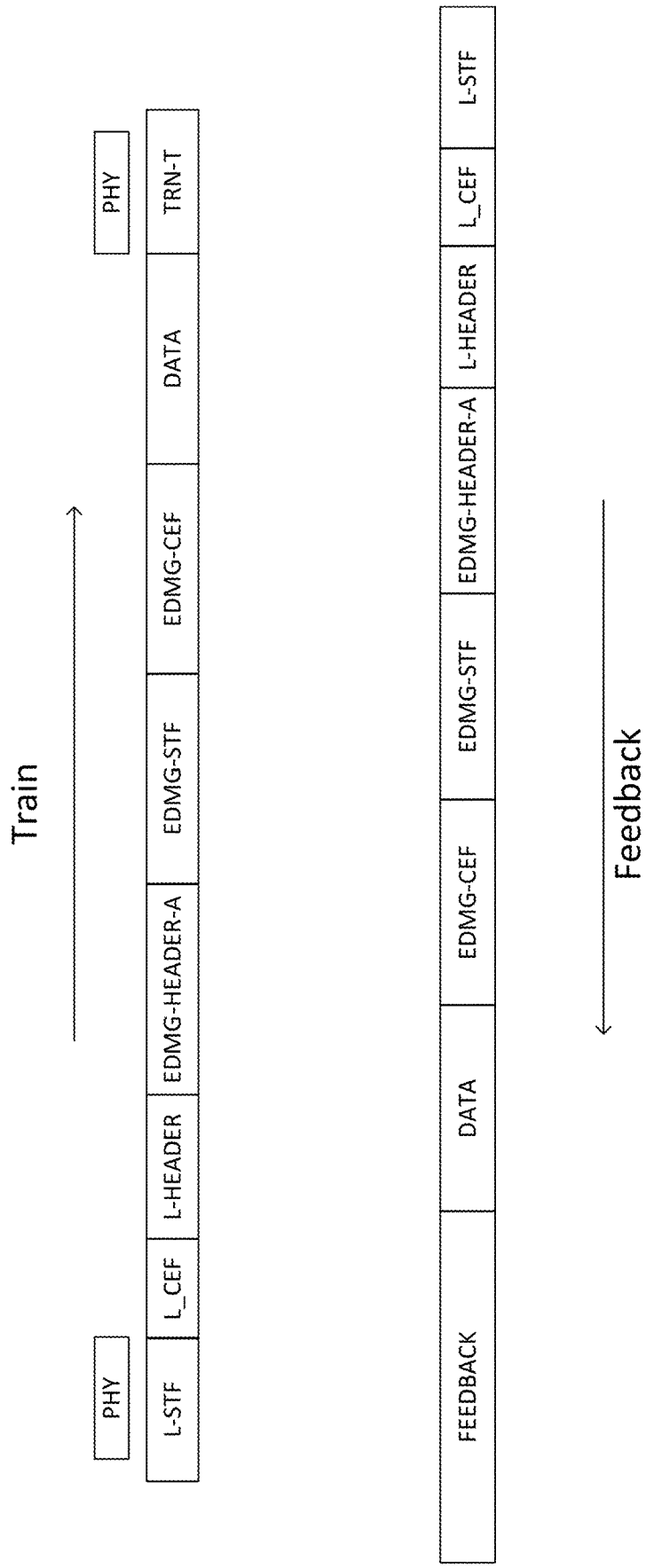
FIG. 37 depicts an exemplary packet structure for an Analog EDMG Initiator Transmit Beam Tracking.

FIG. 37 illustrates TXVector/RXVector settings, packet header signaling, and packet structure for Analog EDMG Responder Receive Beam Tracking. The TXVector/RXVector settings for FIG. 37 include EDMG BEAM_TRACKING_REQUEST=Beam Tracking Requested, EDMG_BEAM_TRACKING_TYPE=analog beam tracking, BEAM_TRACKING_REQUEST=Beam Tracking not Requested, packet type=TRN-T-PACKET, EDMG_TRN_LEN, EDMG TRN P, EDMG TRN M, EDMG TRN N, EDMG_BEAM_TRACKING_CONFIG=xx, and EDMG_NUMBER_OF_SPATIAL_STREAMS_TRACKED=xx. The TXVector/RXVector settings also include Beam Tracking Request Field=0, Training Length Field=0, EDMG TRN Length=N, RX TRN-Units per Each TX TRN UNIT=TX RX, EDMG TRN-UNIT-P=P, EDMG TRN-UNIT M=M, EDMG TRN-UNIT N=N, EDMG Beam Tracking Request Type=0, analog beam tracking, EDMG Beam tracking Configuration=xx, and EDMG_NUMBER_OF_SPATIAL_STREAMS_TRACKED=xx. The TXVECTOR/RXVECTOR settings include EDMG TRN Length=0, RX TRN-Units pere Each TX TRN UNIT=xx, EDMG TRN-UNIT-P=xx, EDMG TRN-UNIT M=xx, EDMG TRN-UNIT N=x, EDMG Beam Tracking Request=0, not requested, EDMG Beam Tracking Request Type-xx, analog beam tracking, EDMG Beam Tracking Configuration=xx, and EDMG_NUMBER_OF_SPATIAL_STREAMS_TRACKED=xx.

The TXVector/RXVector settings also include Beam Tracking Request Field=0, Packet Type Field=Reserved, and Training Length Field=Reserved.

Figure 38:
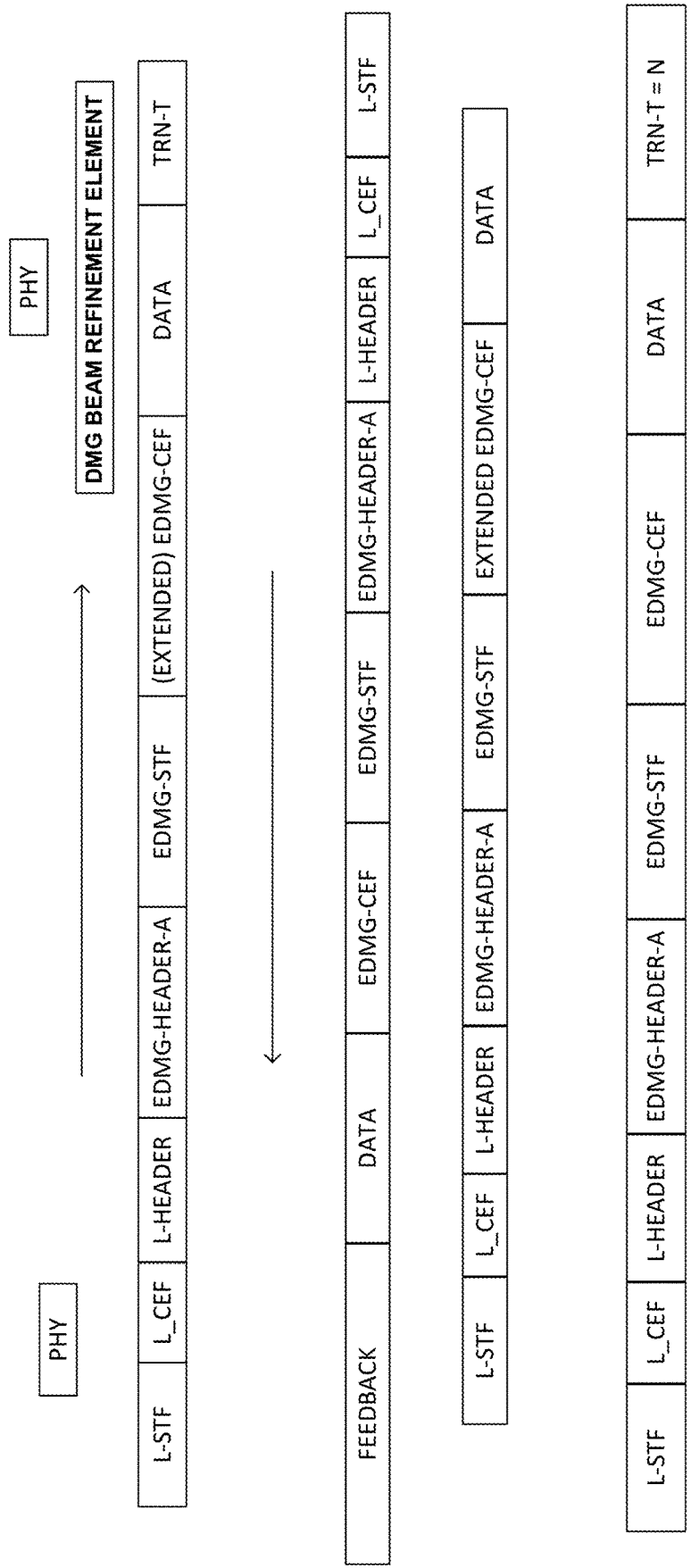
FIG. 38 depicts an exemplary packet structure for a Baseband EDMG Initiator Transmit Beam Tracking.

FIG. 38 illustrates TXVector/RXVector settings, packet header signaling and packet structure for a Baseband EDMG Initiator Transmit Beam Tracking. The TXVector/RXVector settings include EDMG BEAM_TRACKING_REQUEST=Beam Tracking Requeseted, EDMG_BEAM_TRACKING_TYPE-analog beam tracking, BEAM_TRACKING_REQUEST=Beam Tracking not Requested, TRN-LEN=0, packet type=TRN-T-Packet, EDMG_TRN_LEN=N, EDMG_TRN_P=0/PN, EDMG_TRN_M=0, EDMG_TRN_N=0, EDMG_BEAM_TRACKING_CONFIG=0/1, and EDMG_NUMBER_OF_SPATIAL_STREAMS_TRACKED=Nss. The TXVector/RXVector settings also include EDMG TRN P=0/P, Beam Tracking Request Field=0, Training Length Field=Reserved, EDMG TRN Length=N, RX TRN-Units per Each TX TRN UNIT=TX_RX, EDMG TRN-UNIT-P=0/N, EDMG TRN-UNIT M=0, EDMG TRN-UNIT N=0, EDMG Beam Tracking Request Type=0, baseband beam tracking, EDMG Beam tracking Configuration=0/1, and EDMG Extended CEF Number of SS=Nss. The TXVector/RXVector settings also include EDMG TRN Length=0, RX TRN-Units per Each TX TRN UNIT=xx, EDMG TRN-UNIT-P=xx, EDMG TRN-UNIT M=xx, EDMG TRN-UNIT N=x, EDMG Beam Tracking Request=0, not requested, EDMG Beam Tracking Request Type=xx, EDMG Beam tracking Configuration=xx, and EDMG Extended CEF Number of SS=xx. The TXVector/RXVector settings also include Beam Tracking Request Field=0, Packet Type Field=Reserved, and Training Length Field=Reserved. The Feedback type may be as a last BRP frame, Explicit Request, or by default. The feedback method may be by piggyback and reverse direction grant (RD protocol).

Figure 39:
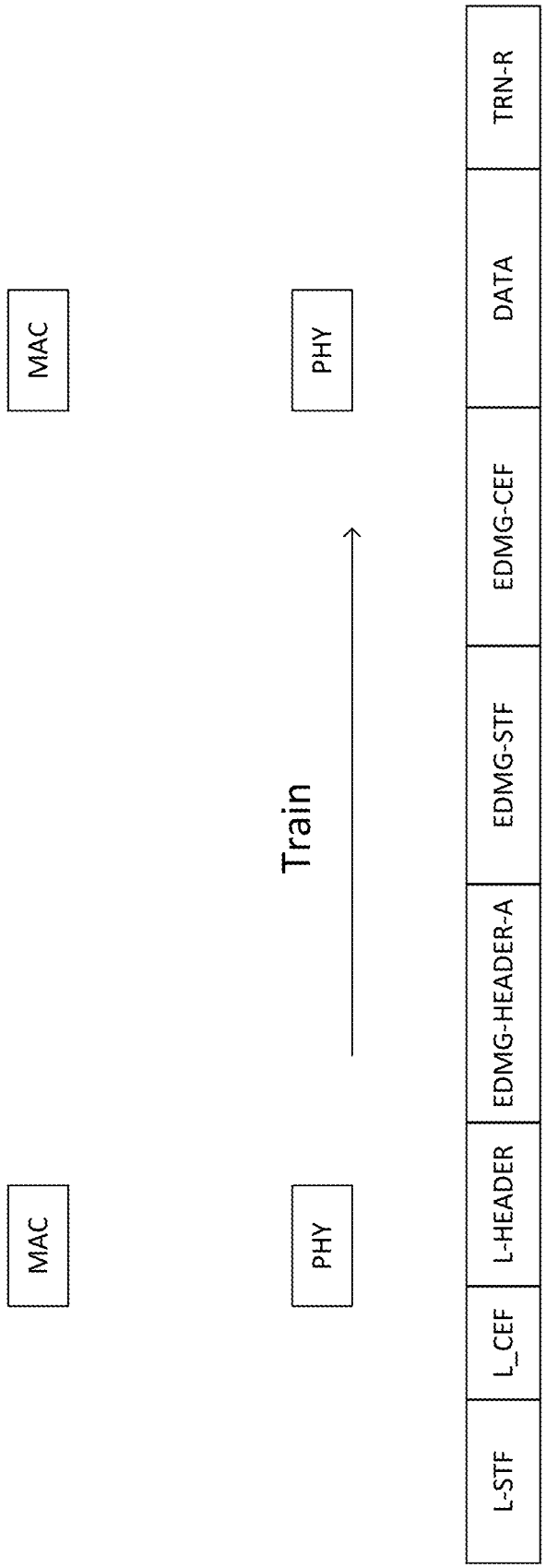
FIG. 39 depicts an exemplary packet structure for an Analog EDMG Responder Receive Beam Tracking.

FIG. 39 illustrates TXVector/RXVector settings, packet header signaling and packet structure for an Analog EDMG Responder Receive Beam Tracking. The TXVector/RX vector settings include EDMG BEAM_TRACKING_REQUEST=Beam Tracking Not Requested, EDMG_BEAM_TRACKING_TYPE=analog beam tracking, BEAM_TRACKING_REQUEST=Beam Tracking not Requested, TRN-LEN=0, packet type=TRN-R-PACKET, EDMG_TRN_LEN=N, EDMG_BEAM_TRACKING_CONFIG=xx, and DMG_NUMBER_OF_SPATIAL_STREAMS_TRACKED=xx. The TXVector/RXVector settings also include a Beam Tracking Request Field=0 and a Training Length Field=0. The TXVector/RXVector settings also include EDMG TRN Length=N, RX TRN-Units per Each TX TRN UNIT=xx, EDMG TRN-UNIT-P=xx, EDMG TRN-UNIT M=xx, EDMG TRN-UNIT N=xx, EDMG Beam Tracking Request=1, requested, EDMG Beam Tracking Request Type=1, analog beam tracking, EDMG Beam tracking Configuration=xx, and EDMG Extended CEF Number of SS=xx The TXVector and RXVector parameters needed for beam tracking are shown in Table (21)

TABLE 20

| parameter | Condition | Value | TXVECTOR | RXVECTOR |
| --- | --- | --- | --- | --- |
| EDMG_BEAM_TRACKING_TYPE | FORMAT is EDMG | This parameter indicates if analog beam tracking or baseband beam tracking is requested Enumerated type: Analog beam Tracking or Baseband Beam Tracking | Y | Y |
| EDMG_BEAM_TRACKING_CONFIG | FORMAT IS EDMG | This parameter indicates if the tracking procedure should use the current configuration or should read the data packet to switch to a different configuration Enumerated type: Keep configuration or change configuration | Y | Y |

TABLE 21

| | | | | |
| --- | --- | --- | --- | --- |
| EDMG_NUMBER_OF_SPATIAL_STREAMS_TRACKED | FORMAT IS EDMG | This parameter indicates the number of spatial streams that should be used in an extended EDMG CEF during baseband beamforming. For SU-MIMO, it indicates the maximum number of SS that may be transmitted with the given antenna configuration. For MU-MIMO, it indicates the total number of SS that may be transmitted to all the STAs with the given antenna configuration. Enumerated type: Integer from 0 to 7 | | |
| EDMG_NUMBER_OF_FEEDBCK_TAPS_REQUESTED_TRACKING | FORMAT IS EDMG | This parameter indicates the default number of channel taps to be fed back in baseband channel feedback Enumerated type: 1 tap, 5 taps, 15 taps, 63 taps | Y | Y |

The EDMG_TRN_LEN parameter in the TVXVECTOR or RXVECTOR of an EDMG BRP packet shall be greater than zero except when baseband beam tracking is enabled (EDMG BEAM_TRACKING_REQUEST parameter in the TXVECTOR is Beam Tracking Requested and EDMG_BEAM_TRACKING_TYPE is Baseband Beam Tracking). The definition for the EDMG-Headers for tracking in EDMG SC mode and EDMG OFDM mode PPDUs are shown in Table (x) below

TABLE 22

| Field Name | Number of bits | Start bit | Description |
| --- | --- | --- | --- |
| EDMG Beam Tracking Request | 1 | 91 | Corresponds to the TXVECTOR parameter EDMG_BEAM_TRACKING_REQUEST. Used in combination with EDMG Beam Tracking Request Type with corresponding TXVECTOR parameter EDMG_BEAM_TRACKING_TYPE. Set to 1 to indicate the need for beam tracking (10.38.7); otherwise, set to 0. The EDMG Beam Tracking Request field is reserved when the EDMG TRN Length field is 0 and EMDG Beam Tracking Request Type is 0 |

TABLE 22-continued

| Field Name | Number of bits | Start bit | Description |
|---|---|---|---|
| EDMG Beam Tracking Request Type | 1 | 95 | Corresponds to the TXVECTOR parameter EDMG_BEAM_TRACKING_TYPE. Set to 0 to indicate Analog Beam Tracking (10.38.7) Set to 1 to indicate Baseband Beam Tracking (10.38.7) |
| EDMG Beam Tracking Config | 1 | 96 | Corresponds to the TXVECTOR parameter EDMG_BEAM_TRACKING_CONFIG. Set to 0 to indicate change antenna configuration (10.38.7) Set to 1 to indicate keep antenna configuration (10.38.7) |
| EDMG Extended CEF Number of SS | 3 | 101 | Corresponds to the TXVECTOR parameter EDMG_NUMBER_OF_SPATIAL_STREAMS_TRACKED. Used when EDMG_BEAM_TRACKING_TYPE is equal to Baseband Beam Tracking and EDMG_TRN_N is set to zero. This implies baseband beam tracking is done using the transmitted extended EDMG CEF The value of this field plus one indicates the number of SSs sounded when using the extended CEF in baseband tracking. |
| Reserved | 12 | 102 | Set to 0 by the transmitter and ignored by the receiver. |
| EMDG Feedback number of taps Requested | 2 | 98 | Number of taps in each channel measurement: 0x0 - 1 tap 0x1 - 5 taps 0x2 - 15 taps 0x3 - 63 taps |

For non-FMDA tracking, a beam tracking request frame may be sent to all the STAs. A new EDMG-header-B may be defined to signal the information. Alternatively, each STA may undergo an SU-MIMO beam tracking request individually.

For FMDA tracking, a beam tracking request may be made per STA with the tracking request done within the assigned frequency. In one option, the signaling may be done in the EDMG-Header A and applies to all STAs. In one solution, a STA specific tracking may be done by transmitting on the EDMG-header-B. This allows channel identification for a single STA in a defined frequency bandwidth that is less than the transmission bandwidth.

For MU-MIMO PPDU-FDMA, two structures may be possible. With an extended EDMG-CEF, all the STAs in the FDMA group have to use the same EDMG-CEF size. If you use appended TRN-units, two options may be available. One option may be to transmit TRN units on all frequency bands. Another option may be to transmit TRN units of frequency band of a desired STA only. An EDMG Header and field structure and 1 definition for a MU PPDU (FDMA or non-FMDA) is shown below

TABLE 23

| Field Name | Number of bits | Start bit | Description |
|---|---|---|---|
| EDMG Beam Tracking Request | 1 | 66 | Corresponds to the TXVECTOR parameter EDMG_BEAM_TRACKING_REQUEST. Used in combination with EDMG Beam Tracking Request Type with corresponding TXVECTOR parameter EDMG_BEAM_TRACKING_TYPE. Set to 1 to indicate the need for beam tracking (10.38.7); otherwise, set to 0. The EDMG Beam Tracking Request field is reserved when the EDMG TRN Length field is 0 and EMDG Beam Tracking Request Type is 0 |
| EDMG Beam Tracking Request Type | 1 | 67 | Corresponds to the TXVECTOR parameter EDMG_BEAM_TRACKING_TYPE. Set to 0 to indicate Analog Beam Tracking (10.38.7) Set to 1 to indicate Baseband Beam Tracking (10.38.7) |
| EDMG Beam Tracking Config | 1 | 68 | Corresponds to the TXVECTOR parameter EDMG_BEAM_TRACKING_CONFIG. Set to 0 to indicate change antenna configuration (10.38.7) Set to 1 to indicate keep antenna configuration (10.38.7) |
| EDMG Extended CEF Number of SS | 3 | 69 | Corresponds to the TXVECTOR parameter EDMG_NUMBER_OF_SPATIAL_STREAMS_TRACKED. Used when EDMG_BEAM_TRACKING_TYPE is equal to Baseband Beam Tracking and EDMG_TRN_N is set to zero. This implies baseband beam tracking is done using the transmited extended EDMG CEF The value of this field plus one indicates the number of SSs sounded when using the extended CEF in baseband tracking. |

TABLE 23-continued

| Field Name | Number of bits | Start bit | Description |
|---|---|---|---|
| Reserved | 40 | 72 | Set to 0 by the transmitter and ignored by the receiver. |
| EMDG Feedback number of taps Requested | 2 | 98 | Number of taps in each channel measurement:<br>0x0 - 1 tap<br>0x1 - 5 taps<br>0x2 - 15 taps<br>0x3 - 63 taps |

An EDMG Header, field structure and definition is shown in table (x) below

TABLE 24

| Field Name | Number of bits | Start bit | Description |
|---|---|---|---|
| EDMG Beam Tracking Request | 1 | 24 | Corresponds to the TXVECTOR parameter EDMG_BEAM_TRACKING_REQUEST. Used in combination with EDMG Beam Tracking Request Type with corresponding TXVECTOR parameter EDMG_BEAM_TRACKING_TYPE.<br>Set to 1 to indicate the need for beam tracking (10.38.7); otherwise, set to 0.<br>The EDMG Beam Tracking Request field is reserved when the EDMG TRN Length field is 0 and EMDG Beam Tracking Request Type is 0 |
| EDMG Beam Tracking Request Type | 1 | 25 | Corresponds to the TXVECTOR parameter EDMG_BEAM_TRACKING_TYPE.<br>Set to 0 to indicate Analog Beam Tracking (10.38.7)<br>Set to 1 to indicate Baseband Beam Tracking (10.38.7) |
| EDMG Beam Tracking Config | 1 | 26 | Corresponds to the TXVECTOR parameter EDMG_BEAM_TRACKING_CONFIG.<br>Set to 0 to indicate change antenna configuration (10.38.7)<br>Set to 1 to indicate keep antenna configuration (10.38.7) |
| EDMG Extended CEF Number of SS | 3 | 27 | Corresponds to the TXVECTOR parameter EDMG_NUMBER_OF_SPATIAL_STREAMS_TRACKED.<br>Used when EDMG_BEAM_TRACKING_TYPE is equal to Baseband Beam Tracking and EDMG_TRN_N is set to zero.<br>This implies baseband beam tracking is done using the transmited extended EDMG CEF<br>The value of this field plus one indicates the number of SSs sounded when using the extended CEF in baseband tracking. |
| Reserved | 34 | 30 | Set to 0 by the transmitter and ignored by the receiver. |
| EMDG Feedback number of taps Requested | 2 | 98 | Number of taps in each channel measurement:<br>0x0 - 1 tap<br>0x1 - 5 taps<br>0x2 - 15 taps<br>0x3 - 63 taps |

For a control mode PPDU, the L-Header field is the same as the DMG control mode header field and the reserved bits 22 and 23 shall be both set to 1. In this case, the Scrambler Initialization field in the L-Header is defined as shown in Table 8.

For an EDMG SC mode PPDU or an EDMG OFDM mode PPDU, the L-Header field is the same as the DMG SC mode PHY header with the following changes: the reserved bit 46 shall be set to 1 to indicate the presence of the EDMG-Header-A field. This implies that the PPDU is an EDMG PPDU; and the reserved bit 47 shall be set to 1 to indicate the beam tracking request type. This implies either analog or digital baseband channel tracking request; the Last RSSI field shall be redefined as shown in Table 10; and the 5 LSBs of the Length field shall be redefined as shown in Table 11. Moreover, the remaining bits of the Length field shall be set so that the spoofing error is smaller than one symbol block (512xTc) and non-negative, where spoofing error is defined as the difference between the PPDU duration calculated based on L-Header and the actual PPDU duration.

An EDMG SC mode header fields are illustrated in table 25 below

TABLE 25

| Field Name | Number of bits | Start bit | Description |
|---|---|---|---|
| Beam Tracking Request | 1 | 38 | Corresponds to the TXVECTOR parameter BEAM_TRACKING_REQUEST.<br>Set to 1 to indicate the need for beam tracking (10.38.7); otherwise, set to 0.<br>The Beam Tracking Request field is reserved when the Training Length field is 0 and the TXVECTOR parameter EDMG_BEAM_TRACKING_TYPE is Analog Beam Tracking |

TABLE 25-continued

| Field Name | Number of bits | Start bit | Description |
|---|---|---|---|
| Beam Tracking Request Type | 1 | 47 | Corresponds to the TXVECTOR parameter EDMG_BEAM_TRACKING_TYPE. Set to 0 to indicate Analog Beam Tracking (10.38.7) Set to 1 to indicate Baseband Beam Tracking (10.38.7) |

Example Wireless-Communication Device

Figure 40:
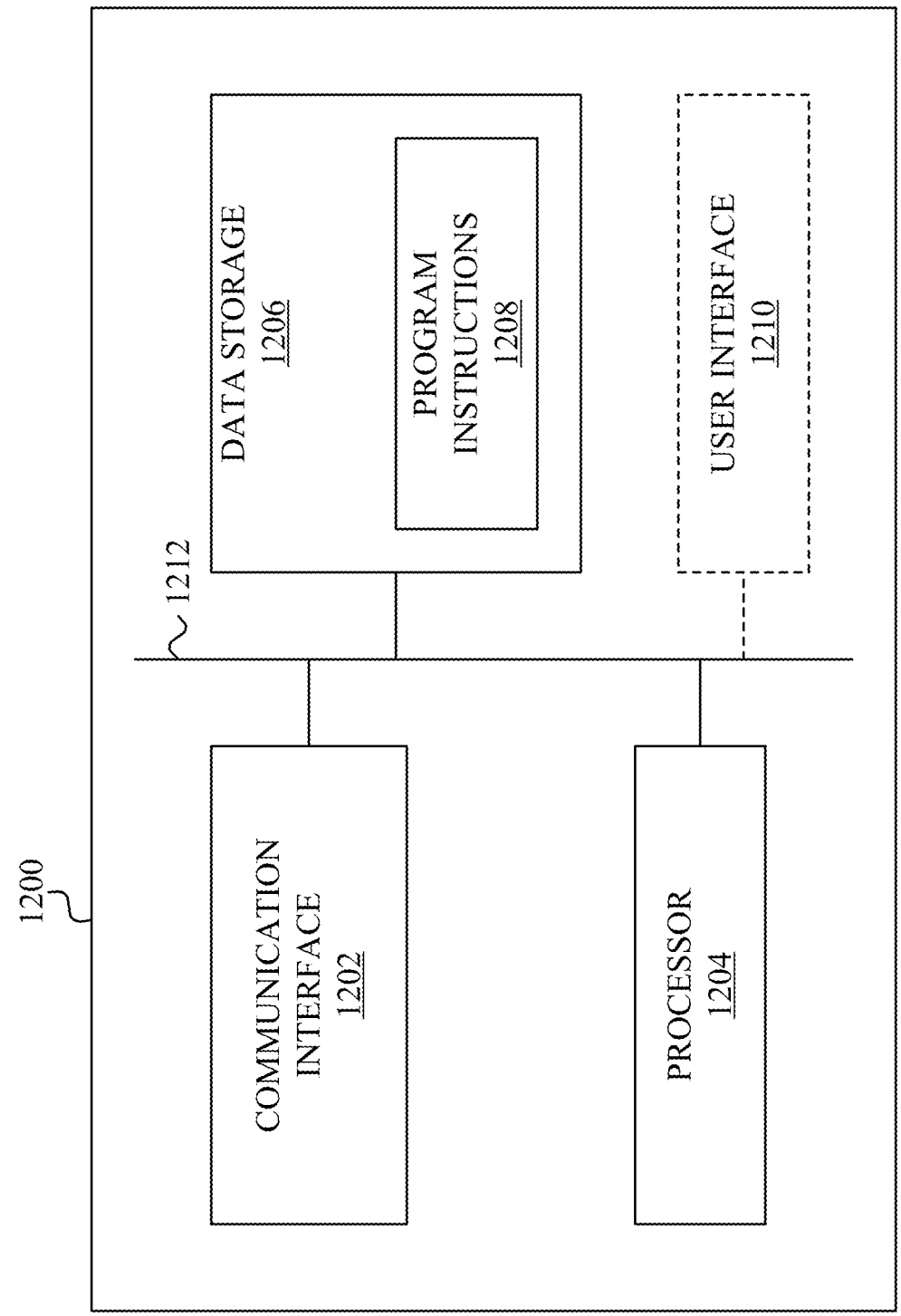
FIG. 40 depicts an example wireless-communication device, in accordance with at least one embodiment.

FIG. 40 depicts an example wireless-communication device, in accordance with at least one embodiment. The device 1200 could be an AP, a STA, and/or any other wireless-communication device. Thus, any of the APs, STAs, and/or other computing-and-communication devices described herein (e.g., the AP 1102, the STAs 1110-1140, etc.) could have a structure similar to the example structure that is described in connection with FIG. 26. Moreover, the various devices referred to herein by terms such as initiator, responder, and the like could have a structure similar to the structure described in connection with FIG. 26.

As shown in FIG. 40, the example device 1200 includes a communication interface 1202, a processor 1204, data storage 1206 containing program instructions 1208, and an optional user interface 1210, all of which are communicatively connected by a system bus 1212. Other device architectures could be used as well, as the provided and described architecture is presented herein by way of example and not limitation.

The communication interface 1202 may include one or more wireless-communication interfaces (for communicating according to, e.g., LTE, Wi Fi (i.e., any one or more IEEE 802.11 protocols), Bluetooth, and/or the like) and/or one or more wired-communication interfaces (for communicating according to, e.g., Ethernet, USB, and/or the like). As such, the communication interface 1202 may include any necessary hardware (e.g., chipsets, antennas, Ethernet cards, etc.), any necessary firmware, and any necessary software for conducting one or more forms of communication with one or more other entities as described herein.

The processor 1204 may include one or more processors of any type deemed suitable by those of skill in the relevant art, some examples including a general-purpose microprocessor and a dedicated digital signal processor (DSP).

The data storage 1206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. The data storage 1206 contains program instructions 1208 that are executable by the processor 1204 for carrying out various functions described herein.

When present, the optional user interface 1210 may include one or more input devices (a.k.a. components and the like) and/or one or more output devices (a.k.a. components and the like). With respect to input devices, the optional user interface 1210 may include one or more touchscreens, buttons, switches, knobs, microphones, and the like. With respect to output devices, the optional user interface 1210 may include one or more displays, speakers, light emitting diodes (LEDs), and the like. Moreover, one or more components (e.g., an interactive touchscreen-and-display component) of the optional user interface 1210 could provide both user-input and user-output functionality. And certainly other user-interface components could be used in a given context, as known to those of skill in the art.

Figure 41:
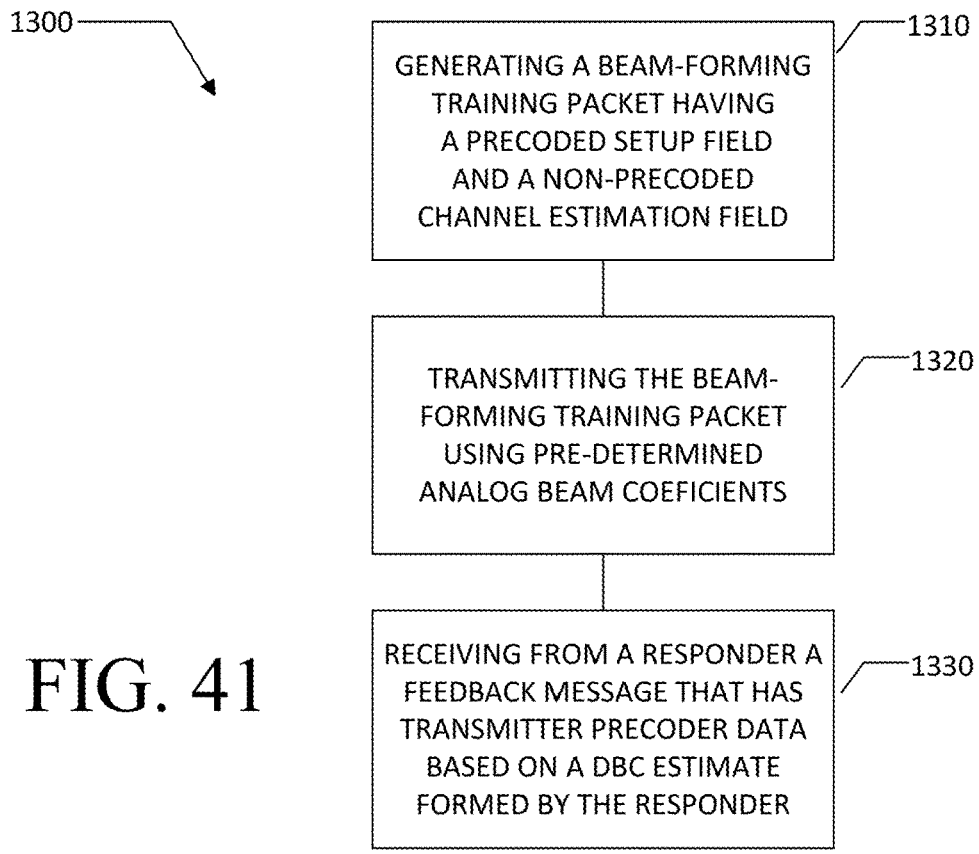
FIG. 41 depicts a beam tracking method in accordance with at least one embodiment.

FIG. 41 depicts a beam tracking method for 802.11ay with respect to the initiator 210. The method 1300 may comprise generating at an initiator device a beam-forming training packet having a precoded setup field and a non-precoded channel estimation field at step 1310. The setup field is configured to have a digital baseband channel (DBC) tracking indicator parameter. At step 1320, the beam-forming training packet is transmitted using pre-determined analog beam coefficients. Further, at step 1330, the initiator 210 receives from the responder 220 a feedback message having transmitter precoder data based on a DBC estimate formed by the responder 220.

Figure 42:
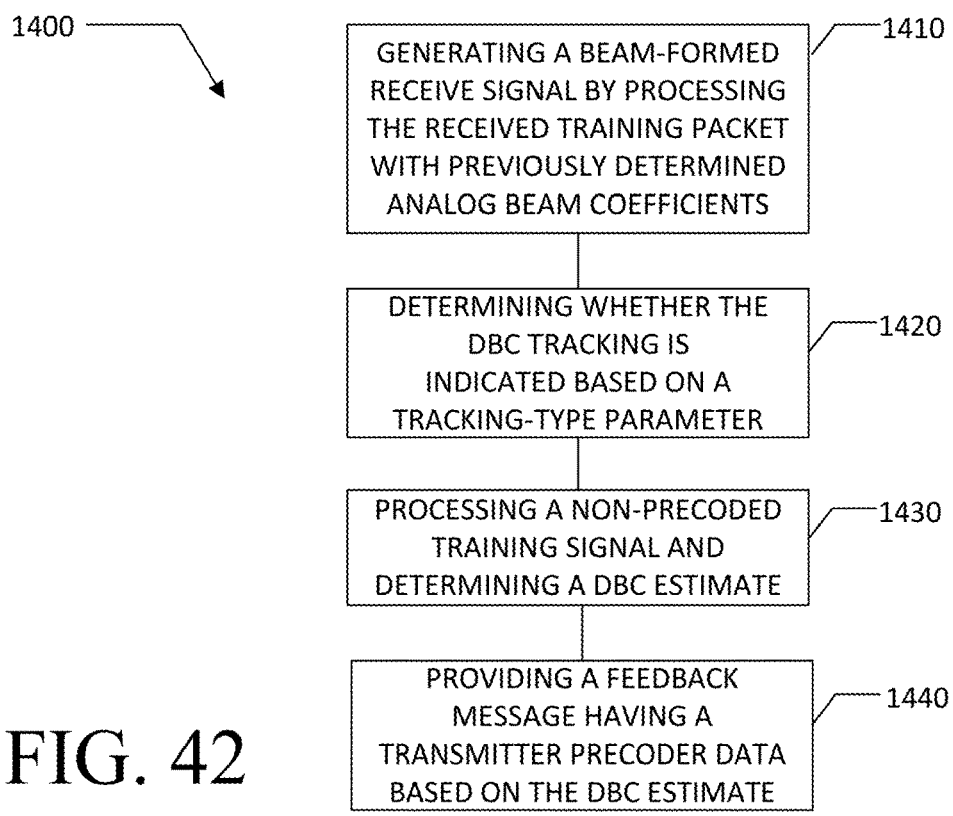
FIG. 42 depicts a further beam tracking method in furtherance of the method of FIG. 27.

FIG. 42 depicts a beam tracking method for 802.11ay with respect to the responder 220. The method 1400 may receiving a training packet by the responder 220 having multiple antennas and responsively generating a beam-formed receive signal by processing the received training packet with previously determined analog beam coefficients at step 1410. Next, the responder 220 determines whether DBC tracking is indicated based on a tracking-type parameter contained within the received training packet at step 1420. At step 1430, the responder 220 processes a non-precoded training signal within the beam-formed receive signal and responsively determines a DBC estimate. Next, at step 1440, the responder 220 provides a feedback message having transmitter precoder data based on the DBC estimate.

ADDITIONAL NOTES

Although the features and elements of the present invention are described in the preferred embodiments in particular combinations, each feature or element can be used alone without the other features and elements of the preferred embodiments or in various combinations with or without other features and elements of the present invention.

Although the embodiments described herein consider 802.11 specific protocols, it is understood that the embodiments described herein are not restricted to this scenario and are applicable to other wireless systems as well.

Throughout the embodiments and provided examples, the blank areas in the figures generally imply that there is no restriction for this area and any embodiment can be employed.

What is claimed is:

1. A method implemented by a wireless transmit/receive unit (WTRU) having multiple antennas, the method comprising:
receiving a training packet including information indicating a beam tracking type to be any of analog beam tracking and digital beam tracking;
on condition that the indicated beam tracking-type is digital beam tracking, generating feedback information associated with: (1) a beam-formed receive signal generated according to previously determined analog beam coefficients; (2) a non-precoded training signal within the beam-formed receive signal; and (3) transmitter precoder data associated with a digital baseband channel (DBC) estimate determined by the WTRU; and, transmitting a feedback message including the feedback information generated based on the indicated beam tracking type being digital beam tracking.

2. The method of claim 1, wherein the feedback message is provided according to a polling protocol.

3. The method of claim 1, wherein the feedback message comprises quantized channel coefficients.

4. The method of claim 1, wherein the feedback message comprises a precoder index value.

5. The method of claim 1, wherein the non-precoded training signal comprises training (TRN) sequences.

6. The method of claim 1, wherein the non-precoded training signal comprises a channel estimation field (CEF).

7. The method of claim 6, wherein the CEF is received after a padding interval of the received training packet.

8. The method of claim 6, wherein the CEF is contained in a setup header of the received training packet.

9. The method of claim 1, wherein the beam-formed receive signal includes a use parameter that indicates maintaining a current configuration for the beam-formed receive signal.

10. A wireless transmit/receive unit (WTRU) comprising a processor, a transmitter, and a receiver, wherein the processor, the transmitter, and the receiver are configured to:
    receive a training packet including information indicating a beam tracking type to be any of analog beam tracking and digital beam tracking;
    on condition that the indicated beam tracking type is digital beam tracking, generate feedback information associated with: (1) a beam-formed receive signal generated according to previously determined analog beam coefficients; (2) a non-precoded training signal within the beam-formed receive signal; and (3) transmitter precoder data associated with a digital baseband channel (DBC) estimate determined by the WTRU; and,
    transmit a feedback message including the feedback information generated based on the indicated beam tracking type being digital beam tracking.

11. The WTRU of claim 10, wherein the receiver is configured to receive a channel estimation field (CEF) contained in a setup header of the received training packet.

12. The WTRU of claim 10, wherein the transmitter is configured to transmit the feedback message according to a polling protocol.

13. The WTRU of claim 10, wherein the processor is configured to include quantized channel coefficients in the feedback to information.

14. The WTRU of claim 10, wherein the processor is configured to include a precoder index value in the feedback information.

15. The WTRU of claim 10, wherein the processor is configured to process a channel estimation field (CEF).

16. The WTRU of claim 15, wherein the processor is configured to process the CEF in a setup header of the received training packet.

17. The WTRU of claim 15, wherein the processor is configured to process the CEF after a padding interval of the received training packet.

18. The WTRU of claim 10, wherein the processor is configured to process training (TRN) sequences.

19. The WTRU of claim 10, wherein the transmitter is configured to transmit a use parameter to indicate maintaining a current configuration for the beam-formed receive signal.

20. The WTRU of claim 10, wherein the processor is configured to determine the DBC estimate by processing training (TRN) sequences and a channel estimation field (CEF).

* * * * *